United States Patent
Shitara

(10) Patent No.: US 9,735,910 B2
(45) Date of Patent: Aug. 15, 2017

(54) DATA GENERATION APPARATUS, DATA GENERATION METHOD, BASE STATION, MOBILE STATION, SYNCHRONIZATION DETECTION METHOD, SECTOR IDENTIFICATION METHOD, INFORMATION DETECTION METHOD AND MOBILE COMMUNICATION SYSTEM

(71) Applicant: SHARP KABUSHIKI KAISHA, Osaka-shi, Osaka (JP)

(72) Inventor: Shoichi Shitara, Chiba (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/714,027

(22) Filed: May 15, 2015

(65) Prior Publication Data

US 2015/0249518 A1    Sep. 3, 2015

Related U.S. Application Data

(60) Continuation of application No. 12/490,843, filed on Jun. 24, 2009, now Pat. No. 9,059,827, which is a
(Continued)

(30) Foreign Application Priority Data

Jun. 16, 2006  (JP) ................................ 2006-168168
Aug. 3, 2006  (JP) ................................ 2006-212658

(51) Int. Cl.
*H04J 11/00*  (2006.01)
*H04L 27/26*  (2006.01)
(Continued)

(52) U.S. Cl.
CPC ....... *H04J 11/0073* (2013.01); *H04J 11/0069* (2013.01); *H04J 11/0076* (2013.01);
(Continued)

(58) Field of Classification Search
CPC ............... H04J 11/0073; H04J 11/0079; H04J 11/0076; H04J 11/0069; H04W 28/06;
(Continued)

(56) References Cited

U.S. PATENT DOCUMENTS

| 5,978,679 A | 11/1999 | Agre |
| 6,161,022 A | 12/2000 | Hwang et al. |

(Continued)

FOREIGN PATENT DOCUMENTS

| EP | 1610514 A1 | 12/2005 |
| JP | 10-190616 A | 7/1998 |

(Continued)

OTHER PUBLICATIONS

U.S. Advisory Action for U.S. Appl. No. 12/303,696, dated Sep. 26, 2011.
(Continued)

*Primary Examiner* — Christopher Grey
(74) *Attorney, Agent, or Firm* — Birch, Stewart, Kolasch & Birch, LLP

(57) ABSTRACT

A mobile station communicates with a base station controlling over a cell containing a plurality of sectors. The mobile station also receives, from a base station, data of synchronization channels which includes sector specific codes respectively corresponding to sector identification numbers for identifying the sectors. In addition, the mobile station performs synchronization detection with reference to the data of synchronization channels, where the data of the synchronization channels mapped to a plurality of predetermined symbols at intervals of a half period of a frame and a plurality of predetermined subcarriers are specific to respective sectors in the same cell and common among adjacent cells.

4 Claims, 34 Drawing Sheets

Related U.S. Application Data division of application No. 12/303,696, filed as application No. PCT/JP2007/062243 on Jun. 18, 2007, now abandoned.

(51) Int. Cl.
| | |
|---|---|
| *H04W 28/06* | (2009.01) |
| *H04L 5/00* | (2006.01) |
| *H04W 8/00* | (2009.01) |
| *H04W 48/08* | (2009.01) |
| *H04W 64/00* | (2009.01) |
| *H04W 88/08* | (2009.01) |

(52) U.S. Cl.
CPC .......... *H04J 11/0079* (2013.01); *H04L 5/005* (2013.01); *H04L 5/0053* (2013.01); *H04L 27/2613* (2013.01); *H04L 27/2655* (2013.01); *H04L 27/2675* (2013.01); *H04W 28/06* (2013.01); *H04L 5/0023* (2013.01); *H04W 8/005* (2013.01); *H04W 48/08* (2013.01); *H04W 64/00* (2013.01); *H04W 88/08* (2013.01)

(58) Field of Classification Search
CPC ..... H04W 8/005; H04W 64/00; H04W 88/08; H04L 27/2675; H04L 27/2613; H04L 5/005; H04L 5/0053; H04L 27/2655; H04L 5/0023
See application file for complete search history.

(56) References Cited

U.S. PATENT DOCUMENTS

| | | | |
|---|---|---|---|
| 6,259,683 B1 | 7/2001 | Sekine et al. | |
| 6,320,855 B1 | 11/2001 | Shi | |
| 6,574,211 B2 | 6/2003 | Hinderling et al. | |
| 6,975,607 B2 | 12/2005 | Sekine et al. | |
| 7,079,550 B2 | 7/2006 | Padovani et al. | |
| 7,386,055 B2 | 6/2008 | Morita et al. | |
| 7,586,836 B2 | 9/2009 | Park et al. | |
| 8,848,621 B2 | 9/2014 | Wang et al. | |
| 2001/0024429 A1 | 9/2001 | Sekine et al. | |
| 2001/0024430 A1 | 9/2001 | Sekine et al. | |
| 2003/0063583 A1 | 4/2003 | Padovani et al. | |
| 2003/0142656 A1 | 7/2003 | Padovani et al. | |
| 2004/0085946 A1 | 5/2004 | Morita et al. | |
| 2004/0131007 A1* | 7/2004 | Smee ................ | H04B 7/0669 370/208 |
| 2005/0148297 A1 | 7/2005 | Lu et al. | |
| 2006/0018251 A1 | 1/2006 | Park et al. | |
| 2007/0140106 A1 | 6/2007 | Tsai et al. | |
| 2007/0183307 A1 | 8/2007 | Akita et al. | |
| 2007/0230388 A1* | 10/2007 | Li ..................... | H04W 16/02 370/313 |
| 2008/0080439 A1* | 4/2008 | Aziz ................... | H04L 5/0016 370/338 |
| 2008/0107086 A1 | 5/2008 | Fukuta et al. | |
| 2008/0137526 A1 | 6/2008 | Jiang et al. | |
| 2008/0285534 A1 | 11/2008 | Dent | |
| 2009/0257427 A1 | 10/2009 | Shitara | |
| 2011/0268104 A1* | 11/2011 | Akita ................ | H04J 11/0073 370/350 |

FOREIGN PATENT DOCUMENTS

| | | |
|---|---|---|
| JP | 11-1122141 A | 4/1999 |
| JP | 2003-179522 A | 6/2003 |
| JP | 2005-198232 A | 7/2005 |
| JP | 2007-536875 A1 | 12/2007 |
| RU | 2111619 C1 | 5/1998 |
| RU | 2174923 C1 | 10/2001 |
| RU | 2233045 C2 | 7/2004 |
| RU | 2236767 C2 | 9/2004 |

OTHER PUBLICATIONS

U.S. Advisory Action for U.S. Appl. No. 12/490,843, dated Sep. 19, 2012.
Feb. 18, 2011 EP Search Report, EP07767141.0.
Feb. 23, 2011 EP Search Report, EP09001822.7.
Feb. 28, 2011 EP Search Report, EP09001823.5.
3GPP TSG RAN WG1 #42 on LTE, R1-050700, London, UK, Aug. 29-Sep. 2, 2005, pp. 1-9.
3GPP TSG RAN WG1 #43, R1-051305, TR 25,814 V0.3.1, Seoul, Korea, Nov. 7-11, 2005, Release 7.
3GPP TSG RAN WG1 Meeting #45, R1-061188, Shanghai, China, May 8-12, 2006, pp. 1-8.
3GPP TSG-RAN WG1 LTE Ad Hoc Meeting, R1-060042, Helsinki, Finland, Jan. 23-25, 2006, pp. 1-9.
Kishiyama et al., 2005, p. 445, IEICE Communications Society Conferene Koen Ronbunshu 1. Sep. 7, 2005.
Motorola, Cell Search and Initial Acquisition for OFDM Downlink, 3GPP TSG RAN1#43 R1-051329, Nov. 7, 2005, pp. 107.
NTT DoCoMo, Fujitsu, Mitsubishi Electric Corporation, NEC, Sharp, Toshiba Corporation, "Scrambling Code in E-UTRA Downlink", 3GPP TSG-RAN WG1 LTE Ad Hoc Meeting, Helsinki, Finland, Jan. 23-25, 2006, R1-060036, pp. 1-4.
Supplemental U.S. Notice of Allowance issued in U.S. Appl. No. 12/490,843 on Mar. 26, 2015.
Supplemental U.S. Notice of Allowance issued in U.S. Appl. 12/490,843 on May 11, 2015.
U.S. Advisory Action dated Mar. 27, 2012 for U.S. Appl. No. 12/490,855.
U.S. Notice of Allowance issued in U.S. Appl. No. 12/490,843 on Feb. 12, 2015.
U.S. Office Action dated Dec. 9, 2011 in U.S. Appl. No. 12/490,855.
U.S. Office Action dated Feb. 15, 2012 for U.S. Appl. No. 12/303,696.
U.S. Office Action dated Feb. 3, 2011 in U.S. Appl. No. 12/490,855.
U.S. Office Action dated Feb. 4, 2011 in U.S. Appl. No. 12/303,696.
U.S. Office Action dated Jun. 15, 2011 in U.S. Appl. No. 12/303,696.
U.S. Office Action dated Jun. 21, 2011 in U.S. Appl. No. 12/490,855.
U.S. Office Action dated Oct. 25, 2012 in U.S. Appl. No. 12/303,696.
U.S. Office Action dated Oct. 25, 2012 in U.S. Appl. No. 12/490,855.
U.S. Office Action issued in U.S. Appl. No. 12/490,843 on Apr. 13, 2012.
U.S. Office Action issued in U.S. Appl. No. 12/490,843 on Mar. 15, 2011.
U.S. Office Action issued in U.S. Appl. No. 12/490,843 on Sep. 12, 2014.
U.S. Office Action issued in U.S. Appl. No. 12/490,843 on Sep. 13, 2010.
U.S. Office Action issued in U.S. Appl. No. 12/490,843 on Sep. 6, 2011.
U.S. Office Action issued in U.S. Appl. No. 12/490,855 on May 30, 2012.

* cited by examiner

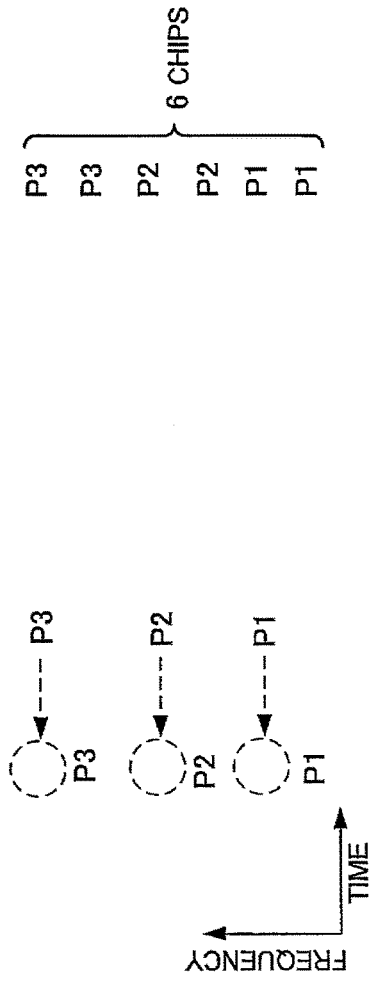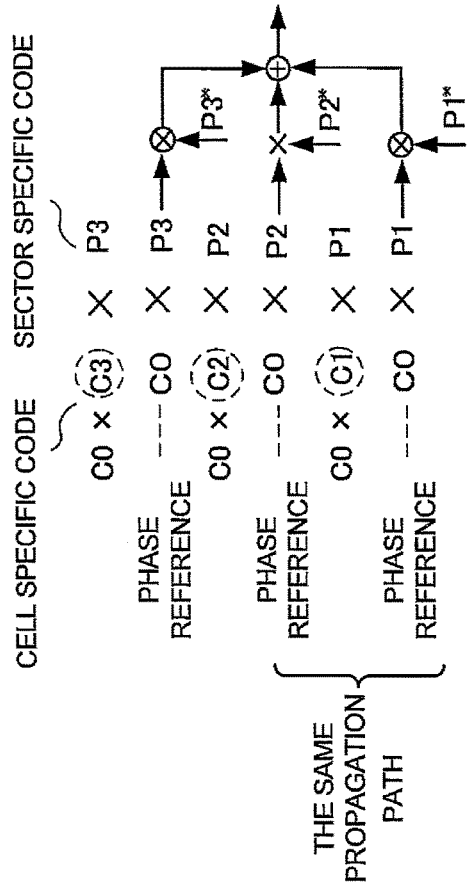

DATA GENERATION APPARATUS, DATA GENERATION METHOD, BASE STATION, MOBILE STATION, SYNCHRONIZATION DETECTION METHOD, SECTOR IDENTIFICATION METHOD, INFORMATION DETECTION METHOD AND MOBILE COMMUNICATION SYSTEM

This application is a Continuation of U.S. application Ser. No. 12/490,843, filed on Jun. 24, 2009, which is a Divisional application of U.S. application Ser. No. 12/303,696 filed on Dec. 5, 2008. Application Ser. No. 12/303,696 is the National Phase of PCT International Application No. PCT/JP2007/062243 filed on Jun. 18, 2007, and claims priority under 35 U.S.C. §119(a) to Patent Application No. 2006-168168 filed in Japan on Jun. 16, 2006, and 2006-212658 filed in Japan on Aug. 3, 2006, all of which are hereby expressly incorporated by reference into the present application.

TECHNICAL FIELD

The present invention relates to mobile communication of the E-UTRA (Evolved-UTRA) standard adopting a multi-carrier communication scheme, and more particularly to a data generation apparatus, data generation method, base station, mobile station, synchronization detection method, sector identification method, information detection method and mobile communication system for generating data of a synchronization channel (SCH) included in a downlink (transmission) signal.

BACKGROUND ART

In recent years, the third generation mobile communication (3G) including W-CDMA systems has been in widespread use on a worldwide basis. Currently, the fourth generation mobile communication (4G) has further been considered to implement communication rates of 100 Mb/s to 1 Gb/s on downlink. However, it is not easy to completely shift from 3G to 4G. Therefore, attention is directed toward E-UTRA (Evolved-UTRA) for increasing the rate in communication using a frequency band of 3G while introducing new techniques of 4G. Active proposals have been made also in 3GPP (3rd Generation Partnership Project).

In the mobile communication system, a mobile station needs to identify a cell and a section to which the mobile station intends to connect for initial synchronization establishment or handover. In other words, it is necessary to detect a base station targeted for communication and an antenna of the base station. In the third generation mobile communication, the so-called 3-step cell search method is adopted to perform a fast cell search. In addition, the concept of "cell search" includes "sector search".

The 3-step cell search in the third generation mobile communication generally uses a Synchronization Channel (SCH) and a Common Pilot Channel (CPICH). First, the reception timing of the SCH is detected (first step), and next, identification of the frame timing and a scramble code group is performed by correlation detection with the SCH code (second step). Then, a scramble code is identified by correlation detection using the CPICH (third step).

In the E-UTRA that is the next generation mobile communication standard, OFDM (Orthogonal Frequency Division Multiplexing) is used as a modulation scheme, and regarding the cell search, techniques following the philosophy of the above-mentioned 3-step cell search are proposed (for example, see Patent Document 1, Patent Document 2, Non-patent Document 1 and Non-patent Document 2).

Patent Document 1 discloses techniques for frequency-multiplexing a second synchronization code (S-SCH signal) for scramble code group identification on a plurality of subcarriers in the 3-step cell search in the multicarrier communication system adopting OFDM.

Patent Document 2 discloses techniques for multiplexing a cell identification code on a Common Pilot Channel (CPICH) in the 3-step cell search in the multicarrier communication system adopting OFDM.

Moreover, Non-patent Document 1 proposes standardization of a one-cell reuse communication system adopting OFDM. Further, a draft of standardization has been proposed in consideration of a base station provided for each sector concurrently performing communications with a plurality of mobile stations in the cell. In this technique, the Common Pilot Channel (CPICH) is doubly multiplied by a spreading code specific to a cell and a spreading code specific to a sector. Accordingly, a mobile station performs despreading and correlation detection using each spreading code replica, and is thereby capable of identifying the cell (and the sector).

Further, Non-patent Document 2 discloses techniques for identifying a cell (and a sector) by a 3-step cell search similar to techniques of the third generation in the multicarrier communication system adopting OFDM. In the techniques, as in the techniques disclosed in Non-patent Document 1, a cell is divided into three sectors, and the same Synchronization Channel code (SCH code) is used among the sectors. With respect to transmission of the SCH code, time synchronization is acquired among the sectors, and transmission of the SCH for each sector is performed at the same time. Then, identification of a cell and a sector i.e. selection of a cell and a sector providing the maximum reception power is made by correlation detection with replicas of spreading codes using a pilot channel in the third step.

Thus, also in the E-UTRA that is the next generation communication standard, proposals are made to adopt the techniques following the 3-step cell search of 3G using the SCH and CPICH. Particularly, with respect to sector identification, as disclosed in Non-patent Documents 1 and 2, the Common Pilot Channel is multiplied by a spreading code specific to a sector, and a sector providing the maximum reception power is detected by despreading and correlation detection processing in the third step.

Patent Document 1: Japanese Laid-Open Patent Publication No. 2003-179522
Patent Document 2: Japanese Laid-Open Patent Publication No. 2005-198232
Non-patent Document 1: 3GPP "TR 25.814, "Physical Layer Aspects for Evolved UTRA (Release 7) v.0.3.1" 2005, Oct. 18
Non-patent Document 2: 3GPP "R1-060042, "SCH Structure and Cell Search Method in E-UTRA Downlink" 2006 Jan. 25

DISCLOSURE OF INVENTION

Problems to be Solved by the Invention

As described above, also in the E-UTRA that is the next generation communication standard, proposals are made to adopt the techniques following the 3-step cell search of 3G using the SCH and CPICH. In this case, sector identification is made by despreading and correlation detection processing using the CPICH (Common Pilot Channel) in the third step. In other words, in the current techniques, it is not possible to identify a sector and a cell without undergoing the 3-step processing. Accordingly, the 3-step cell search has limitations in reducing the process required for the processing for identifying a cell and a sector.

Further, in the third step, in addition to despreading and correlation detection processing for cell identification using the CPICH, it is further required to perform the similar processing for sector identification. In other words, in the final step of the 3-step cell search, a cell ID is detected by despreading using replica codes, while needing to determine which sector in the same cell provides high signal intensity. Therefore, as a result, it is necessary to perform correlation detection using replica signals corresponding (the number of cell IDs contained in a cell ID group) multiplied by (the number of sector IDs). Hence, the time required for correlation detection in the third step increases in proportion to the number of sectors contained in a single cell.

Furthermore, to compare between correlation values corresponding to the replica signals, required is memory having the capacity for storing correlation calculation results by the replica signals. In other words, the memory is required that stores correlation calculation results corresponding to (the number of cell IDs contained in a cell ID group multiplied by the number of sector IDs), resulting in increases in memory capacity.

Still furthermore, as disclosed in above-mentioned Non-patent Document 2, the same SCH data is concurrently transmitted for each sector in the same cell. Therefore, a mobile station near a boundary of sectors has a possibility that a frequency band with the reception power decreased occurs by mutual interference of signals from a plurality of sectors or fading caused by propagation environment. In this case, the probability for cell and sector identification may decrease.

The present invention is carried out in view of such circumstances, and it is an object of the invention to decrease the time required for cell search processing including sector identification, while reducing the capacity of memory for storing correlation detection results using a pilot channel. It is another object to actualize a cell search including sector identification more easily with high accuracy while improving resistance to interference or anti-fading characteristics of the cell search processing including sector identification without increasing loads on a transmission/reception apparatus.

Means for Solving the Problem (1) To attain the above-mentioned objects, the present invention takes the following measures. In other words, a data generation apparatus of the invention is a data generation apparatus that generates data of a synchronization channel transmitted from a base station controlling over a cell containing a plurality of sectors, and is characterized by generating data of synchronization channels for each of the sectors using sector specific codes corresponding to sector identification numbers for identifying the sectors.

According to this constitution, by multiplying a sector common code by a sector specific code, it is possible to perform sector identification using the synchronization channel without using a pilot channel.

(2) Further, in the data generation apparatus of the invention, it is a feature that the sector specific codes are orthogonal to one another.

According to this constitution, it is possible to perform sector identification or synchronization detection with high accuracy.

(3) Furthermore, in the data generation apparatus of the invention, it is a feature that the sector specific codes are common among adjacent cells.

According to this constitution, it is possible to perform sector identification or synchronization detection with efficiency.

(4) Still furthermore, the data generation apparatus of the invention is characterized by generating data of pilot channels for each of the sectors using orthogonal codes corresponding to the sector identification numbers.

According to this constitution, it is possible to decrease the time required for the cell search process including sector identification, while reducing the capacity of memory for storing correlation detection results using a pilot channel, and further to actualize a faster cell search including sector identification with high accuracy while improving resistance to interference or anti-fading characteristics of the cell search processing including sector identification without increasing loads on a transmission/reception apparatus.

(5) Moreover, a data generation method of the invention is a data generation method for generating data of synchronization channels transmitted from a base station controlling over a cell containing a plurality of sectors, and is characterized by generating data of synchronization channels for each of the sectors using sector specific codes corresponding to sector identification numbers for identifying the sectors.

According to this constitution, by multiplying a sector common code by a sector specific code, it is possible to perform sector identification using the synchronization channel without using a pilot channel.

(6) Further, the data generation method of the invention is characterized by generating data of pilot channels for each of the sectors using orthogonal codes corresponding to the sector identification numbers.

According to this constitution, it is possible to decrease the time required for the cell search process including sector identification, while reducing the capacity of memory for storing correlation detection results using a pilot channel, and further to actualize a faster cell search including sector identification with high accuracy while improving resistance to interference or anti-fading characteristics of the cell search processing including sector identification without increasing loads on a transmission/reception apparatus.

(7) Further, a base station of the invention is a base station that controls over a cell containing a plurality of sectors, and is characterized by having a storing section that stores data of synchronization channels for each of the sectors using sector specific codes corresponding to sector identification numbers for identifying the sectors, and a transmitting section that transmits the data of synchronization channels corresponding to the sectors to the sectors, respectively.

According to this constitution, by multiplying a sector common code by a sector specific code, it is possible to perform sector identification using the synchronization channel without using a pilot channel.

(8) Furthermore, a base station of the invention is a base station that controls over a cell containing a plurality of sectors, and is characterized by having a synchronization data generating section that generates data of synchronization channels for each of the sectors using sector specific codes corresponding to sector identification numbers for identifying the sectors, and a transmitting section that transmits the data of synchronization channels corresponding to the sectors to the sectors, respectively.

According to this constitution, by multiplying a sector common code by a sector specific code, it is possible to perform sector identification using the synchronization channel without using a pilot channel.

(9) Still furthermore, in the base station of the invention, it is a feature that the synchronization channel data generating section generates data of pilot channels for each of the sectors using orthogonal codes corresponding to the sector identification numbers, and that the transmitting section transmits the data of pilot channels corresponding to the sectors to the sectors, respectively.

According to this constitution, it is possible to decrease the time required for the cell search process including sector identification, while reducing the capacity of memory for storing correlation detection results using a pilot channel, and further to actualize a faster cell search including sector identification with high accuracy while improving resistance to interference or anti-fading characteristics of the cell search processing including sector identification without increasing loads on a transmission/reception apparatus.

(10) Moreover, a mobile station of the invention is a mobile station that communicates with a base station controlling over a cell containing a plurality of sectors, and is characterized by receiving a signal including synchronization channels derived from sector specific codes corresponding to sector identification numbers for identifying the sectors from the base station.

According to this constitution, by multiplying a sector common code by a sector specific code, it is possible to perform sector identification using the synchronization channel without using a pilot channel.

(11) Further, the mobile station of the invention is characterized by performing sector identification based on the synchronization channels.

According to this constitution, it is possible to perform sector identification with high accuracy.

(12) Furthermore, the mobile station of the invention is characterized by per forming synchronization detection based on the synchronization channels.

According to this constitution, it is possible to perform synchronization detection with high accuracy.

(13) Still furthermore, in the mobile station of the invention, it is a feature that the sector specific codes are orthogonal to one another.

According to this constitution, it is possible to perform sector identification or synchronization detection with high accuracy.

(14) Moreover, in the mobile station of the invention, it is a feature that the sector specific codes are common among adjacent cells.

According to this constitution, it is possible to perform sector identification or synchronization detection with efficiency.

(15) Further, the mobile station of the invention is characterized by performing synchronization detection by calculating correlation using the signal and the sector specific codes.

According to this constitution, it is possible to complete a cell search by timing detection of the SCH (first step) on the time axis by an auto-correlation method using periodicity of the SCH or cross-correlation method using time waveforms of replica codes of the sector specific codes, and identification of a sector ID and cell ID (second step) based on information on the frequency axis. Accordingly, it is possible to reduce the search process as compared with the conventional 3-step cell search.

(16) Furthermore, the mobile station of the invention is characterized by having a synchronization channel signal processing section, where the synchronization channel signal processing section performs the synchronization detection by calculating correlation between the signal and each of replicas corresponding to the sector specific codes.

According to this constitution, it is possible to detect correlation using replicas of the sector specific codes.

(17) Still furthermore, the mobile station of the invention is characterized by performing the sector identification by calculating correlation using the signal and the sector specific codes.

According to this constitution, it is possible to perform sector identification with high accuracy.

(18) Moreover, in the mobile station of the invention, it is a feature that the synchronization channel signal processing section performs the sector identification by calculating correlation between the signal and each of replicas corresponding to the sector specific codes.

According to this constitution, it is possible to detect correlation using replicas of the sector specific codes.

(19) Further, the mobile station of the invention is characterized by beforehand storing a plurality of replicas corresponding to the plurality of sectors.

According to this constitution, it is possible to detect correlation using replicas of the sector specific codes.

(20) Furthermore, in the mobile station of the invention, it is a feature that the synchronization channel signal processing section calculates correlation between each of the plurality of replicas and the signal in parallel with one another.

According to this constitution, it is possible to efficiently perform correction detection.

(21) Still furthermore, in the mobile station of the invention, it is a feature that the synchronization channel signal processing section specifies the sector specific code with a maximum correlation value, and thereby performs the sector identification.

According to this constitution, it is possible to perform sector identification with high accuracy.

(22) Moreover, in the mobile station of the invention, it is a feature that the synchronization channel signal processing section transforms the signal into a signal in the frequency domain to calculate correlation with the sector specific code, and thereby performs the sector identification.

According to this constitution, it is possible to perform sector identification with high accuracy.

(23) Further, the mobile station of the invention is characterized by further having a sector specific code storing section that stores a plurality of sector specific codes corresponding to the plurality of sectors.

According to this constitution, it is possible to perform sector identification or synchronization detection efficiently and promptly, and it is made easy to increase the number of sector specific codes in accordance with an increase in the number of sectors.

(24) Furthermore, in the mobile station of the invention, it is a feature that the synchronization channel signal processing section calculates correlation between each of the plurality of sector specific codes and the signal in the frequency domain in parallel with one another.

According to this constitution, it is possible to efficiently perform sector identification or correlation detection with high accuracy.

(25) Still furthermore, in the mobile station of the invention, it is a feature that the synchronization channel signal processing section detects information included in a pilot channel using an orthogonal code of the pilot channel corresponding to a sector obtained by sector identification using the synchronization channels.

According to this constitution, it is possible to decrease the time required for the cell search process including sector identification, while reducing the capacity of memory for storing correlation detection results using a pilot channel, and further to actualize a faster cell search including sector identification with high accuracy while improving resistance to interference or anti-fading characteristics of the cell search processing including sector identification without increasing loads on a transmission/reception apparatus.

(26) Moreover, a synchronization detection method of the invention is a synchronization detection method used in a mobile station in receiving a signal which is transmitted from a base station controlling over a cell containing a plurality of sectors, and which includes synchronization channels generated using sector specific codes corresponding to sector identification numbers for identifying the sectors, and is characterized in that synchronization detection is performed by calculating correlation using the signal and the sector specific codes.

According to this constitution, it is possible to complete a cell search by timing detection of the SCH (first step) on the time axis by an auto-correlation method using periodicity of the SCH or cross-correlation method using time waveforms of replica codes of the sector specific codes, and identification of a sector ID and cell ID (second step) based on information on the frequency axis. Accordingly, it is possible to reduce the search process as compared with the conventional 3-step cell search.

(27) Further, a sector identification method of the invention is a sector identification method used in a mobile station in receiving a signal which is transmitted from a base station controlling over a cell containing a plurality of sectors, and which includes synchronization channels generated using sector specific codes corresponding to sector identification number for identifying the sectors, and is characterized in that sector identification is performed by calculating correlation using the signal and the sector specific codes.

According to this constitution, it is possible to perform sector identification with high accuracy.

(28) Furthermore, the sector identification method of the invention is characterized in that synchronization detection is performed by calculating correlation using the signal and the sector specific codes.

According to this constitution, it is possible to complete a cell search by timing detection of the SCH (first step) on the time axis by an auto-correlation method using periodicity of the SCH or cross-correlation method using time waveforms of replica codes of the sector specific codes, and identification of a sector ID and cell ID (second step) based on information on the frequency axis. Accordingly, it is possible to reduce the search process as compared with the conventional 3-step cell search.

(29) Moreover, an information detection method of the invention is an information detection method for detecting information included in a pilot channel in a mobile station receiving a signal which is transmitted from a base station controlling over a cell containing a plurality of sectors, and which includes synchronization channels generated using sector specific codes corresponding to sector identification numbers for identifying the sectors and pilot channels generated using orthogonal codes corresponding to the sector identification numbers, and is characterized in that the information included in a pilot channel is detected using an orthogonal code of the pilot channel corresponding to a sector obtained by sector identification using the synchronization channels.

According to this constitution, it is possible to decrease the time required for the cell search process including sector identification, while reducing the capacity of memory for storing correlation detection results using a pilot channel, and further to actualize a faster cell search including sector identification with high accuracy while improving resistance to interference or anti-fading characteristics of the cell search processing including sector identification without increasing loads on a transmission/reception apparatus.

(30) Further, a mobile station of the invention is characterized by having a receiving section that receives a signal from a base station controlling over a cell containing a plurality of sectors, and a sector identifying section that identifies a sector where the signal is transmitted using the received signal, where based on identification of the sector by the sector identifying section, the sector providing good reception characteristics is specified to perform handover, and the receiving section receives data of a synchronization channel for each sector using a sector specific code corresponding to a sector identification number for identifying the sector.

According to this constitution, it is possible to perform fast handover with high accuracy.

(31) Moreover, a mobile communication system of the invention is comprised of a base station which controls over a cell containing a plurality of sectors, and which transmits, to each sector, data of a synchronization channel for each sector using a sector specific code corresponding to a sector identification number for identifying the sector, and a mobile station that receives the data from the base station.

According to this constitution, by multiplying a sector common code by a sector specific code, it is possible to perform sector identification using the synchronization channel without using a pilot channel.

(32) Further, the mobile communication system of the invention is characterized in that a communication method between the base station and the mobile station is a multi-carrier communication method.

According to this constitution, fast transmission with large capacity is made possible on downlink. Further, it is possible to contribute to practical application of communication methods conforming to the E-UTRA.

(33) Furthermore, the mobile communication system of the invention is characterized in that OFDM is applied to the multicarrier communication method.

According to this constitution, fast transmission with large capacity is made possible on downlink. Further, it is possible to contribute to practical application of communication methods conforming to the E-UTRA.

Advantageous Effect of the Invention

According to the invention, by a sector common code being multiplied by a sector specific code, it is possible to identify a sector only by despreading and correlation detection using the SCH without using a pilot channel. Accordingly, with respect to sector identification, the need is eliminated for despreading and correlation detection processing using a pilot channel, and it is possible to reduce the capacity of memory to be used in correlation calculation using the pilot channel.

Further, since the SCH is multiplied by the sector specific code, it is possible to eliminate interference between sectors even in a boundary of the sectors. Furthermore, it is possible to obtain the effect of enhancing anti-fading characteristics by randomizing effect produced by code multiplication. It is easy to increase the number of sector specific codes (orthogonal codes) assigned for each sector according to an increase in the number of sectors, and to respond to the sector configuration flexibly.

Moreover, when the number of subcarriers of the SCH is adequate (to multiply by the cell specific code of the SCH), it is also possible to directly identify a cell ID only by the SCH. In this case, the cell search processing including sector identification is completed by 2-step processing using only the SCH (2-step cell search), and the search time can be reduced as compared with the conventional 3-step cell search.

Further, by devising structures, contents and arrangements on the frequency axis of a cell specific code and sector specific code to multiply, it is possible to prevent the sector specific code and cell specific code from imposing an adverse effect on each other, and to suppress a decrease in information transmission accuracy. Furthermore, each information can be demodulated independently (i.e. in parallel processing). By this means, it is possible to reduce the processing time of a cell search including a sector search.

In other words, a 2m-chip code is generated by combining two orthogonal m-chip codes, the m-chip code is used for sector identification, the other m-chip code is used for identification of cell specific information, and further, the cell specific information is transmitted as phase difference information between subcarriers (that are more preferably adjoined on the frequency axis) multiplied by a sector specific code element of the same value. It is thereby possible to efficiently transmit the sector specific information and cell specific information, while the receiving side can divide and extract both of the information with efficiency.

Further, in the cell search method of the invention, it is possible to complete the cell search by timing detection of the SCH (first step) on the time axis by an auto-correlation method using periodicity of the SCH or cross-correlation method using time waveforms of replica codes of the sector specific codes, and identification of a sector ID and cell ID (second step) based on information on the frequency axis. Accordingly, it is possible to reduce the search process as compared with the conventional 3-step cell search. Further, correlation detection using a pilot channel is required only in demodulating a data channel while being not required in a cell search, and it is thereby possible to achieve reductions (such as a reduction in memory capacity and the like) in loads of hardware used for correlation calculation of the pilot channel. Furthermore, since the sector specific code is multiplexed on the SCH, with respect to sector identification, it is possible to obtain effects of having resistance to interference between sectors and fading. However, when the number of subcarriers is not adequate, the cell ID cannot be identified directly only by the SCH, and there may be a case that cell ID group information is only detected. In this case, the cell ID can be identified by implementing despreading and correlation detection using a pilot channel as processing of the third step.

Moreover, according to the multicarrier transmission/reception apparatus of the invention, fast transmission with large capacity is allowed on downlink.

Thus, according to the invention, it is possible to decrease the time required for the cell search process including sector identification, while reducing the capacity of memory for storing correlation detection results using a pilot channel, and further to actualize a faster cell search including sector identification with high accuracy while improving resistance to interference or anti-fading characteristics of the cell search processing including sector identification without increasing loads on a transmission/reception apparatus.

Further, the invention includes various variations (specific examples, modifications and applications), and the variations contribute to practical application of communication schemes complying with the E-UTRA (Evolved-UTRA).

For example, in the processing (detection processing of SCH timing) of the first step in the cell search, as well as the auto-correlation method, it is possible to adopt a cross-correlation method with a particular time waveform focused, and in this case, it is possible to obtain the effect of enabling the configuration of a correlator to be simplified. Further, by unifying all the codes of subcarriers as a phase reference on the frequency axis to, for example, "1", it is possible to eliminate limitations that six subcarriers should be a group in despreading using the sector specific code. Furthermore, when a mobile station knows all kinds of sector specific codes transmitted from the base station, nearest sector detection can be performed by detection using cross-correlation by time waveforms prior to FFT without despreading. Moreover, when the number of sectors increases, it is possible to adopt a "sector group specific code" as the "sector specific code".

BRIEF DESCRIPTION OF DRAWINGS

FIGS. 6A to 6D are diagrams to explain a code format to multiplex sector specific information and cell specific information on SCH to transmit;

DESCRIPTION OF SYMBOLS

Figure 1:
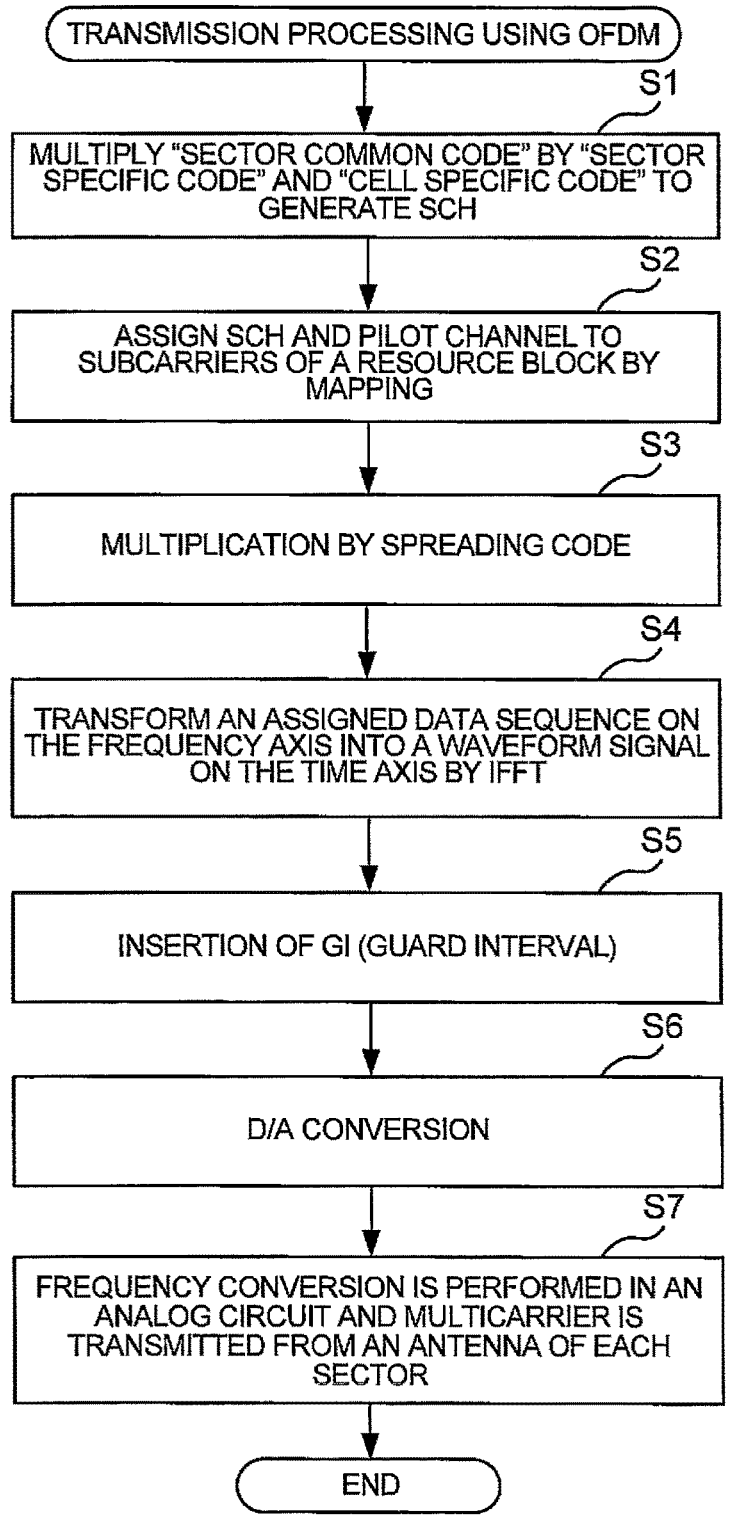
FIG. 1 is a flowchart showing an example of main procedures of multicarrier transmission processing according to the invention.

10 MAC section
12 SCH data generating section
14 Transmission data output section
16 Transmission circuit control section
20 (20a~20b) Physical layer section
22 (22a~22c) Reception circuit section
24 (24a~24c) Transmission circuit section
26 (26a~26C) Analog circuit section
28 (28a~28C) Antenna section
210 Despreading section for sector specific code identification
220 Sector power determining section
230 SCH data (including the cell specific information) demodulation section
400 Shift register
402 Adder
404 Multiplier
CL1~CL3 Cell
SC1~SC3 Sector

BEST MODE FOR CARRYING OUT THE INVENTION

Described first are basic techniques and fundamental concept of multicarrier communication used in the invention.

(Basic Matters of Multicarrier Communication)

In the following descriptions, OFDM is used as a digital modulation scheme. In the OFDM communication system, standardization proceeds in consideration of the fact that a base station controlling a cell, for example, as three communication control areas (sectors) performs communications concurrently with a plurality of mobile stations in the cell. In the OFDM communication system, a radio communication frame (hereinafter, referred to as a "frame") is divided into small units (hereinafter, this divided unit is referred to as a "resource block") so that a plurality of mobile stations can use, each resource block is allocated to a mobile station with good communication environment, and thus, it is intended to enhance the communication rate.

Further, a frame is transmitted at the same timing in each sector controlled by a single base station. In other words, frame transmission is synchronized. Furthermore, the same frequency band is used. Therefore, near the cell boundary and the sector boundary, signals used in the adjacent cell or adjacent sector interfere with a desired reception signal, resulting in a decrease in communication rate (throughput). In the scheme of above-mentioned Non-patent Document 1, the sector specific code (meaning three code sequences specific to sectors in the following example) is multiplied by a pilot subcarrier that is a subcarrier for propagation path estimation assigned to the same subcarrier among the sectors. Then, the system designed is made such that interference by a signal from an adjacent sector is cancelled by despreading M (M is an integer of "2" or more) pilot subcarriers determined by a code sequence, so as to enable propagation path estimation with higher accuracy to be performed.

Meanwhile, with respect to interference with an adjacent cell, such a design is made that an interfering signal caused by a signal used in the adjacent cell is randomized by multiplying a pilot channel and data channel by a spreading code specific to the cell. In other words, the pilot channel is doubly multiplied by the sector specific orthogonal code and cell specific spreading code.

(Description of Frame)

Figure 22:
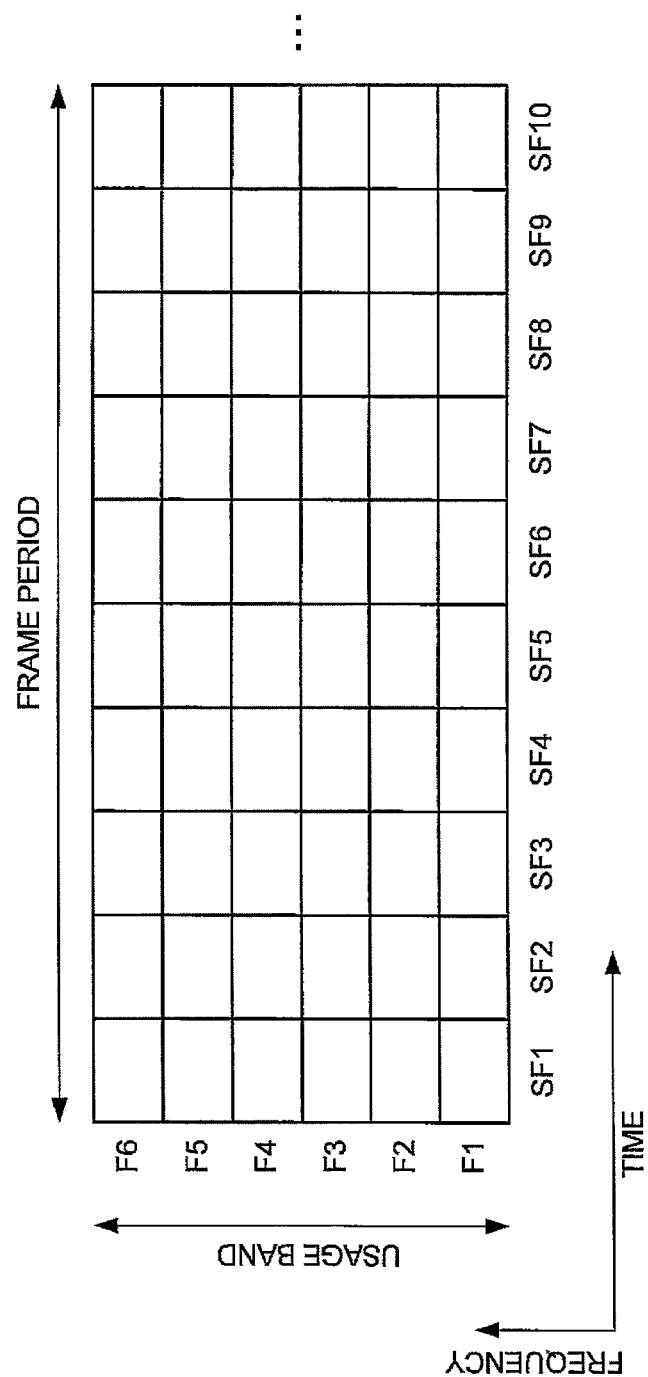
FIG. 22 is a diagram illustrating a downlink frame structure in the multicarrier communication system used in the invention.

FIG. 22 is a diagram illustrating a downlink frame structure in the multicarrier communication system used in the invention. The frame structure is the same as a typical frame structure used in an OFDMA communication scheme. In other words, in the frame structure, a certain time interval (frame interval) is divided into a plurality of units, and the frequency region is also divided into certain bandwidths comprised of a plurality of subcarriers. A single area of thus divided areas is referred to as a resource block in this description of the invention. Generally, a unit divided from a frame in the time region may be referred to as a sub-frame, while a unit divided in the frequency region may be referred to as a sub-channel. In FIG. 22, a frame is comprised of six sub-channels, F1 to F6, in the frequency-axis direction, and ten sub-frames, SF1 to SF10, in the time axis direction. However, the number of block divisions and block size are not limited thereto. Further, each mobile station shares these blocks. Particularly, to enhance communication characteristics (throughput), each block undergoes scheduling to a mobile station with good propagation path environment. Further, when a plurality of mobile stations performs communication with small data amounts, a single resource block can further be divided to be shared.

(Cell Search)

Each mobile station selects abase station providing good reception characteristics from among a plurality of base stations in starting communication, and after connecting to the base station, starts wireless communication. Good reception characteristics mean high reception power of a received signal. Such an operation in starting wireless communication is generally designated as a cell search. The cell search includes selection of a base station providing good communication characteristics, acquisition of cell specific information including information of a base station ID and the like, frame synchronization and symbol synchronization, and the like. In addition, symbol synchronization means an FFT window synchronization, or window synchronization.

Figure 23:
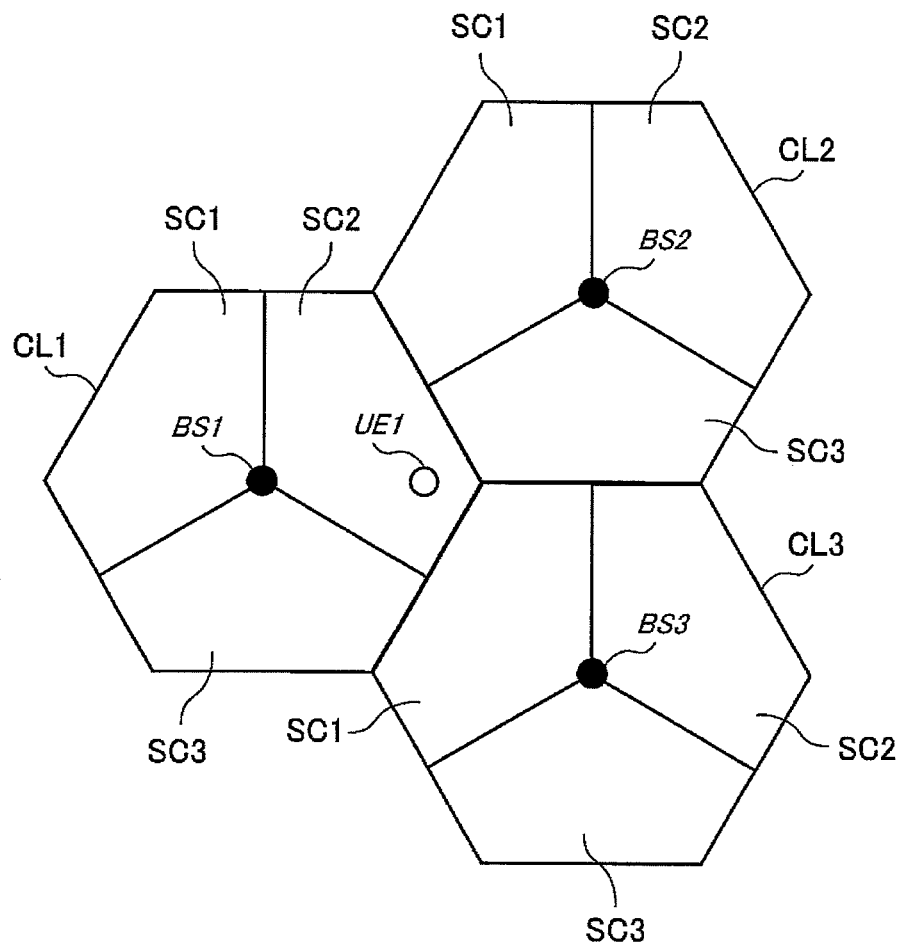
FIG. 23 is a diagram showing an example of configurations of a cell and a sector.

FIG. 23 is a diagram showing an example of configurations of a cell and a sector. As shown in the figure, each of base stations (BS1 to BS3) is located in the center of one of cells (CL1 to CL3), respectively. Further, each of cells (CL1 to CL3) is divided into three sectors (SC1 to SC3). A plurality of mobile stations (UE1 and the like) exists in each cell, and each mobile station selects a base station providing the most excellent reception quality to perform wireless communication. For example, when the base stations (BS1 to BS3) as shown in FIG. 23 perform downlink wireless communication with the same transmit power, a mobile station UE1 connects to BS1 providing the smallest propagation loss to perform communication. Thus, it is necessary to make the cell search to thus detect a plurality of base stations, and select a base station with the most excellent communication quality from among the base stations to connect. Further, in Non-patent Document 1 as described previously, it is required to acquire information of a code specific to the cell in the cell search to multiply a data channel by the code specific to the cell.

(3-Step Cell Search)

As described above, the cell search method is proposed which is designated as the 3-step cell search method having 3 steps. In the first step, symbol synchronization, frequency offset, detection of 1/N frame timing is performed using time correlation detection of the SCH. The detection of 1/N frame timing is detection performed when N SCHs are multiplexed in the time domain. Details will be described later.

Figure 24:
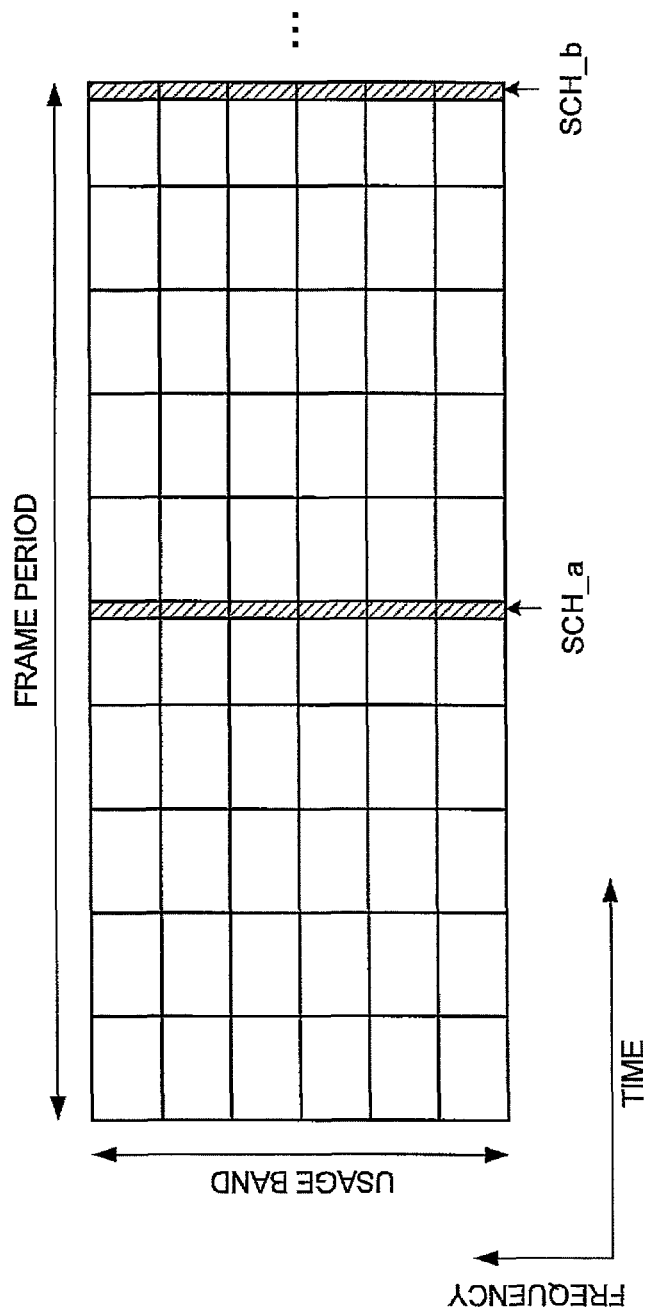
FIG. 24 is a diagram showing an example of an arrangement position of SCH (synchronization channel) in a frame.

FIG. 24 is a diagram showing an example of an arrangement position of the synchronization channel (SCH) in a frame. As shown in the figure, the SCH is arranged in an end symbol in the fifth sub-frame (SF5) and the tenth sub-frame (SF10). As described previously, in the first step, synchronization is acquired in a half period of the frame interval by detecting temporal positions of two SCHs within the frame. By configuring the SCH using a particular subcarrier, a characteristic waveform is formed in the time-axis region. In the first step, time synchronization is acquired using the waveform characteristic.

In the second step, by correlation detection in the frequency region, data forming the SCH is demodulated, and the cell specific information is acquired (such as, for example, a cell ID or cell group ID, cell structure, the number of antennas of a base station, broadcast information notifying bandwidth and the like).

In the third step, the cell ID is identified by correlation between a pilot channel multiplied by a spreading code specific to the base station corresponding to the cell ID and a replica signal of the pilot channel generated in the mobile station.

Figure 25:
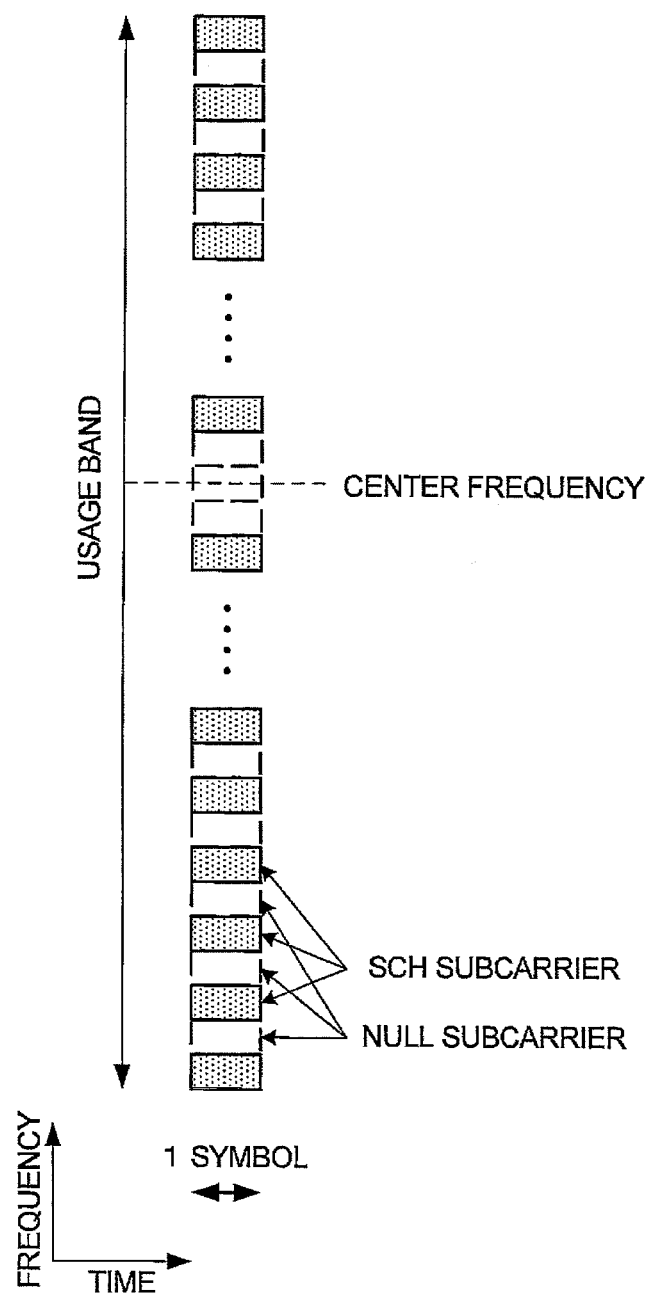
FIG. 25 is a diagram showing a structure example of SCH.

FIG. 25 is a diagram showing a structure example of the SCH. In FIG. 25, the vertical axis represents the frequency axis, and the horizontal axis represents the time axis. In the figure, each small rectangle represents a subcarrier forming the SCH, and constitutes a channel with a one-symbol length. Thus, the SCH is comprised of a plurality of subcarriers, even-numbered subcarriers from the low-frequency side and a subcarrier (DC subcarrier) with the center frequency are made null subcarriers, and signals for the SCH are assigned to odd-numbered subcarriers except the center-frequency subcarrier. In addition, the null subcarrier is a subcarrier with zero power to which a signal is not assigned.

Hereinafter, a subcarrier of the SCH assigned data is referred to as a "SCH subcarrier". By configuring in this way, a symbol assigned the SCH has a wave form in the time domain such that the same signal with a ½ symbol length is repeated twice. One or more symbols with such a channel structure are arranged in predetermined positions of a frame, and by detecting the repeated waveform with a receiver, time synchronization is acquired.

Figure 26:
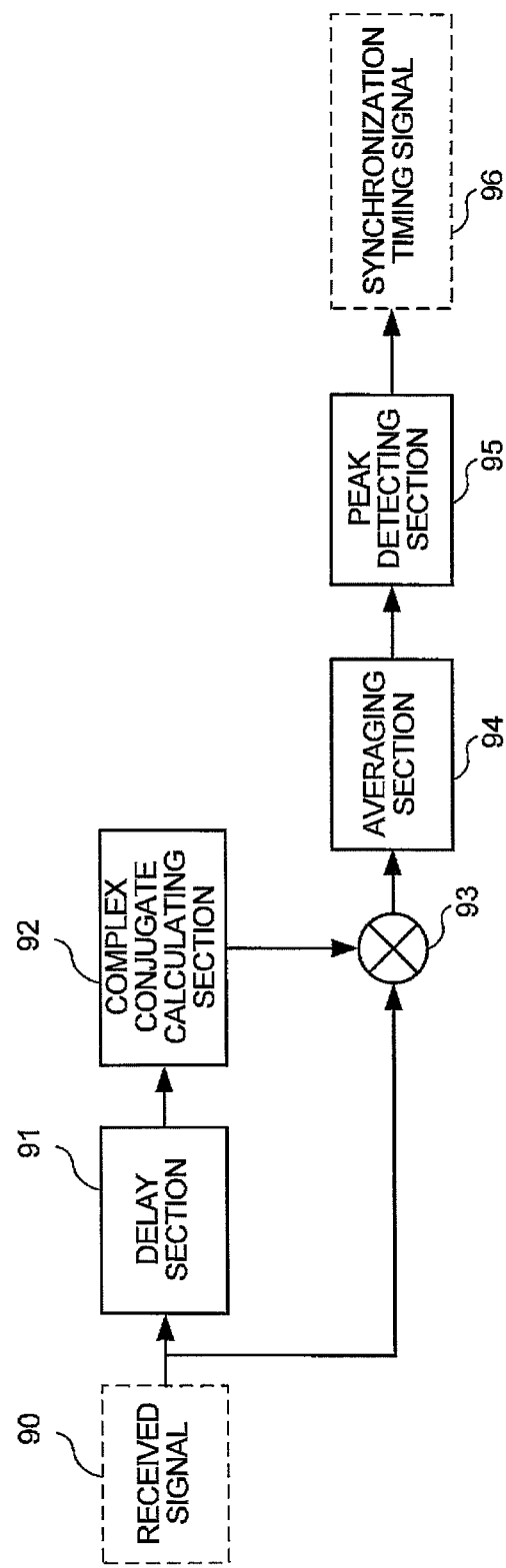
FIG. 26 is a block diagram illustrating a configuration of a receiver for detecting a repeated waveform of SCH to acquire time synchronization.

FIG. 26 is a block diagram illustrating a configuration of a receiver for detecting the repeated waveform of the SCH to acquire time synchronization. As shown in the figure, the receiver has a delay section 91 for delaying a received signal 90, complex conjugate calculating section 92, multiplying section 93, averaging section 94, and peak detecting section 95. A synchronization timing signal 96 is output from the peak detecting section 95.

In this receiver, a received signal is multiplied by a complex conjugate of a signal which is received previously and delayed by ½ effective symbol. As a result, by using the fact that the correlation value is high when matching with SCH timing of the configuration as described previously, synchronization timing is detected. As shown in FIG. 24, in the case of the system that the SCH is arranged in a position obtained by dividing a frame by N at the same time intervals (N=2 in FIG. 24), the multiplied signal is averaged over a 1/N frame interval, a peak position is detected, and it is thereby possible to acquire synchronization and symbol synchronization with accuracy in a 1/N frame. In addition, the number of SCHs in a frame and positions thereof are known to the mobile station.

Figure 27:
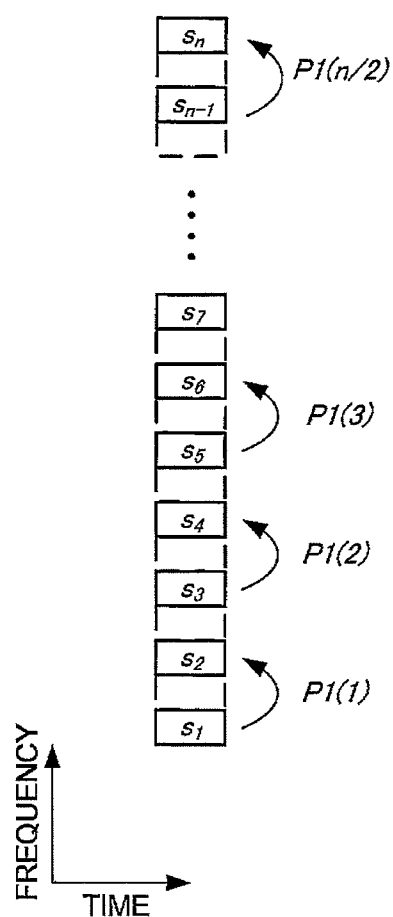
FIG. 27 is a diagram showing an example of the synchronization channel (SCH) assigned to subcarriers on the frequency axis.

FIG. 27 is a diagram showing an example of the SCH assigned to subcarriers on the frequency axis. FIG. 27 shows a scheme for calculating a phase difference P between adjacent SCH subcarriers, and thereby acquiring the information of the SCH. The information by the phase difference P between SCH subcarriers indicates a cell ID group, information indicating a position of the SCH among a plurality of SCHs in a frame, cell structure, and the number of antennas of the base station (second step). A pilot symbol replica signal is generated corresponding to each cell ID included in the cell ID group thus detected. Then, it is possible to detect the cell ID by calculating correlation with a pilot symbol arranged in a sub-frame.

Figure 28:
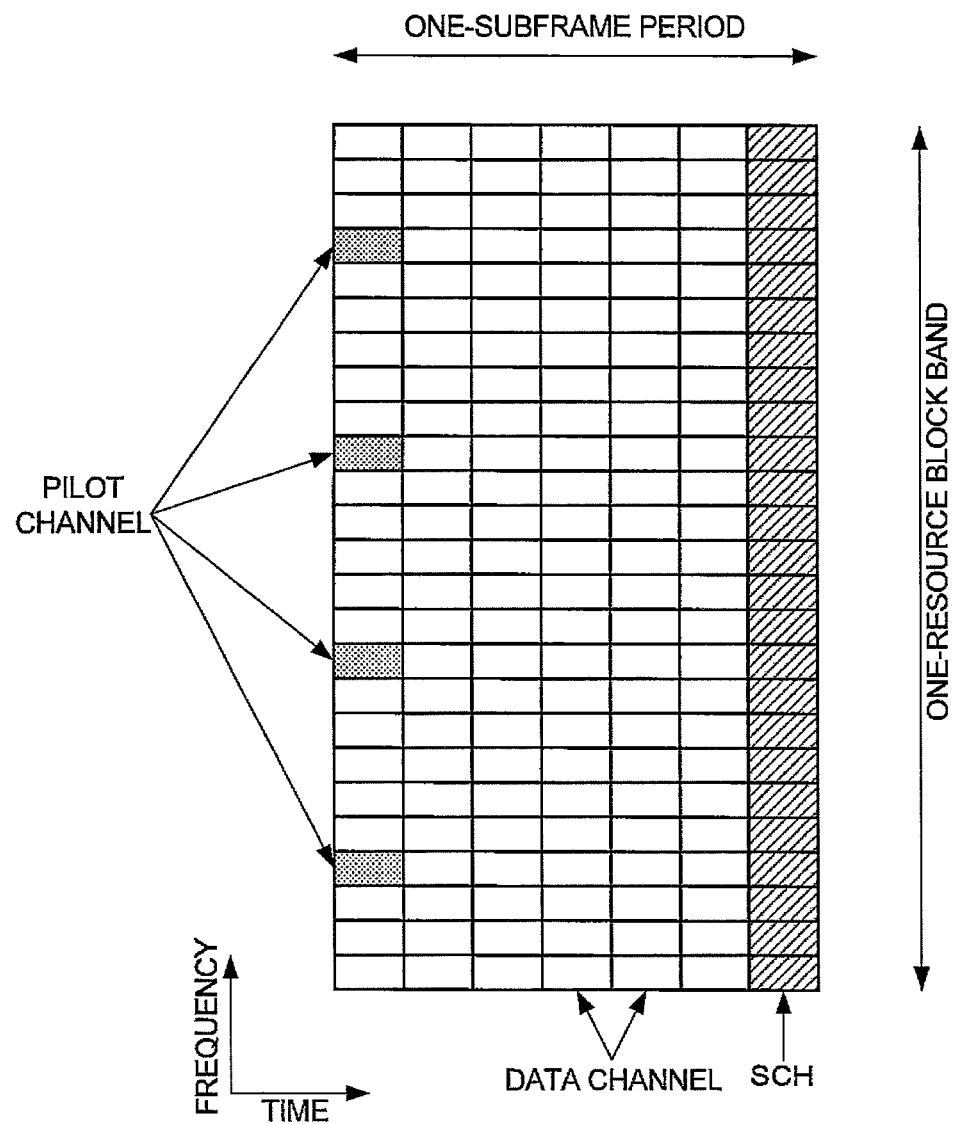
FIG. 28 is a diagram showing an example of a structure of a resource block in the OFDM communication scheme under review in the 3GPP.

FIG. 28 is a diagram showing an example of a structure of a resource block in the OFDM communication scheme under review in the 3GPP. FIG. 28 shows a typical resource block when the SCH is included. In the figure, as well as SCHs, provided are a pilot channel and data channel (including a control information channel). The pilot symbol is multiplied by a cell specific spreading code to randomize interference, and an orthogonal code to orthogonalize pilot symbols between sectors in the same cell. A pilot channel arranged in a first symbol of a frame is used for channel estimation in each sector. However, near the boundary of sectors, in a position enabling reception of a transmission signal from a different sector in the same cell, a transmission signal from an adjacent sector in the same symbol acts as an interfering signal, and channel estimation accuracy deteriorates. Therefore, used in such an environment are characteristics of an orthogonal code orthogonalized among sectors and multiplied by the pilot symbol. In other words, a propagation path estimation method is applied in which a subcarrier of a pilot channel is multiplied by a complex conjugate of an orthogonal code used in a desired sector and undergoes despreading, thereby canceling an interfering signal from the adjacent sector.

In the conventional cell search method, when a cell ID is detected using replica signals, it is required to determine a sector in the same cell that provides high signal intensity while detecting the cell ID. Therefore, it is necessary to perform correlation detection with replica signals corresponding to (the number of cell IDs) included in the cell ID group multiplied by (the number of sector IDs). In other words, in the first and second steps, it is not possible to determine reception power of a transmission signal from each sector using the SCHs concurrently transmitted from sectors in the same cell. Therefore, the processing amount required for correlation detection in the 3-step cell search increases in proportion to the number of sectors included in a cell.

When a storing section for storing results corresponding to a plurality of replica signals is provided to compare correlation values corresponding to the replica signals, it is required to prepare the number of storing sections corresponding to (the number of cell IDs) included in the cell ID group multiplied by (the number of sector IDs). Further, since each sector in the same cell transmits the same SCH data concurrently, depending on conditions of propagation paths of signals from a plurality of sectors, there is a possibility of generating consecutive subcarriers with remarkably small amplitude in the frequency region by fading, and decreasing the cell ID identification probability.

Therefore, the present invention provides a synchronization channel (SCH) with sector and cell identification functions. By this means, the invention intends to actualize a cell search without recourse to correlation detection using a pilot channel and overcome the above-mentioned inconvenience. Embodiments of the invention will be described below with reference to accompanying drawings.

Embodiment 1

Embodiment 1 describes a cell search method according to the invention. FIG. 1 is a flowchart showing an example of main procedures of multicarrier transmission processing according to the invention. As shown in the figure, a base station in a multicarrier mobile communication system adopting an OFDM communication scheme multiplies three kinds of code to generate a synchronization channel (SCH) included on downlink. In other words, the base station multiplies a "sector common code common in the same cell" by a "sector specific code (orthogonal code varying with sectors in the same cell)", and a "cell specific code (code varying with cells to transmit cell specific information)" (step S1). The sector common code may be a common code in a plurality of cells.

Next, by assignment (mapping) in the time/frequency plane, the SCH and pilot channel are assigned to subcarriers of a resource block (step S2). Then, multiplication of spreading code and IFFT processing is executed (steps S3 and S4). Performed next is insertion of a GI (Guard Interval, also referred to as CP (Cyclic Prefix)), and D/A conversion processing (steps S5 and S6). Finally, frequency conversion is performed, and a multicarrier signal is transmitted from a directional antenna of each sector (step S7).

Figure 2:
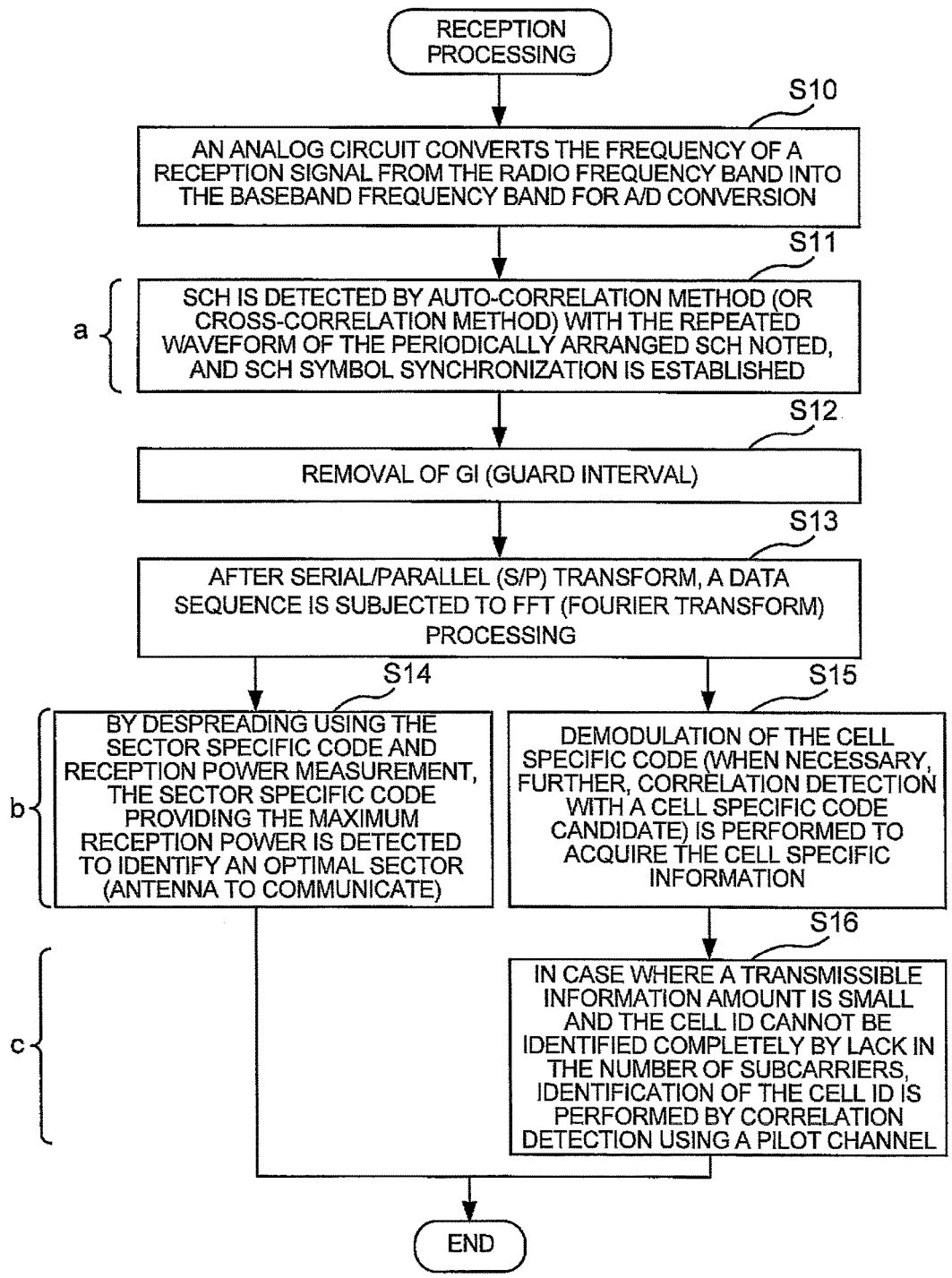
FIG. 2 is a flowchart showing an example of main procedures of multicarrier reception processing according to the invention.

FIG. 2 is a flowchart showing an example of main procedures of multicarrier reception processing according to the invention. A mobile station receives the multicarrier signal from the base station, and executes frequency conversion and A/D conversion (step S10). In addition, the mobile station includes a cellular telephone device, PDA terminal, and portable personal computer.

Next, by the auto-correlation method focusing on a repeated waveform of the SCH periodically arranged, the mobile station detects SCH positions, and establishes SCH symbol synchronization (step S2). This step S2 corresponds to the first step (step a) of the cell search. Next, the mobile station removes the GI (step S12), and performs serial/parallel transform and FFT (Fast Fourier Transform processing) (step S13).

Thereafter, the sector identification processing and cell identification processing is performed at the same time (the second step (step b) of the cell search). In other words, by despreading using the sector specific code, the mobile station detects a sector specific code providing maximum reception power, and identifies an optimal sector (antenna of the base station with which the mobile station should communicate) (step S14). Further, in parallel with the processing, the mobile station demodulates the cell specific code (further, correlation detection with the cell specific code when necessary) to acquire the cell specific information (cell ID and the like) (step S15).

When the number of subcarriers is adequate, identification of the cell and sector is completed by this 2-step cell search. However, when subcarriers lack in number, in step S15, the cell ID cannot be identified directly, and the cell ID group is only identified. In this case, the mobile station executes identification of the cell ID by correlation detection using a pilot channel (step S16). This case is the 3-step cell search (step c).

Described next is generation of sector specific codes (codes orthogonalized for each sector). Herein, the case is descried where the number of sectors is "3", and three mutually orthogonal codes are generated.

Figure 3:
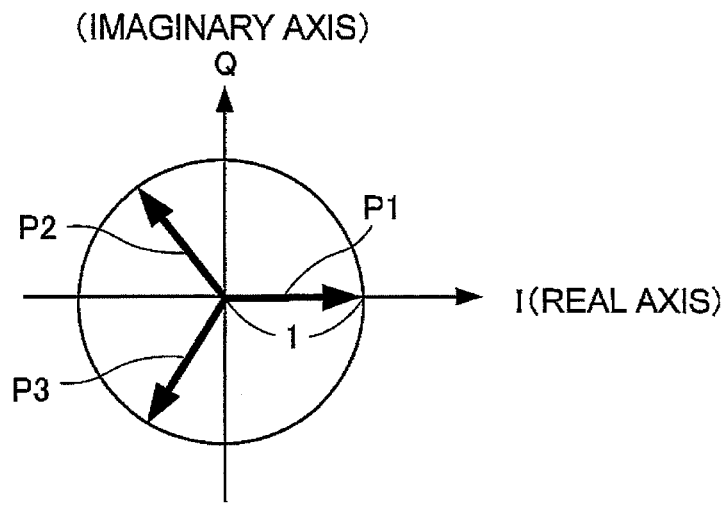
FIG. 3 is a diagram showing a basic concept of orthogonal code generation.

FIG. 3 is a diagram showing a basic concept of orthogonal code generation. As shown in the figure, three vectors are set on the complex phase plane. The complex phase plane is the IQ plane where the I axis corresponds to the real axis, and the Q axis corresponds to the imaginary axis. On the complex phase plane are set three vectors, P1, P2 and P3, with the amplitude of "1" forming an angle of 120° with respect to one another. Vector addition of three vectors cancels the imaginary-axis components of vectors P2 and P3. Further, the result (=−1) of addition of real-axis components of vectors P2 and P3 and vector P1 (=+1) cancel each other out, and the result of vector addition is "0". Three orthogonal codes are generated by using three vectors having such a relationship.

Figure 4:
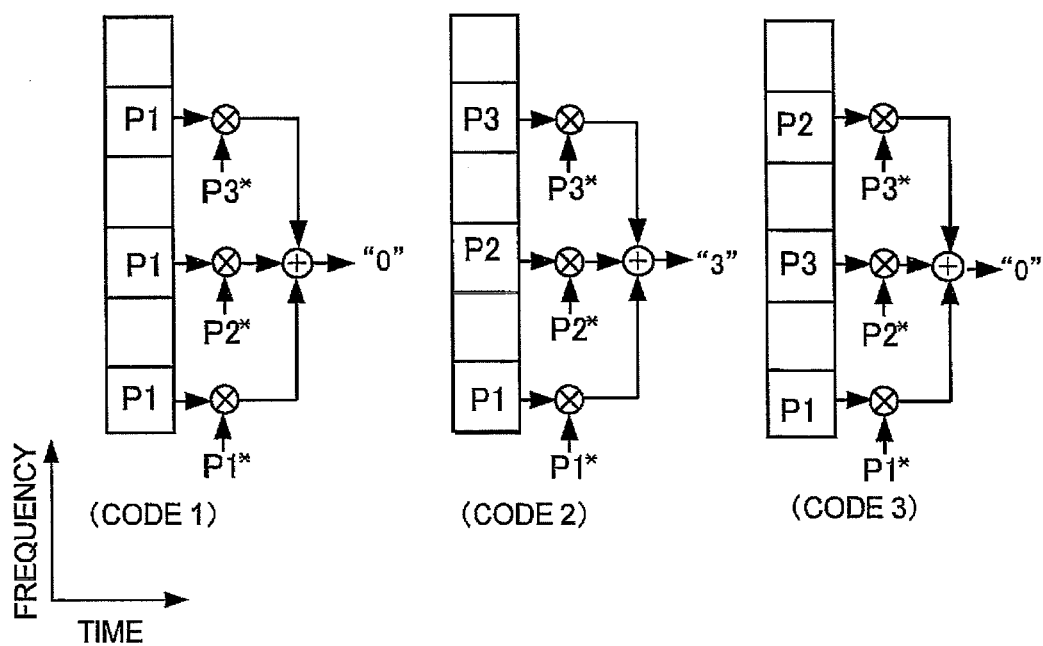
FIG. 4 is a diagram to explain an arrangement of code elements constituting three orthogonal codes (code 1, code 2 and code 3) and principles in demodulating only code 2.

FIG. 4 is a diagram to explain an arrangement of code elements constituting three orthogonal codes (code 1, code 2 and code 3) and principles in demodulating only code 2. In the figure, the horizontal axis represents the time axis, and the vertical axis represents the frequency axis. As shown in FIG. 4, it is assumed that (code 1)=(P1, P1, P1), (code 2)=(P1, P2, P3), and that (code 3)=(P1, P3, P2). Each code is formed using any one of three vectors of FIG. 3 as a code element. Codes 2 and 3 use the same code elements, but are different in arrangement on the frequency axis.

Herein, for example, a case is assumed that only code 2 is demodulated. In this case, each of code elements P1, P2 and P3 of code 2 is multiplied by a respective complex conjugate. By this means, the phase rotates, and the imaginary-axis components are canceled. When each multiplication result is added, since three real-axis components (=1 each) are added, the correlation detection result is "3". The same complex conjugate is similarly multiplied by code 1 and code 3 to add. As a result, with respect to any codes, the phase of each code element rotates, and eventually, vectors P1, P2 and P3 do not disappear, and remain. Therefore, adding the vectors provides an addition result of "0" (see FIG. 3). It is thus possible to extract only code 2. The aforementioned description is the same as in the case of extracting only code 1 or code 3. Thus, codes 1 to 3 in FIG. 4 are orthogonal to one another with three code elements (three chips) as a group.

In addition, in the invention, the number of sectors is not limited to "3". There is a case that the number of sectors is "4" or more. Also in this case, by using the above-mentioned philosophy, it is possible to generate orthogonal codes in response to the number of sectors with ease. In other words, the number of orthogonal vectors in FIG. 3 is increased, and the vectors are arranged on the frequency axis using the technique of FIG. 4. By this means, it is possible to generate the higher number of codes. That is, as the number of code elements of a group arranged on the frequency axis increases, it is possible to generate the higher number of orthogonal codes. Accordingly, it is possible to flexibly cope with the case that the number of sectors increases.

It is described next how to multiplex the cell specific information on the SCH. The cell specific information includes a cell ID, broadcast channel bandwidth, antenna arrangement, GI length and the like.

Figure 5:
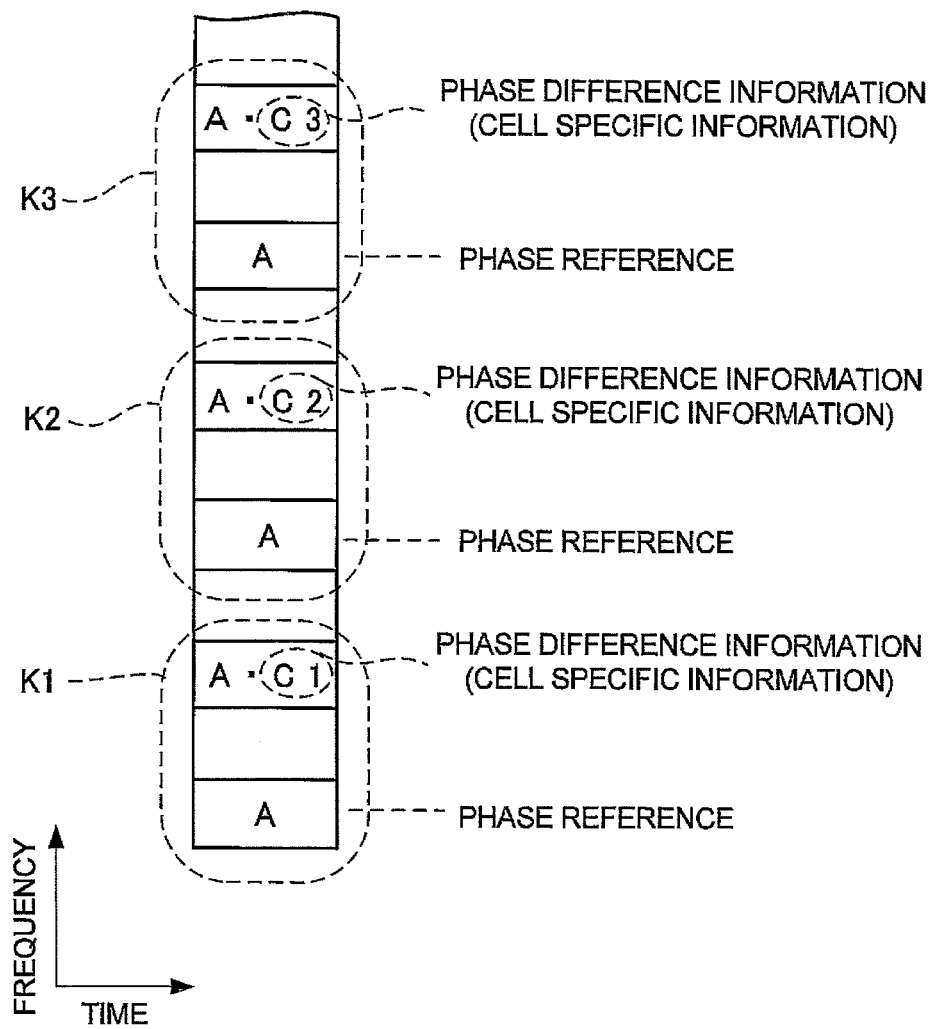
FIG. 5 is a diagram to explain a method of multiplexing cell specific information (sector ID, broadcast channel bandwidth, antenna arrangement, GI length and the like) on SCH.

FIG. 5 is a diagram to explain a method of multiplexing the cell specific information on the SCH. In FIG. 5, the horizontal axis represents the time axis, and the vertical axis represents the frequency axis. In FIG. 5, a subcarrier as a phase reference is assigned code A. Then, a subcarrier adjacent to the subcarrier as a reference phase is assigned code (C1, C2, C3 . . . ) indicating a phase difference from the subcarrier. The cell specific code to transmit the cell specific information is formed using code "A" as a phase reference and the code (C1, C2, C3 . . . ) indicating the phase difference. In other words, the cell specific information is not an absolute phase of a subcarrier, but is transmitted as information indicating a relative phase difference between a pair of subcarriers. In FIG. 5, K1, K2, K3 . . . enclosed by dotted lines indicate a pair of subcarriers.

Described next are characteristics of a code format to concurrently transmit the sector specific information and cell specific information using the SCH. As shown in FIG. 4, when three sectors are distinguished from one another, it is enough to prepare mutually orthogonal codes of 3-chip cycle. However, when the cell specific information is also transmitted at the same time, it is not possible to support such transmission by codes with the simple structure as shown in FIG. 4. Particularly, in the case of using relative phase difference information between subcarriers as shown in FIG. 5, it is difficult to transmit the cell specific information with the code of the structure as shown in FIG. 4.

In other words, both of the sector specific information and cell specific information is transmitted in phase modulation of subcarriers, and one information should not have an adverse effect on the other information. In addition to the aforementioned respect, the receiving side needs to be able to demodulate both of the information at the same time to make a cell search fast. Therefore, used are two orthogonal 3-chip (three code elements) groups as shown in FIG. 4. The elements are combined on the frequency axis to map, and codes are formed using six chips (six code elements) as a group (i.e. the six chips are a generation unit).

FIGS. 6A to 6D are diagrams to explain a code format to multiplex the sector specific information and the cell specific information on the SCH to transmit. In FIG. 6A, two orthogonal 3-chip (three code elements) groups as shown in FIG. 4 are used, and combined on the frequency axis to arrange. Then, FIG. 6A shows an example of an arrangement of chips in the case of using these six chips (six code elements) as a group to form a code. Herein, these six chips are used as a structure unit.

FIG. 6A shows a manner that three chips (=P1, P2, P3) and other three chips (=P1, P2, P3) are arranged such that code elements of the same value are adjacent to each other on the frequency axis, and thus, the groups are alternated and arranged. By this means, a 6-chip code (=P1, P1, P2, P2, P3, P3) is generated as shown in FIG. 6B. Three chips of the 6-chip code are used as a sector specific code, and the other three chips are used to multiply the cell specific information.

In other words, as shown in FIG. 6C, three odd-numbered chips (=P1, P2, P3) are used for correlation detection (sector identification) by the technique as shown in FIG. 4. Meanwhile, three even-numbered chips (=P1, P2, P3) are multiplied respectively by codes (C1 to C3) indicating relative phase difference information as the cell specific information. As shown in FIG. 5, the "relative phase difference information" is "information of a phase difference between subcarriers multiplied by the cell specific code of the same value". In FIG. 6C, each subcarrier assigned one of three odd-numbered chips (=P1, P2, P3) is a phase reference subcarrier.

For example, two subcarriers are paired that are assigned a sector specific code with the same value of (P1, P1), P1 on the high-frequency side is multiplied by C1 indicating a phase difference, and the C1 is used as a code to convey the cell specific information. Similarly, two subcarriers are paired that are assigned a sector specific code with the same value of (P2, P2), P2 on the high-frequency side is multiplied by C2 indicating a phase difference, and the C2 is used as a code to convey the cell specific information. In addition, in FIG. 6C, codes C1, C2 and C3 indicating the phase difference information are circled by dotted lines. Cn=(C0, C1, C2 . . . ) is the cell specific code.

In the above-mentioned descriptions, for the sake of convenience, the order is described in which the "sector specific code" is assigned to a subcarrier, and then, the "cell specific code" is further assigned. However, such a case may occur actually that assignment (multiplication) of the "cell specific code" is performed prior to assignment (multiplication) of the "sector specific code". The same result is obtained when either multiplication is performed first. In other words, the sector common code ($S_0$), cell specific code, and sector specific code are multiplied by the SCH triply as a result. Therefore, it is not an essential problem performing multiplication of the cell specific code, or multiplication of the sector specific code earlier. In addition, the above-mentioned "sector common code ($S_0$)" is a common code in a plurality of sectors in the same cell, and is sometimes referred to as simply a "sector common code" in this description.

In the case of the code structure as shown in FIG. 6C, since subcarriers assigned the sector specific code of the same value are adjacent to each other and arranged on the frequency axis, the probability is high that both of the subcarriers arrive at the receiving side through equivalent propagation paths. Therefore, there is an advantage capable of neglecting a phase rotation by the difference in the transfer function of the propagation path. Accordingly, the receiving side is capable of detecting only a phase difference between adjacent subcarriers caused by the cell specific code with accuracy. It is thereby possible to demodulate the cell specific information.

In addition, the structure of the sector specific code is not limited to the structure as shown in FIG. 6B. For example, as shown in FIG. 6D, three sector chips (P1, P2, P3) are simply aligned on the frequency axis in a two-stage manner. With respect to transmission of the cell specific information, for example, two subcarriers assigned the sector specific code with the same value of (P1, P1) are paired, P1 on the high-frequency side is multiplied by C1 indicating a phase difference, the C1 is made the cell specific information, and in this respect, the transmission is the same as that in the case of FIG. 6C.

Thus, in the invention, the synchronization channel (SCH) is multiplied by the sector specific code orthogonalized for each sector. In other words, SCHs that are not orthogonal on sectors are orthogonalized. Then, sector identification is allowed by reception power measurement using the SCH, and even in the boundary of sectors, good frequency characteristics enable sector identification with high quality. Further, it is possible to identify also a cell ID by multiplying the SCH by the cell specific code to concurrently transmit.

Accordingly, it is possible to actualize a new 2-step cell search method, substituting for the conventional 3-step cell search method using both the SCH and CPICH. It is thereby possible to reduce the processing process of a cell search including sector identification. Further, devising is required in code structure to multiply by the SCH to achieve both of identification of sector and identification cell, and in the invention, orthogonal codes having a plurality of chips as a unit are paired and used. In other words, one of codes having the same value is further multiplied by a code indicating a relative phase difference, and the cell specific information is transmitted by the relative phase difference. By this means, the code is simplified and made compact, while it is possible to transmit the identification information of both of the sector and cell.

As a result, any particular loads are not imposed on the multicarrier transmission/reception apparatus. Further, the multicarrier reception apparatus is capable of implementing identification of the sector ID and demodulation of the cell specific information at the same time, and performing the efficient cell search.

Embodiment 2

This Embodiment describes a data structure of the SCH and a cell search method including sector identification, using the case where the SCH is arranged at the end of a sub-frame, as an example.

A cellular system is a mobile communication system comprised of a plurality of cells, and a cellular system used in this Embodiment is a one-cell reuse communication system in which each cell uses the same frequency band, and an OFDMA communication scheme is used as a communication scheme. As shown in FIG. 23, in this communication system, a cell is divided into three communication areas (sectors), and a base station located in the center of the cell performs wireless communication with mobile stations positioned in a plurality of sectors. The same frequency band is used in each sector, a pilot channel is multiplied by an orthogonal code specific to the sector, and by using despreading, accurate propagation path estimation can be made even near the sector boundary.

A downlink communication scheme is the same OFDM communication scheme as in the foregoing. Structures of a communication frame and resource block have the same formats as those shown in FIGS. 22 and 28. Further, this Embodiment adopts a structure where the SCH is arranged at the end of a time period obtained by dividing a frame into Ss (Ss is a submultiple of the number Sf (natural number) of sub-frames). By this means, the SCH is arranged periodically on the time axis. In the Embodiment as shown in FIG. 24, Sf is "10", and Ss is "2".

With respect to a pilot channel, this Embodiment uses a Code Division Multiplex (CDM) scheme that is a scheme for multiplexing on the same subcarrier of the same symbol among sectors. However, the invention is applicable to schemes, such as a Frequency Division Multiplex (FDM) scheme for multiplexing on different subcarriers of the same symbol, a Time Division Multiplex (TDM) for multiplexing on the same subcarriers of different symbols and the like, where pilot channels of sectors are mutually orthogonal.

In this Embodiment, a base station transmits a signal multiplied by a code sequence corresponding to an orthogonal code to multiply by a pilot channel in CDM, as the SCH transmitted from each sector. By this means, in determining reception power of a signal from the base station, a mobile station is capable of achieving good frequency characteristics even in the sector boundary, by spreading effect of the code. Together therewith, it is possible to determine reception power for each sector. In addition, the code sequence corresponding to an orthogonal code to multiply by a pilot channel does not need to always be the same as a code sequence multiplied by the pilot channel.

Described first is a specific structure of a physical channel (hereinafter, referred to as a "SCH") for a mobile station to acquire synchronization of time and frequency of a transmission signal transmitted from a base station in the mobile communication scheme in this Embodiment.

Figure 7:
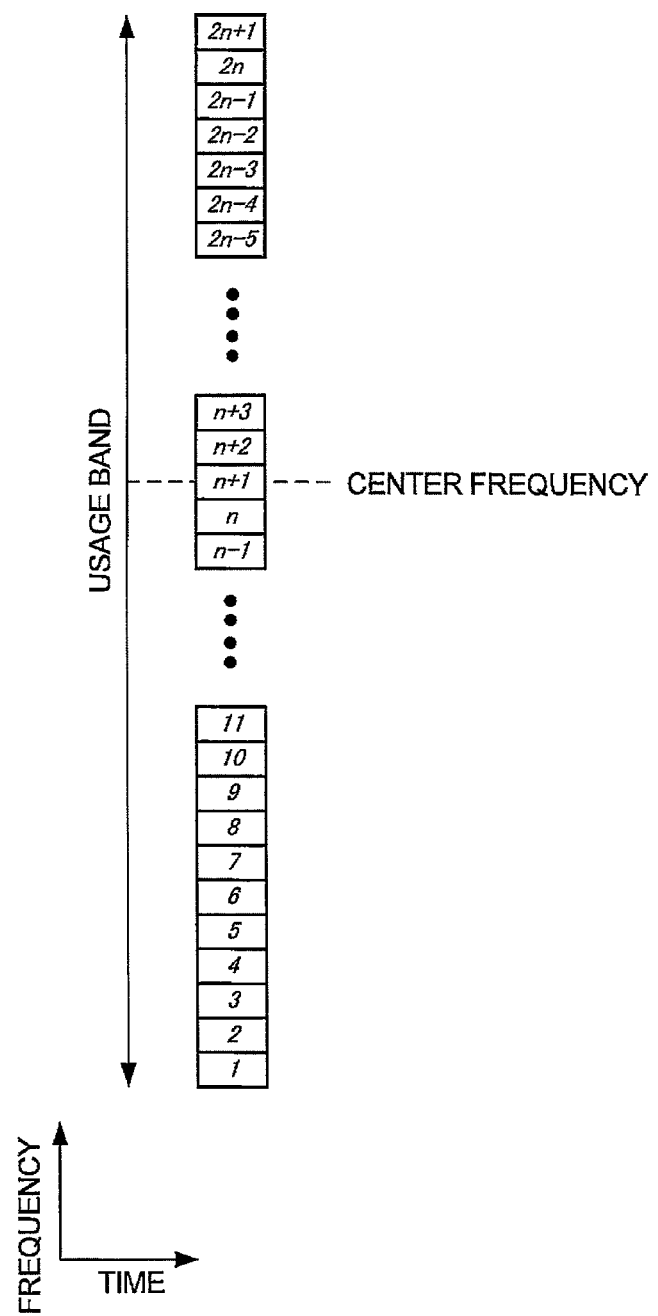
FIG. 7 is a diagram showing subcarrier indexes (subcarrier numbers) on the frequency axis.

FIG. 7 is a diagram showing subcarrier indexes (subcarrier numbers) on the frequency axis. As shown in the figure, a subcarrier number on the lowest frequency side (lowermost end) is "1", and a subcarrier number in the center frequency is "n+1". In the following descriptions, these subcarrier indexes are used as appropriate.

Figures 8A, 8B, 8C:
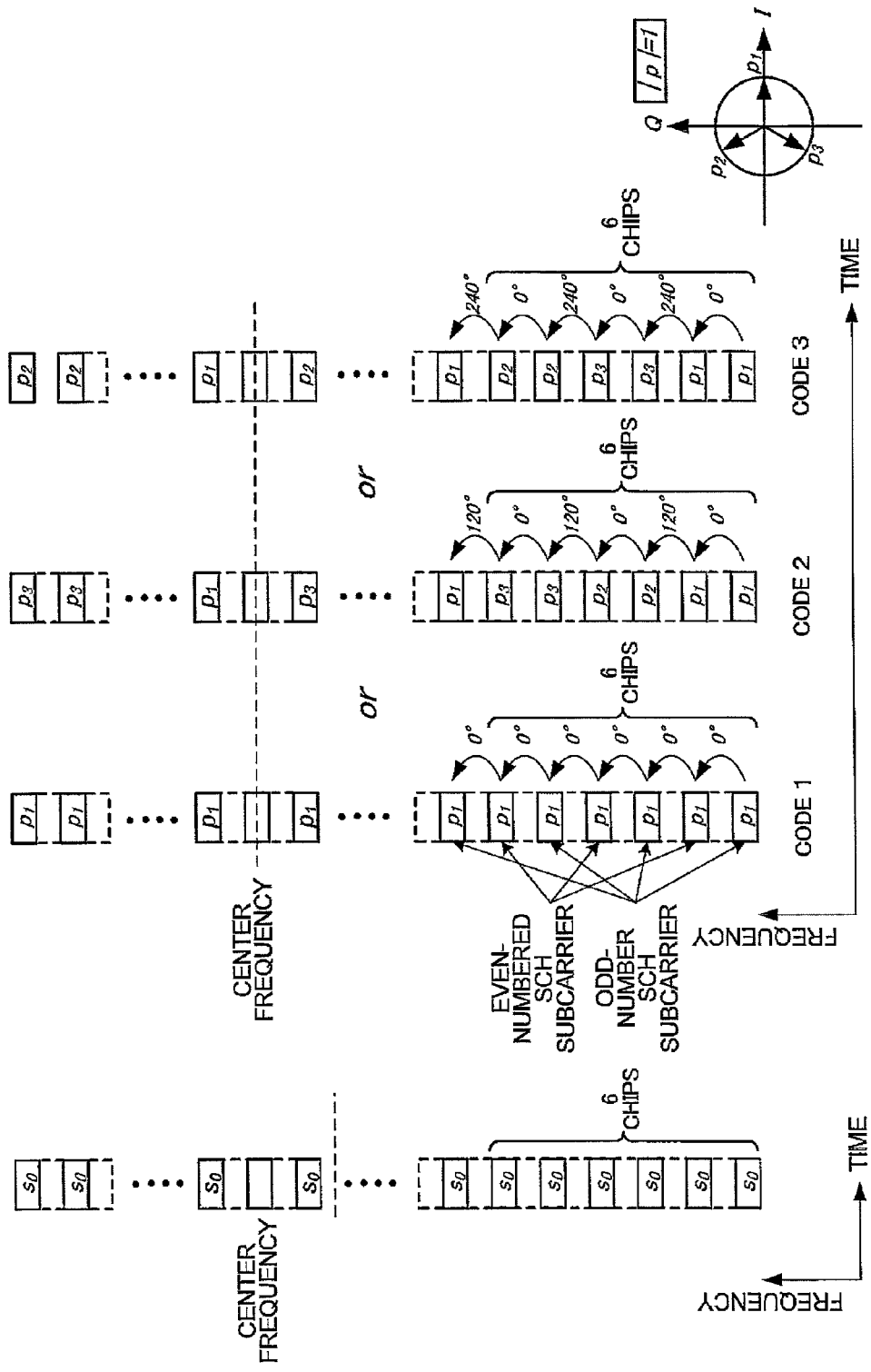
FIG. 8A is a diagram showing an assignment of a sector common code on the frequency axis.
FIG. 8B is a diagram showing structures of three sector specific codes.
FIG. 8C is a diagram showing the basic concept of generation of the sector specific code.

FIGS. 8A to 8C are diagrams to explain a data structure of the SCH concurrently transmitted from three sectors in the same cell. FIG. 8A is a diagram showing an assignment of a sector common code on the frequency axis, FIG. 8B is a diagram showing structures of three sector specific codes, and FIG. 8C is a diagram showing the basic concept of generation of the sector specific code, and shows vectors on the complex phase plane.

A frame of a signal transmitted from a base station is comprised of a plurality of symbols. FIG. 8 shows the diagrams with SCH data of a plurality of symbols focused. In FIG. 8, the vertical axis represents the frequency axis, while the horizontal axis represents the time axis. With respect to each subcarrier, as in the case shown in FIG. 4, null subcarriers are even-numbered subcarriers (subcarrier indexes $2, 4, 6 \ldots, 2n$) from the low-frequency side and the center-frequency subcarrier. Then odd-numbered subcarriers (subcarrier indexes $1, 3, 5 \ldots, 2n+1$) except the center-frequency subcarrier are used as subcarriers for data assignment.

The signal as shown in FIG. 8A indicates a sector common code. Each SCH subcarrier is assigned $S_0$. $S_0$ is an arbitrary value expressed by $A^*\exp(j\omega)$. A represents the amplitude, j represents an imaginary unit, and $\omega$ represents a phase. In addition, in this description, the explanation is made with the amplitude A being "1". The sector common code $S_0$ is common in all the sectors within each cell, and can be used to randomize signals among cells.

The sector specific code will be described below. FIG. 8B shows the case where the sector specific codes are used in three sectors. The codes are specific to respective sectors in the same cell, and codes 1 to 3 support three sectors in this Embodiment. It is assumed that the mobile station and base station beforehand know about correspondence between the codes and sector IDs in the same cell. In code sequences to be multiplied by SCH subcarriers as the sector specific code, phase differences from odd-numbered SCH subcarriers (subcarrier indexes $1, 5, 9 \ldots$) from the low-frequency side to even-numbered subcarriers (subcarrier indexes $3, 7, 11, \ldots$) are 0°, 0° and 0° in each sector. Phase differences from even-numbered SCH subcarriers to odd-numbered subcarriers are 0°, 120° or 240° in each sector.

Each code is a code with the amplitude of "1". Further, since these code sequences are of 6-chip reuse (one period is six chips), the number n of SCH subcarriers is an integral multiple of "6". With attention drawn to one reuse part (six chips) of these three code sequences, when a complex conjugate of an arbitrary code sequence is multiplied by each code sequence and consecutive three chips are added every four chips, the sum is "0" in the case of multiplying code sequences except the selected arbitrary code sequence, while being "3" in the case of multiplying the arbitrary code sequence.

For example, the case is considered of $(\exp(j0\pi), \exp(j0\pi), \exp(j0\pi), \exp(j0\pi), \exp(j0\pi), \exp(j0\pi))$ of code 1, $(\exp(j0\pi), \exp(j0\pi), \exp(j2\pi/3), \exp(j2\pi/3), \exp(j4\pi/3), \exp(j4\pi/3))$ of code 2, and $(\exp(j0\pi), \exp(j0\pi), \exp(j4\pi/3), \exp(j4\pi/3), \exp(j2\pi/3), \exp(j2\pi/3))$ of code 3. When code 2 is selected as an arbitrary code, a complex conjugate of code 2 is $(\exp(j0\pi), \exp(j0\pi), \exp(-j2\pi/3), \exp(-j2\pi/3), \exp(-j4\pi/3), \exp(-j4\pi/3))$. Codes obtained by multiplying codes 1 to 3 by the complex conjugate of code 2 are respectively $(\exp(j0\pi), \exp(j0\pi), \exp(-j2\pi/3), \exp(-j2\pi/3), \exp(-j4\pi/3), \exp(-j4\pi/3))$, $(\exp(j0\pi), \exp(j0\pi), \exp(j0\pi), \exp(j0\pi), \exp(j0\pi), \exp(j0\pi))$, and $(\exp(j0\pi), \exp(j0\pi), \exp(j2\pi/3), \exp(j2\pi/3), \exp(-j2\pi/3), \exp(-j2\pi/3))$. Further, when odd-numbered chips and even-numbered chips are subjected to vector addition, the results are (0,0), (3,3) and (0,0). Thus, the code sequences have characteristics that the sum of the codes except code 2 selected as an arbitrary code is "0". This means that in concurrently transmitting the SCH of the same data multiplied by an orthogonal code (FIG. 8B) corresponding to each sector from each sector in the same cell, a mobile station receiving the SCH performs despreading of the SCH every three predetermined chips, and is thereby capable of separating a signal from an arbitrary sector from an interfering signal from an adjacent sector.

Figure 9:
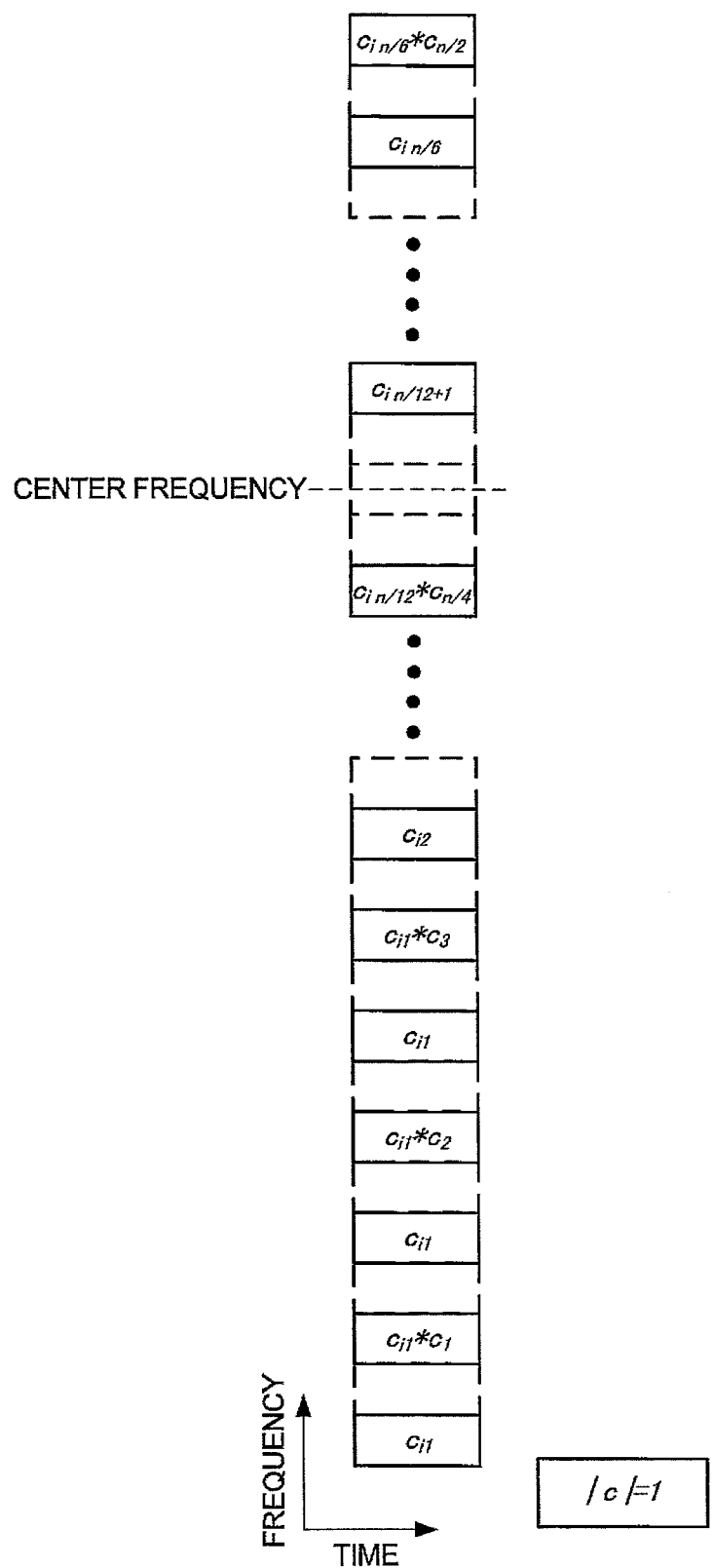
FIG. 9 is a diagram showing a structure of a code sequence to transmit the cell specific information on the frequency axis.

Described next is a code sequence to transmit the cell specific information. FIG. 9 is a diagram showing a structure of a code sequence to transmit the cell specific information on the frequency axis. Since the code sequence as shown in FIG. 9 is a code sequence to transmit the cell specific information, different code sequences are used between cells, while the same code sequence is used among sectors in the same cell. The cell specific information is a cell ID or information of a specific spreading code used in the cell, information of the number of antennas of the base station and system bandwidth, and the like. The cell specific information includes information required for a mobile station to first connect to the base station.

However, the spreading code information is an extremely high number of codes depending on the code length constituting the information, and there is a case that codes as shown in FIG. 9 lack in the information amount to notify. In such a case, it is possible to group some cells (spreading codes), and generate a code sequence by the same information in the cells belonging to the group. In this case, since the spreading code specific to the cell is not completely identified from the information of the SCH, an ultimate cell specific spreading code is identified using a pilot channel multiplied by the spreading code.

The code sequence of FIG. 9 is formed using six chips as a group from the low-frequency side. In the six chips, odd-numbered SCH subcarriers (subcarrier indexes 1, 5, 9) are assigned the same code. Further, even-numbered SCH subcarriers (subcarrier indexes 3, 7, 11) are assigned a code obtained by multiplying the code assigned to the odd-numbered subcarriers by the cell specific code. The codes assigned to odd-numbered subcarriers are the same among six chips, but do not need to be the same as those used in other six chips. Each chip forming a code sequence has the amplitude of "1". Further, as the code length, when the number of SCH subcarriers is n, a code sequence with the code length of n/2 is required to form the even-numbered subcarriers. Since the code length is dependent on the number of SCH subcarriers, generally, it is possible to generate the high number of code sequences with good correlation characteristics when the number of SCH subcarriers is sufficiently high. Therefore, instead of the code sequence indicating a cell ID group as described previously, it is made possible to form using a code sequence containing information directly indicating the cell ID.

Three kinds of code sequences as shown above are code sequences constituting the SCH, and the SCH multiplied by these code sequences is transmitted from a transmitter of each sector. A configuration of a base station will be described below.

Figure 10:
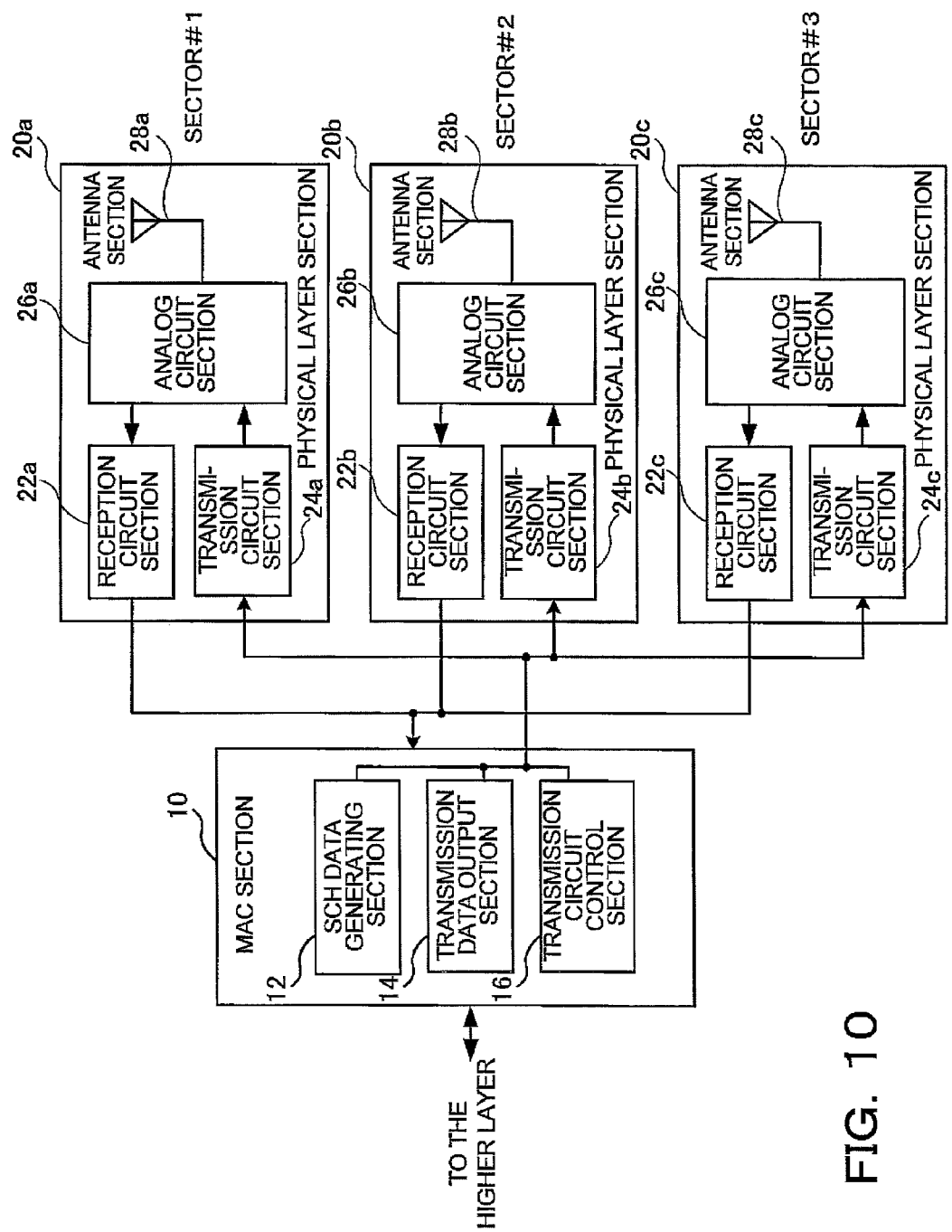
FIG. 10 is a block diagram showing a configuration example of a physical layer and MAC (Media Access Control) sub-layer in a base station (multicarrier transmission apparatus) of the mobile communication system.

FIG. 10 is a block diagram showing a configuration example of a physical layer and MAC (Media Access Control) sub-layer in a base station (multicarrier transmission apparatus) of the mobile communication system. As shown in figure, the base station has a MAC section 10 that performs mapping of a logical channel and physical channel, scheduling processing, and control of the physical layer section, and outputs data input from a higher layer to the physical layer section, while outputting data input from the physical layer section to the higher layer, and physical layer sections 20a to 20c that perform transformation of transmission data input from the MAC section 10 to a radio transmission signal, and transformation of a radio reception signal received in an antenna section to transmission data based on control information from the MAC section.

The MAC section 10 has a transmission circuit control section 16 that controls transmission circuit sections based on allocation information of each resource block of a frame notified from the higher layer, a transmission data output section 14 that inputs data of physical channels such as a data channel of each resource block, pilot channel and the like to the transmission circuit sections in accordance with timing subjected to scheduling, and a SCH data generating section 12 that generates or stores cell specific data to assign to the SCH.

In this Embodiment, the SCH is a channel for a mobile station to synchronize temporally with a frame and symbol transmitted from the base station to acquire the cell specific information. Therefore, when the SCH data is not variable, the MAC section 10 does not need to always generate data for each transmission, and the data is stored in the MAC section 10 or each physical layer section (20a to 20c) corresponding to the sector, assigned to a symbol in accordance with the SCH transmission timing, and is capable of being transmitted on a regular basis. In this Embodiment, the SCH data generating section 12 in the MAC section 10 generates the SCH data, and the physical layer section (20a to 20c) of each sector can be provided with this function to execute.

The SCH data is input to the physical layer sections (20a to 20c) from the MAC section 10 together with the data of other data channels. The SCH data and data of the data channel is input to the physical layer sections (20a to 20c) together with allocation control information of each resource block notified from the transmission circuit control section 16 of the MAC section 10, and the data is allocated to each resource according to the allocation information of the resource block.

Each of the physical layer sections (20a to 20c) has a transmission circuit section (24a to 24c) which performs modulation and multiplication of the sector specific code on the data channel, pilot channel and SCH input from the MAC section 10 to multiplex on the resource block, and inputs the resultant to an analog circuit section (26a to 26c), a reception circuit section (22a to 22c) that demodulates an output from the analog circuit section (26a to 26c) to input to the MAC section 10, the analog circuit section (26a to 26c) that converts a transmission signal input from the transmission circuit section (24a to 24c) into a radio-frequency signal, while converting a reception signal received in an antenna section (28a to 28c) into a frequency-band signal capable of being processed in the reception circuit (22a to 22c), and an antenna section 28 (having directional antennas 28a to 28c corresponding to the sectors) that transmits a transmission signal input from the analog circuit section (26a to 26c) to radio space, while receiving a signal in the radio space, respectively.

Figure 11:
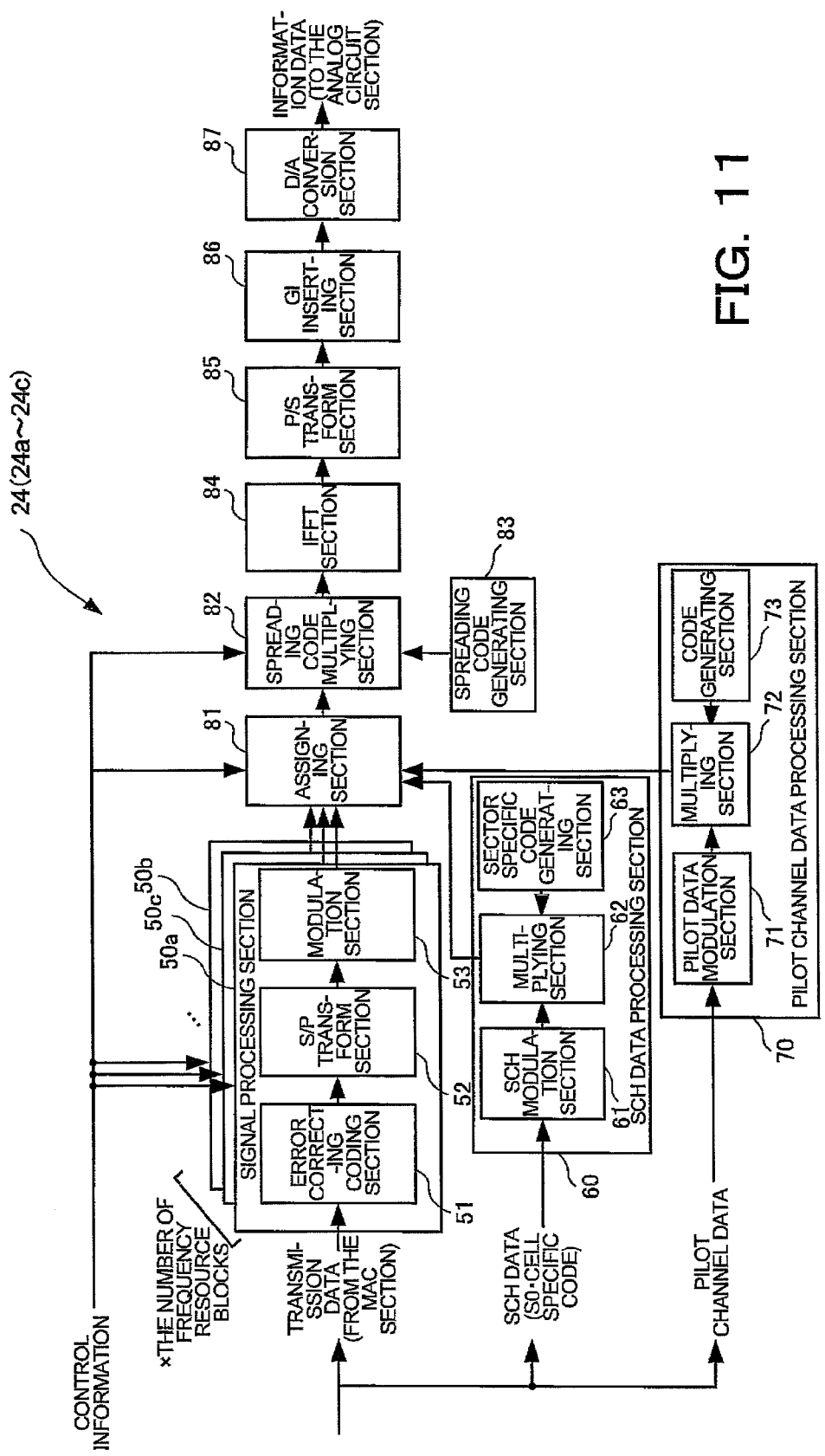
FIG. 11 is a block diagram illustrating a specific configuration of a transmission circuit section as shown in FIG. 10.

Described next is a specific internal configuration of the transmission circuit section (24a to 24c). FIG. 11 is a block diagram illustrating a specific configuration of the transmission circuit section as shown in FIG. 10. The transmission circuit section 24 (reference numerals 24a to 24c in FIG. 10) performs coding and modulation on the data channel and pilot channel input from the MAC section 10, while modulating the SCH data as described previously to multiply the sector specific code, and multiplexes the SCH, data channel, and pilot channel on a resource block to transmit in an assigning section, based on a control signal from the MAC section.

"SCH data" in FIG. 11 indicates code data obtained by multiplying the sector common code (see FIG. 8A) by the cell specific code (see FIG. 9). Then, the code data is multiplied by the sector specific code (see FIG. 8B) in the physical layer section of each sector and transmitted.

The transmission circuit section 24 (24a to 24c) as shown in FIG. 11 has a signal processing section 50 (50a to 50c) that performs signal processing of transmission data on the data channel input from the MAC section 10 for each resource block, and a SCH data processing section 60 that performs modulation and multiplication of the sector specific code on the SCH data also input from the MAC section 10. Further, the section 24 has a pilot channel data processing section 70 that performs modulation and multiplication of a sector specific orthogonal code on the pilot channel data also input from the MAC section 10, and an assigning section 81 that assigns an output signal from the signal processing section 50 (50a to 50c), an output signal from the SCH data processing section 60, and an output signal from the pilot channel data processing section 70 to each subcarrier of a resource block.

The section 24 further has a spreading code multiplying section 82 that multiplies a spreading code using a spreading code generated in a spreading code generating section 83, an IFFT section (Inverse Fast Fourier Transform) section 84 that transforms a data signal sequence in the frequency domain subjected to spreading processing into a time waveform, a P/S transform section 85 that performs parallel/serial transform on an output from the IFFT section 84, a GI inserting section 86 that inserts a GI into an output signal of the P/S transform section 85, and a D/A conversion section 87 that converts an output signal of the GI inserting section 86 from a digital signal to an analog signal. Both of the assigning section and spreading code multiplying section 82 perform the processing based on control information from the MAC section 10. The assigning section 81 assigns each physical channel to a desired subcarrier. The spreading code multiplying section 82 multiplies physical channels except the SCH by spreading codes.

The signal processing section 50 (50a to 50c) is comprised of an error correcting coding section 51 that performs error correcting coding on transmission data, an S/P transform section 52 that performs parallel/serial transform on an output of the error correcting coding section, and a modulation section 53 that performs modulation processing such as BPSK, QPSK, 16QAM and the like on an output of the S/P transform section.

Further, the SCH data processing section 60 is comprised of a SCH modulation section 61 that performs modulation processing on SCH data input from the MAC section 10, a multiplying section 62 that multiplies an output of the SCH modulation section by a sector specific code, and a sector specific code generating section 63 that generates (or stores) the sector specific code.

Furthermore, the pilot channel data processing section 70 is comprised of a pilot data modulation section 71 that performs modulation processing on pilot data input from the MAC section 10, a multiplying section 72 that multiplies an output of the pilot data modulation section 71 by a sector specific code, and a code generating section 73 that generates (or stores) the sector specific code.

An output of the signal processing section 50 (50a to 50c) is assigned to an appropriate signal in the assigning section 81 for assigning to an appropriate subcarrier based on control information notified from the transmission circuit control section (reference numeral 16 in FIG. 10) of the MAC section 10, and output to the IFFT section 84.

In addition, when code 1 as shown in FIG. 8B is used as a sector specific code, since all the codes are "1", it is possible to omit the multiplying sections (62, 72) and code generating sections (63, 73). Further, when the SCH data is a fixed value as described previously, the MAC section 10 does not need to always output the SCH data for each SCH transmission. Therefore, substituting for the SCH data processing section 60, a SCH data storing section or the like may be provided to store the SCH data. By this means, it is possible to read the SCH data from the SCH storing section whenever transmitting the SCH to multiplex the data channel and pilot channel in the assigning section 81.

An output of the D/A conversion section 87 is transmitted to the atmosphere as a radio signal from the antenna section 28 (directional antennas 28a to 28c in FIG. 10) through the analog circuit section (reference numerals 26a to 26c in FIG. 10) that performs frequency conversion to a radio frequency.

As described above, the transmitter of the base station that controls a plurality of sectors multiplies the same SCH data by respective sector specific codes to concurrently transmit from antennas corresponding to the sectors. By this means, it is possible to receive the SCH with high quality frequency characteristics. As well as such reception, it is possible to select an optimal cell at the time of receiving the SCH, and also select a sector providing good reception.

Figure 12:
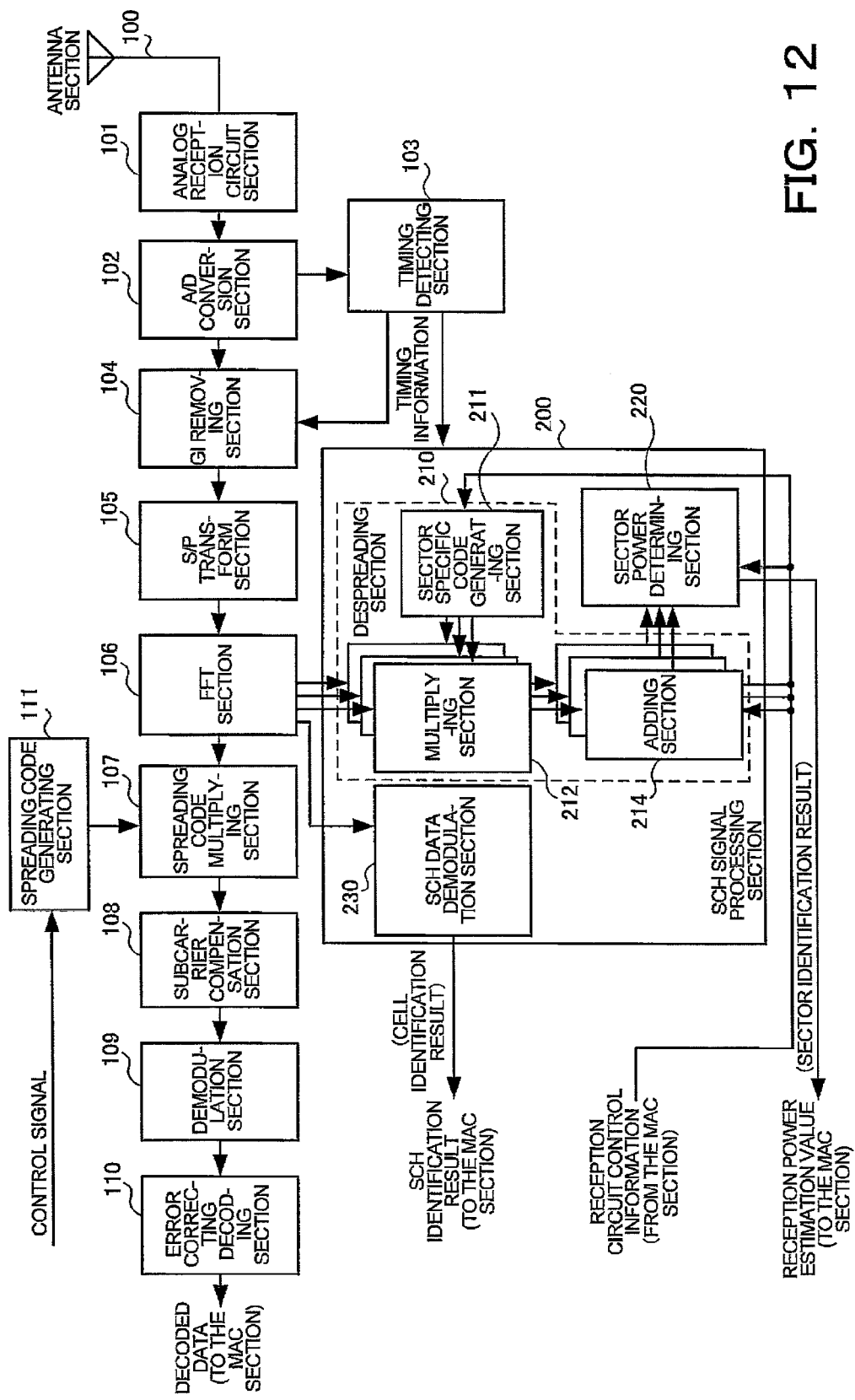
FIG. 12 is a block diagram showing an example of a configuration of a multicarrier receiver according to the invention.

Described next is a multicarrier receiver. FIG. 12 is a block diagram illustrating a configuration of a multicarrier receiver according to the invention. The multicarrier receiver corresponds to a cellular telephone terminal, PDA terminal, portable personal computer, and the like. As shown in the figure, the multi carrier receiver has an antenna section 100, analog reception circuit section 101, A/D conversion section 102, timing detecting section 103, GI removing section 104, S/P (Serial/Parallel) transform section 105, FFT section 106, spreading code multiplying section 107, subcarrier compensation section 108, demodulation section 109, error correcting decoding section 110, spreading code generating section 111, and SCH signal processing section 200. The SCH signal processing section 200 has a despreading section 210 for sector identification, a sector power determining section 220, and a SCH data demodulation section 230 that demodulates cell specific information.

The multicarrier receiver (hereinafter, simply referred to as a "receiver" as appropriate) basically executes a cell search including sector identification according to the flowchart as shown in FIG. 2. First, the receiver detects SCH timing from a reception signal for temporal synchronization with a signal transmitted from the base station and compensation for a shift of the frequency. In other words, the antenna section 100 receives a radio signal transmitted from the base station, and the analog reception circuit section 101 converts the received radio signal from the radio frequency band to a baseband frequency band. Then, the A/D (Analog/Digital) conversion section 102 converts the analog signal with the converted baseband frequency band into a digital signal.

Next, to acquire symbol synchronization, the timing detecting section 103 performs detection processing of the SCH from reception data that is converted into digital data in the A/D conversion section 102. Described herein is a circuit configuration of the timing detecting section 103.

Figure 13:
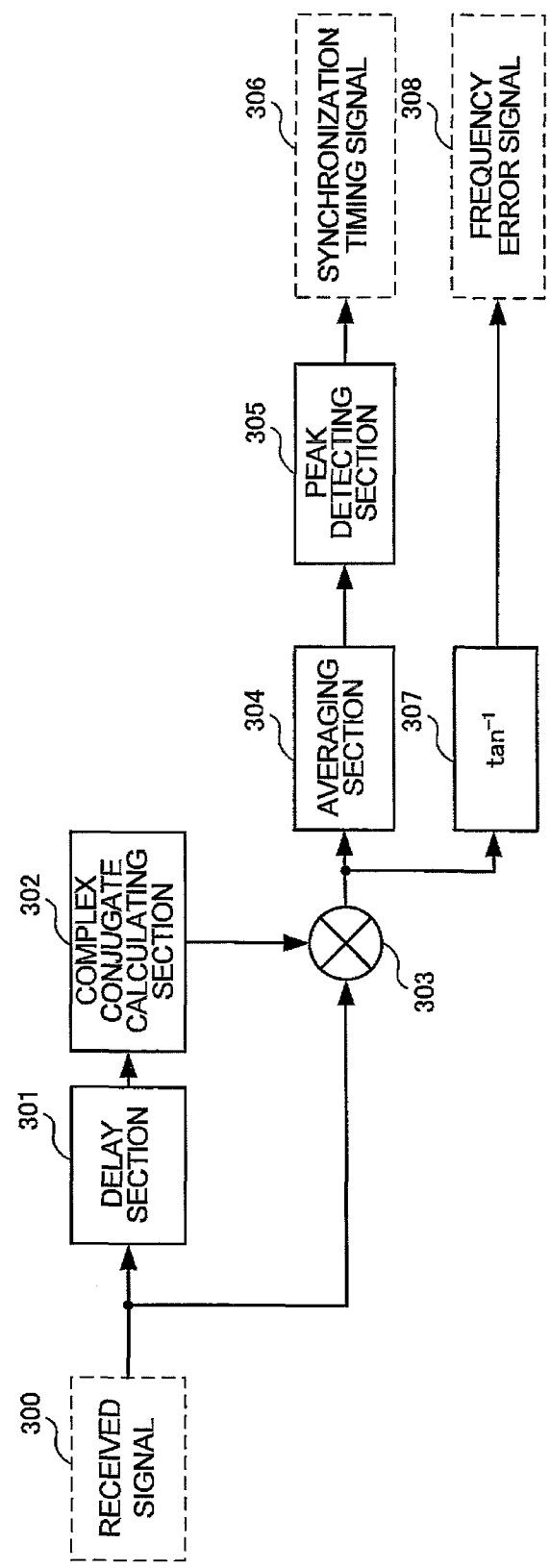
FIG. 13 is a block diagram showing a configuration example of a circuit having functions of timing detection and frequency error detection.

FIG. 13 is a block diagram showing a configuration example of the timing detecting section 103. The timing detecting section 103 has functions of timing detection and frequency error detection. As shown in FIG. 13, the timing detecting section 103 has a delay section 301, complex conjugate calculating section 302, multiplier 303, averaging section 304, peak detecting section 305, and arctangent calculating section 307 as a frequency error detecting section.

As can be seen from the configuration, the timing detecting section 103 multiplies a complex conjugate of a signal obtained by delaying the received signal by ½ effective symbol by reception data, and thus, is a circuit that detects a peak when the same waveform of ½ effective symbol is repeated. In other words, the peak is detected at the timing of the SCH data using odd-numbered subcarriers (subcarrier indexes $1, 3, 5, \ldots, 2n+1$) from the low-frequency side as described previously. A plurality of peaks is detected by signals from a plurality of cells, and generally, the mobile station determines the timing with the highest peak of an absolute value or real part of the correlation value to be timing of the SCH transmitted from the nearest cell, and starts the operation of connecting to the base station.

In the case of the frame structure as shown in FIG. 24, it is possible to acquire synchronization at a time interval a half the frame that is an interval at which the SCH is arranged. By concurrently acquiring synchronization with a SCH symbol, the mobile station acquires symbol synchronization. Further, by fixing a position of a SCH symbol in a sub-frame, it is possible to concurrently acquire synchronization at a sub-frame interval.

In FIG. 12, after the timing detecting section 103 acquires synchronization in a symbol period, the GI removing section 104 removes a GI portion added to the front of an effective symbol from each symbol in accordance with the symbol period The symbol with the GI removed therefrom is transformed in the S/P (Serial/Parallel) transform section 105 from a serial signal to a parallel signal, and subjected to FFT processing in the FFT section 106.

The data of the SCH symbol portion is input to the SCH signal processing section 200 for processing the SCH data from the FFT section 106. Further, the pilot channel and data channel including the control information to the mobile station are input to the spreading code multiplying section 107 from the FFT section 106. When a mobile station first connects to a base station, the mobile station does not have the cell specific information and sector specific information, and the processing in the SCH signal processing section 200 is given a priority and performed. In the SCH signal processing section 200, the data of the SCH symbol is concurrently input to three multiplying sections 212 corresponding to the number of sectors in this Embodiment and the SCH data demodulation section 230 from the FFT section 106.

Based on the control information from the MAC section (not shown), the multiplying section 212 performs multiplication of the sector specific code (FIG. 8B) generated or stored in the sector specific code generating section 211.

Each multiplying section 212 calculates a complex conjugate of the sector specific code input from the sector specific code generating section 211, and multiplies the odd-numbered subcarriers (subcarrier indexes 1, 5, 9, . . . ) of the SCH symbol input from the FFT section 106 by a code of the complex conjugate so as to correspond to subcarriers multiplied by the sector specific code when the base station transmits. Further, the data multiplied by the complex conjugate is input to an adding section 214 and subjected to in-phase addition. In other words, data of three subcarriers multiplied by the complex conjugate is added among six subcarriers that is the repeated cycle of the sector specific code. The aspect of this processing is shown by processing 1 and processing 2 in FIG. 14.

Figure 14:
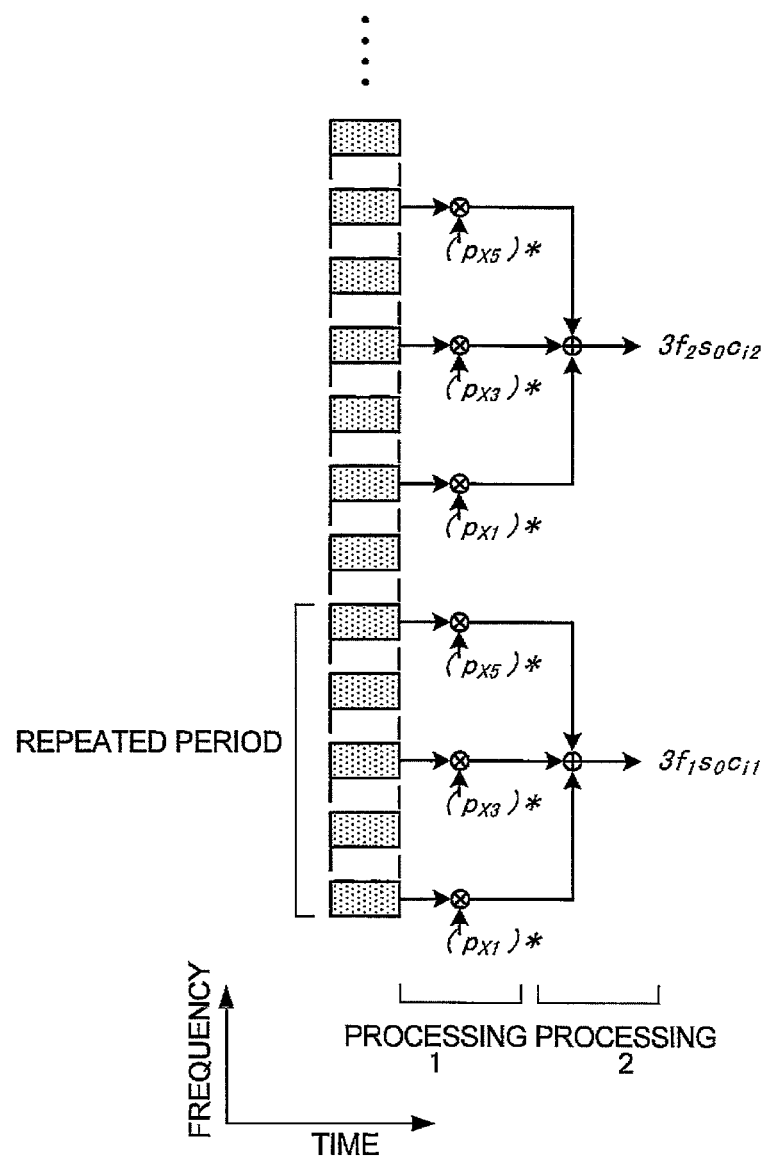
FIG. 14 is a diagram showing the specific content of despreading processing for sector identification.

FIG. 14 is a diagram showing the specific content of the despreading processing for sector identification. In FIG. 14, px is the sector specific code as shown in FIG. 8B, and x represents an index of the sector. Further, f represents a propagation path, and is fixed in a band of nine subcarriers that is a subcarrier interval for performing despreading.

Further, the sector power determining section 220 receives the root mean square of data that is one-third of the data subjected to despreading in FIG. 12. The root-mean-square data from each sector is used as a criterion of reception power determination in the sector power determining section 220.

The sector power determining section 220 compares data indicating the addition result input from the adding section 214 corresponding to each of three sectors with one another. Then, the section 220 determines a sector providing the highest reception power i.e. a sector providing the most excellent reception environment to connect. The sector detection result is notified to the MAC section by a control signal.

Figure 15:
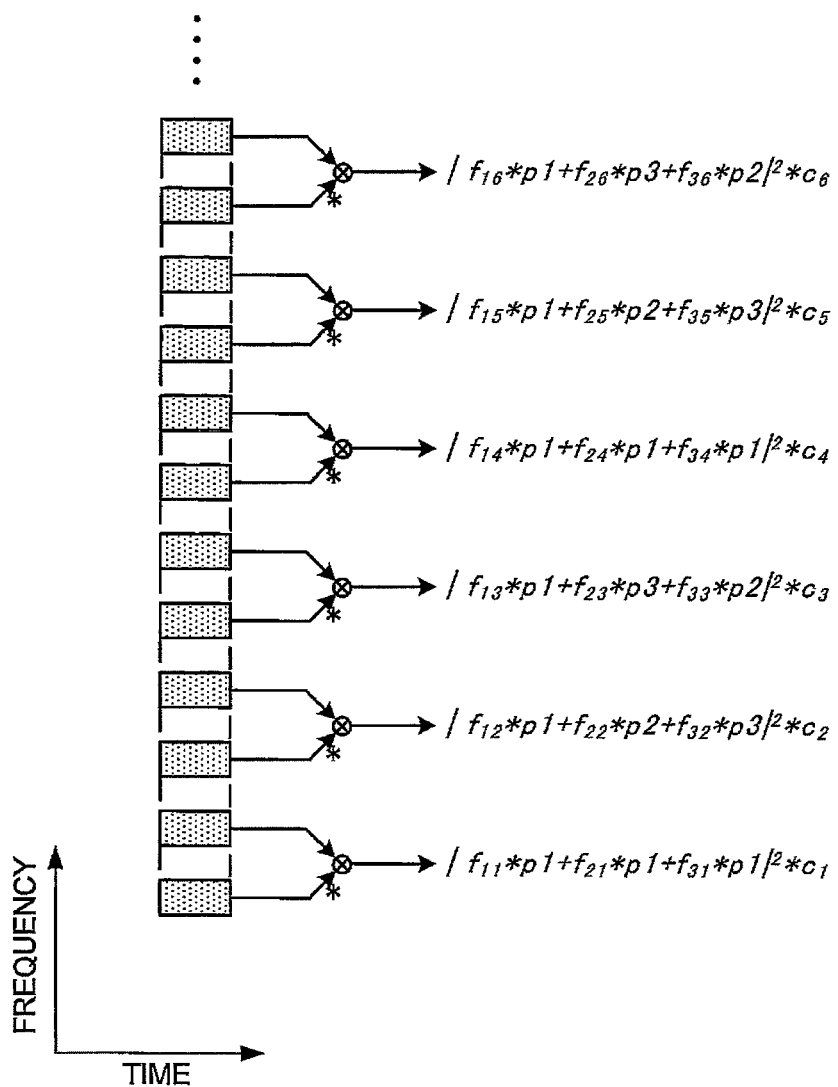
FIG. 15 is a diagram to explain demodulation processing of the cell specific information.

Meanwhile, the SCH symbol data (that is the data obtained by multiplying the sector common code by the cell specific information) input to the SCH data demodulation section 230 from the FFT section 106 in FIG. 12 is demodulated by a demodulation method as shown in FIG. 15.

FIG. 15 is a diagram to explain demodulation processing of the cell specific information. The processing in FIG. 15 is such processing that in a pair of subcarriers, the subcarrier on the high-frequency side is multiplied by a complex conjugate of the cell specific code assigned to the subcarrier on the low-frequency side, and that the relative phase difference information (i.e. cell specific information) is thereby demodulated.

The SCH data demodulation section 230 in FIG. 12 multiplies a complex conjugate of the data of an odd-numbered SCH subcarrier (subcarrier indexes 1, 5, 9 . . . ) of the SCH symbol from the low-frequency side by the data of the even-numbered SCH subcarrier (subcarrier indexes 3, 7, 11 . . . ) on the high-frequency side.

As shown in FIG. 15, an ideal value of the multiplication result is formed of the propagation path f between each sector and the mobile station and the cell specific code c. c is a complex number with the amplitude of "1" and readily obtained by deriving the phase. Herein, x of fxy represents a sector ID (that corresponds to a sector identification number, and also referred to as a sector index), and y is assumed to be an index in the frequency domain in the propagation paths of two subcarriers to multiply by each other. Further, the propagation paths of two subcarriers to multiply are assumed to be the same.

In demodulating the cell specific information, the SCH data demodulation section 230 generates replicas of candidate codes (Cn) having the possibility of being used in the base station for notification of the cell specific information from code sequences of the cell specific information. Then, it is possible to determine and acquire the cell specific information also by calculating cross-correlation with the result actually calculated by the method as described previously. It is actually desired to make a determination by such cross-correlation processing.

In this Embodiment, the SCH symbol is provided in two positions in a frame, and synchronization is acquired by a period half the frame in symbol synchronization by delay correlation. To acquire synchronization in a frame period, the information indicated by the cell specific code c described previously includes information indicating any one of the SCHs in the frame. Further, information may be assigned to a symbol whose temporal position is fixed from the SCH.

Further, as described previously, since the spreading code information has the extremely high number of codes depending on the code length forming the information, there is a case that the information amount lacks to notify the cell specific information. In other words, depending on the number of subcarriers used in the SCH, such a case is considered that the information amount is not enough to notify the cell specific information, and that information indicating a group obtained by grouping cells is notified, instead of the information indicating a spreading code specific to the cell. In this case, it is necessary to make the following detection on all conceivable spreading codes of the grouped cells.

In other words, the mobile station uses the pilot channel for cell spreading code detection, and generates a replica signal by multiplying the pilot channel by codes (cell specific code and orthogonal code) multiplied by the pilot channel. The mobile station calculates cross-correlation between the generated replica signal and an actual received signal on spreading code candidates for all the cells in the cell group as described previously. After finishing all the correlation detection, the mobile station determines a spreading code candidate showing the highest correlation value as a spreading code used in the nearest base station. This is a typical method. However, in this Embodiment, by using only the orthogonal code of the sector determined in sector determination as described previously, it is possible to reduce the cross-correlation detection processing.

Desirable as a code sequence of the cell specific code c is a code excellent in cross-correlation characteristics with codes indicating information of other cells. More specifically, desired are Walsh-Hadamard code sequences, Generalized Chirp Like (GCL) sequence codes and the like.

The SCH data demodulated as described above is sent to the MAC section. The MAC section performs reception according to the information, and is capable of connecting to the base station. In general, the following configuration is required to receive a data channel transmitted from the base station. In addition, it is possible to use reception circuitry as well as the following circuitry.

In FIG. 12, the data channel and pilot channel subjected to the FFT processing in the FFT section 106 are being spread by the spreading code specific to the cell included in the cell specific information. Therefore, the spreading code multiplying section 107 multiplies a complex conjugate of the spreading code specific to the cell. The spreading code specific to the cell is output from the spreading code generating section 111. The spreading code generating section 111 selects a spreading code of a desired cell from a plurality of spreading codes by a control signal from the higher layer.

Further, the spreading code generating section 111 also selects an orthogonal code specific to the sector at the same time to input to the spreading code multiplying section 107. The input orthogonal code is multiplied by the pilot channel in the spreading code multiplying section 107. The data multiplied by the code is subjected to subcarrier compensation in the subcarrier compensation section 108 using the pilot channel as a reference signal, and input to the demodulation section 109. The demodulation section 109 demodulates the data channel, and further, the error correcting decoding section 110 performs error correcting decoding.

Embodiment 3

Embodiment 3 of the invention will be described below. In Embodiment 2 shown above, the SCH is inserted for each frame (FIG. 24), and therefore, a null subcarrier is set every two subcarriers (FIG. 25).

Figure 16:
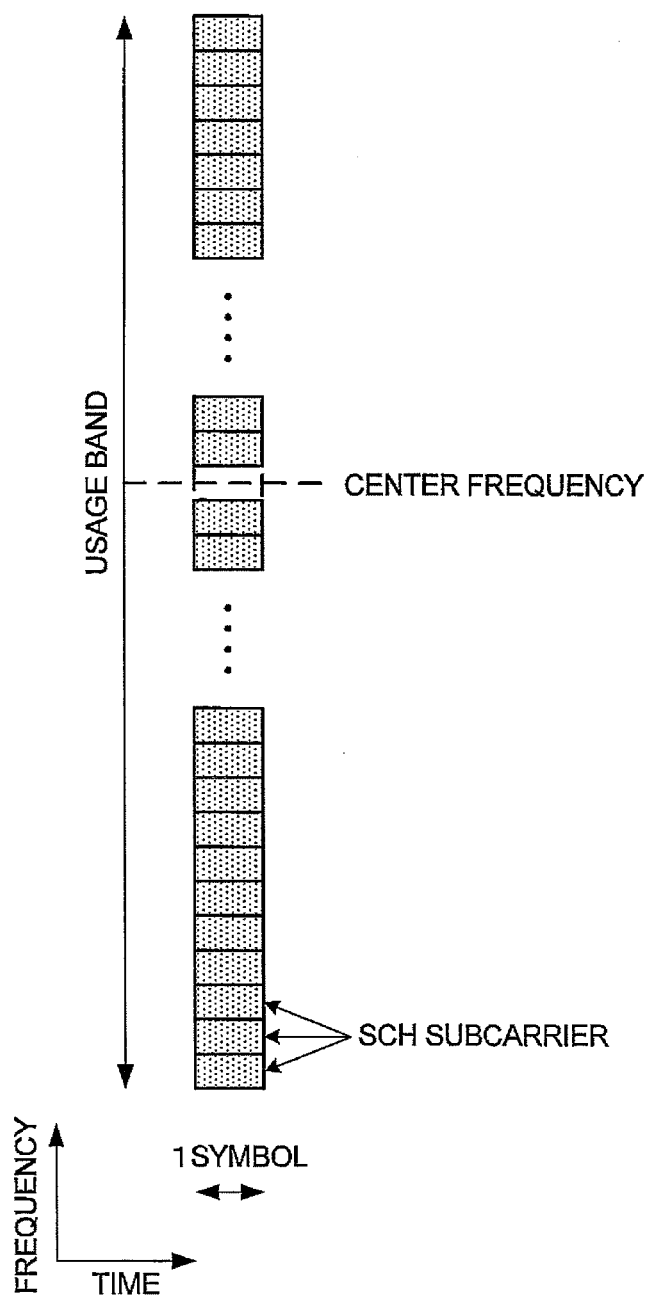
FIG. 16 is a diagram showing subcarriers, assigned the SCH, arranged on the frequency axis (i.e. structure of the SCH on the frequency axis)
Figure 19:
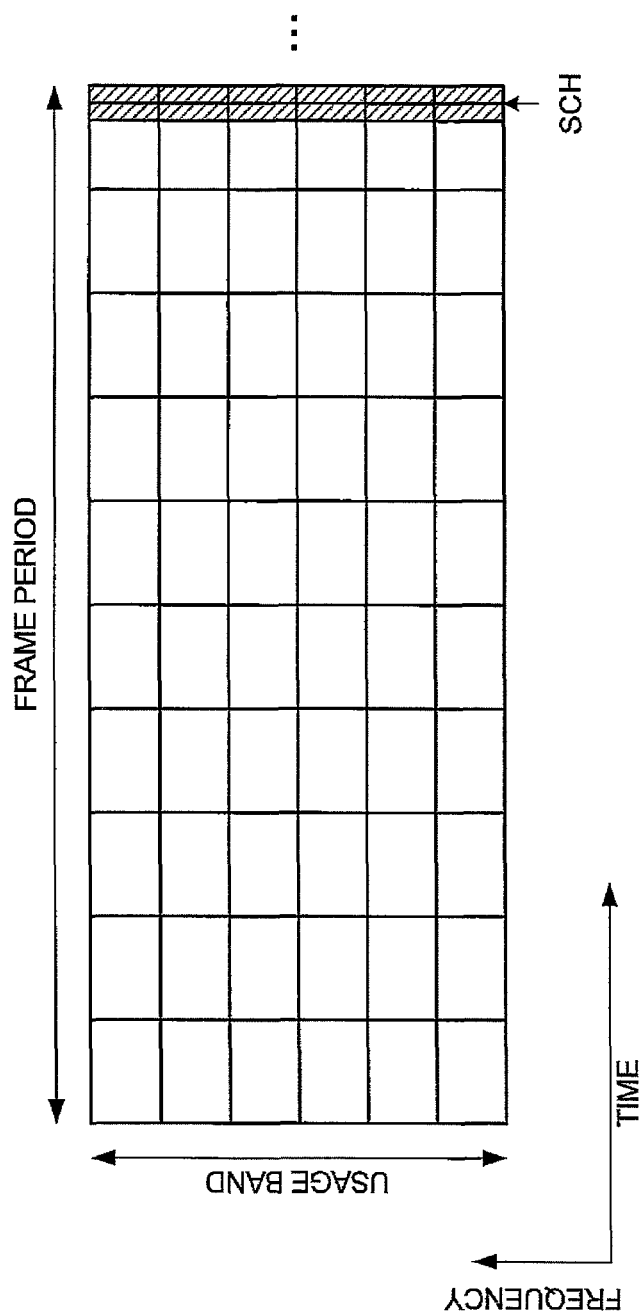
FIG. 19 is a diagram illustrating a frame structure in Embodiment 3.

In this Embodiment, as shown in FIG. 16, subcarriers except a subcarrier (DC subcarrier) in the center of the band are SCH subcarriers. Further, as an arrangement of SCH symbols in a frame shown in FIG. 19, the same SCH symbols are arranged in two consecutive symbols in a specific temporal position in the frame. FIG. 19 is a diagram illustrating a frame structure in Embodiment 3.

In other words, in this Embodiment, as compared with Embodiment 2 shown above, the number of SCH subcarriers is twice, and the code length usable in the cell specific information is increased. Accordingly, it is possible to transmit and receive a SCH signal with a larger information amount.

FIG. 16 is a diagram showing subcarriers assigned the SCH. In this Embodiment, the SCH is configured on the frequency axis as shown in FIG. 16. In other words, FIG. 16 shows the diagram with attention drawn to SCH data of a plurality of symbols constituting a frame of a signal transmitted from the based station, and the vertical axis represents the frequency axis, while the horizontal axis represents the time axis. With respect to each subcarrier, as shown in FIG. 16, subcarriers except the center subcarrier (DC subcarrier) are used as subcarriers to assign the SCH data.

Figure 17:
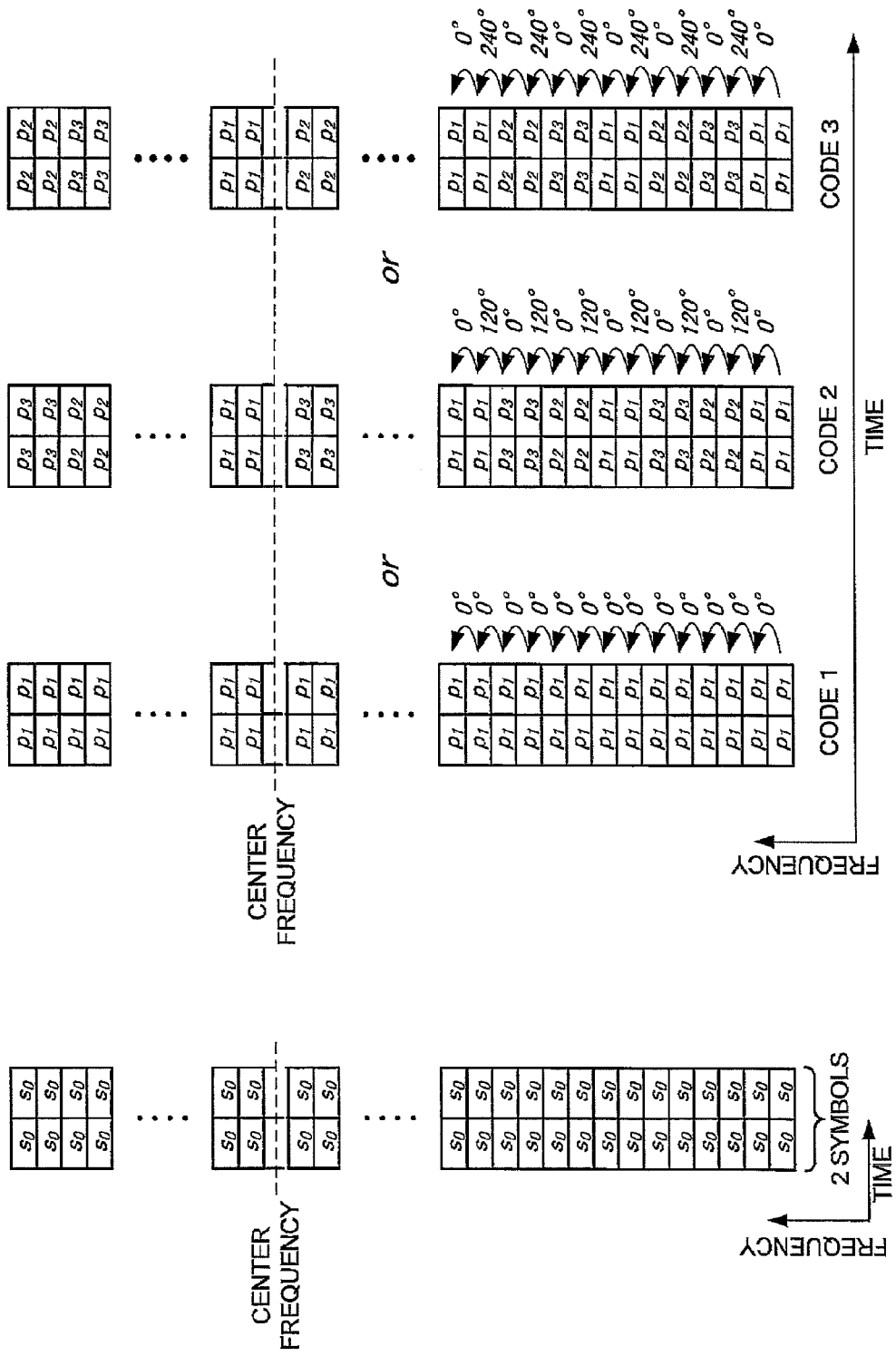
FIG. 17A is a diagram illustrating an arrangement on the frequency axis of the sector common code to be multiplied by the SCH in Embodiment 3.
FIG. 17B is a diagram showing three sector specific codes in Embodiment 3.

The following descriptions are made assuming that the number of subcarriers (SCH subcarriers) constituting the SCH is 2n. FIGS. 17A and 17B are diagrams illustrating a data structure of the SCH in Embodiment 3. FIG. 17A is a diagram showing an arrangement on the frequency axis of the sector common code to be multiplied by the SCH, and FIG. 17B is a diagram showing three sector specific codes.

FIG. 17A shows a sector common code. Each SCH subcarrier (subcarrier indexes 1, 2, 3, . . . ) is assigned $S_0$. $S_0$ is an arbitrary value expressed by $A^*\exp(j\omega)$. Herein, A represents the amplitude, j represents an imaginary unit, and ω represents a phase. Sector common code $S_0$ is common in all the sectors (three sectors in this Embodiment) within each cell. As in Embodiment 2 described previously, using $S_0$ known to the mobile station enables $S_0$ to be used in decoding the cell specific code multiplied by the SCH.

FIG. 17B shows an example related to the case that the sector specific codes are used in three sectors in Embodiment 3. The codes are specific to respective sectors in the same cell, and codes 1 to 3 support three sectors in Embodiment 3. It is assumed that the mobile station and base station beforehand know about correspondence between the codes and sector IDs in the same cell. In code sequences to be multiplied by SCH subcarriers as the sector specific code, phase differences from odd-numbered SCH subcarriers (subcarrier indexes 1, 3, 5 . . . ) from the low-frequency side to even-numbered subcarriers (subcarrier indexes 2, 4, 6, . . . ) are 0°, 0° and 0° in each sector. Phase differences from even-numbered SCH subcarriers to odd-numbered subcarriers are 0°, 120° or 240° in each sector. Each code is a code with the amplitude of "1". Further, since these code sequences are of 6-chip reuse (one period is six chips), the number 2n of SCH subcarriers is an integral multiple of "6".

With attention drawn to one reuse part (six chips) of these three code sequences, when a complex conjugate of an arbitrary code sequence is multiplied by each code sequence and consecutive three chips are added every four chips, the sum is "0" in the case of multiplying code sequences except the selected arbitrary code sequence, while being "3" in the case of multiplying the arbitrary code sequence.

For example, the case is considered of $(\exp(j0\pi), \exp(j0\pi), \exp(j0\pi), \exp(j0\pi), \exp(j0\pi), \exp(j0\pi))$ of code 1, $(\exp(j0\pi), \exp(j0\pi), \exp(j2\pi/3), \exp(j2\pi/3), \exp(j4\pi/3), \exp(j4\pi/3))$ of code 2, and $(\exp(j0\pi), \exp(j0\pi), \exp(j4\pi/3), \exp(j4\pi/3), \exp(j2\pi/3), \exp(j2\pi/3))$ of code 3. When code 2 is selected as an arbitrary code, a complex conjugate of code 2 is $(\exp(j0\pi), \exp(j0\pi), \exp(-j2\pi/3), \exp(-j2\pi/3), \exp(-j4\pi/3), \exp(-j4\pi/3))$. Codes obtained by multiplying codes 1 to 3 by the complex conjugate of code 2 are respectively $(\exp(j0\pi), \exp(j0\pi), \exp(-j2\pi/3), \exp(-j2\pi/3), \exp(-j4\pi/3), \exp(-j4\pi/3))$, $(\exp(j0\pi), \exp(j0\pi), \exp(j0\pi), \exp(j0\pi), \exp(j0\pi), \exp(j0\pi))$, and $(\exp(j0\pi), \exp(j0\pi), \exp(j2\pi/3), \exp(-j2\pi/3), \exp(-j2\pi/3))$.

Further, when odd-numbered chips and even-numbered chips are subjected to vector addition, the results are (0,0), (3,3) and (0,0). Thus, the code sequences have characteristics that the sum of the codes except code 2 selected as an arbitrary code is "0". This means that in concurrently transmitting the SCH of the same data multiplied by an orthogonal code (FIG. 17B) corresponding to each sector from each sector in the same cell, a mobile station receiving the SCH performs despreading of the SCH every three predetermined chips, and is thereby capable of separating a signal from an arbitrary sector from an interfering signal from an adjacent sector.

Figure 18:
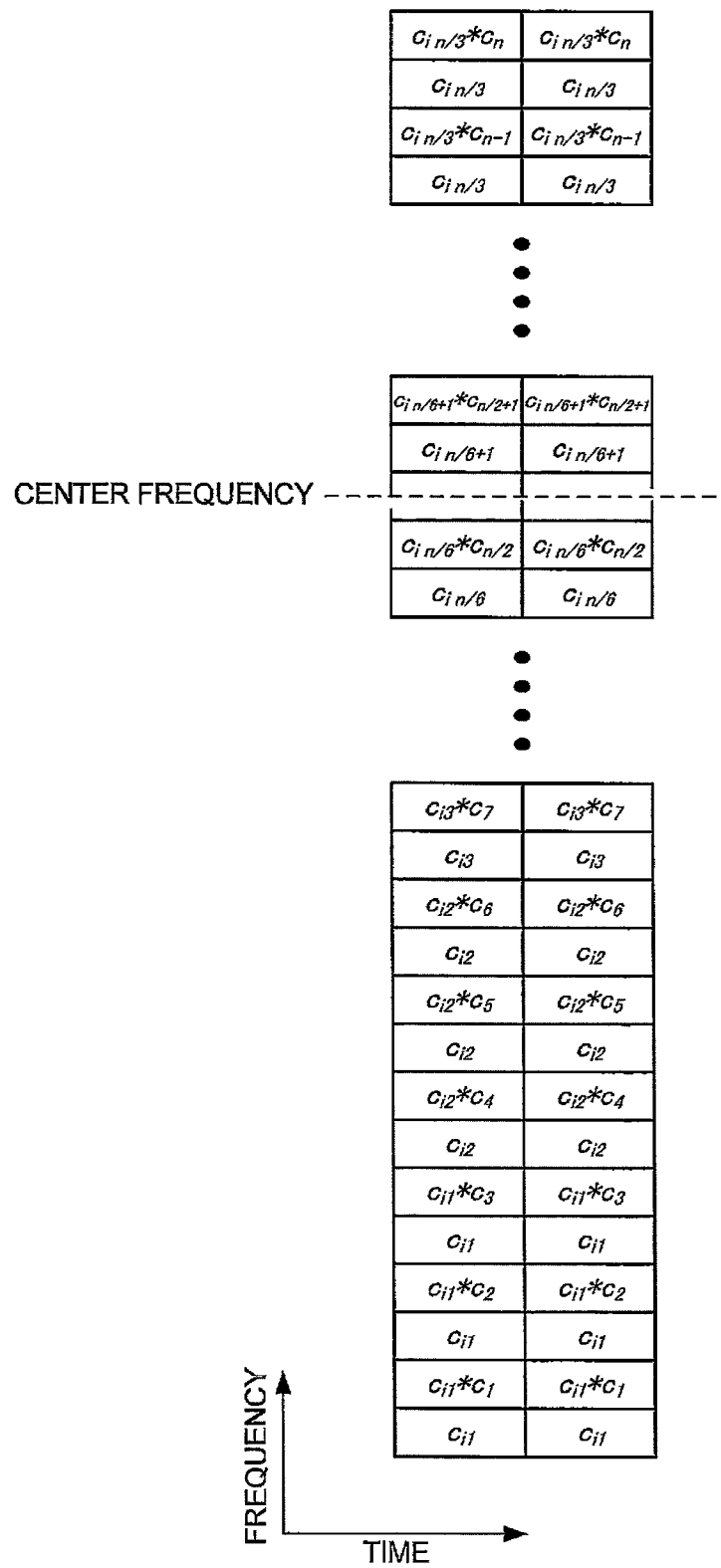
FIG. 18 is a diagram illustrating an arrangement of the cell specific code in Embodiment 3

FIG. 18 is a diagram illustrating an arrangement of the cell specific code in Embodiment 3. Since the code sequence as shown in FIG. 18 is a code sequence to transmit the cell specific information, a different code sequence is used in each cell, while the same code sequence is used among sectors in the same cell. The cell specific information is information of a specific spreading code used in the cell, information of the number of antennas of the base station and system bandwidth, and the like, and includes information required for a mobile station to first connect to the base station.

However, the spreading code information is an extremely high number of codes depending on the code length, and there is a case that the code as shown in FIG. 18 lacks in the information amount. In such a case, it is possible to group some cells, and generate a code sequence by the same information in the cells belonging to the group. In this case, since the spreading code specific to the cell is not completely identified from the information of the SCH, an ultimate cell specific spreading code is identified using a pilot channel multiplied by the spreading code.

The code sequence as shown in FIG. 18 is formed using six chips as a group from the low-frequency side. In the six chips, odd-numbered SCH subcarriers are assigned the same code, while even-numbered SCH subcarriers are assigned a code obtained by multiplying the code assigned to the odd-numbered subcarriers by the cell specific code. The codes assigned to odd-numbered subcarriers are the same among six chips, but do not need to be the same as those used in other six chips. Each chip forming a code sequence has the amplitude of "1". Further, as the code length, when the number of SCH subcarriers is 2n, a code sequence with the code length of n is required to form the even-numbered subcarriers.

Since the code length is dependent on the number of SCH subcarriers, generally, it is possible to generate the high number of code sequences with good correlation characteristics when the number of SCH subcarriers is sufficiently high. Therefore, as described previously, instead of the code sequence indicating a cell ID group, it is made possible to form a code sequence containing information directly indicating the cell ID.

The same code is assigned to two consecutive symbols as the code to multiply the subcarriers constituting the SCH as descried above. Three kinds of code sequences as described above are code sequences constituting the SCH in Embodiment 3, and the SCH multiplied by the code sequence is transmitted from a transmitter of each sector.

A transmission method of the SCH and a configuration of a transmitter in this Embodiment are the same as in Embodiment shown above, and descriptions thereof are omitted. The different respects from Embodiment 2 are the code (see FIGS. 17 and 18) generated in the sector specific code generating section 63 in the SCH data generating section 60 and the SCH data input from the MAC section 10. Further, in this Embodiment, the same SCH symbol is transmitted in two consecutive symbols (see FIG. 19). FIG. 19 is a diagram illustrating an arrangement of the SCH in a frame period. A receiver configuration and a reception method in this Embodiment are basically the same as in the Embodiment shown above. In addition, the timing detecting section 103 (FIG. 13) in Embodiment 2 delays a received signal by ½ effective symbol period to multiply by the signal, and detects a position of the SCH symbol, but in this Embodiment, a received symbol is delayed by one symbol to multiply the signal, and a symbol of the SCH is thereby detected.

Procedures of a cell search will be described below. A mobile station receives a radio signal transmitted from the base station in the antenna section 100 as in Embodiment 2. The analog reception circuit section 101 converts the received radio signal from the radio frequency band to a baseband frequency band. The A/D (Analog/Digital) conversion section 102 converts the signal with the converted baseband frequency band from the analog signal into a digital signal.

Next, the timing detecting section 103 performs the SCH detection processing to acquire symbol synchronization based on reception data that is converted into digital data in the A/D conversion section 102. Then, the timing detecting section 103 multiplies a complex conjugate of a signal obtained by delaying the received signal by one symbol by reception data, and thereby, detects the peak when the waveform of the same symbol is repeated. In other words, the peak is detected at the timing of receiving two symbols of the same SCH symbol as described previously. A plurality of peaks is detected by signals from a plurality of cells, and generally, the mobile station determines the timing with the highest peak of the correlation value to be timing of the SCH transmitted from the nearest cell, and starts the operation of connecting to the base station.

In this Embodiment, since the SCH of two symbols are arranged at the end of a frame, by detecting a correlation peak of the SCH signal by the method as described previously, it is possible to acquire frame synchronization. By concurrently acquiring synchronization with a SCH symbol, the mobile station acquires symbol synchronization. Then, after finishing acquisition of synchronization in a symbol period, the GI removing section 104 removes a GI portion added to the front of an effective symbol from each symbol in accordance with the symbol period The symbol with the GI removed therefrom is transformed in the S/P (Serial/Parallel) transform section 105 from a serial signal to a parallel signal, and subjected to FFT processing in the FFT section 106.

The data of the SCH symbol portion is input to the SCH signal processing section 200 for processing the SCH data from the FFT section 106. Further, the pilot channel and data channel including the control information to the mobile station are input to the spreading code multiplying section 107 from the FFT section 106. When a mobile station first connects to a base station, the mobile station does not have the cell specific information and sector specific information, and the processing in the SCH signal processing section 200 is given a priority and performed. In the SCH signal processing section 200, the data of the SCH symbol is input to three multiplying sections 212 corresponding to the number of sectors in this Embodiment and the SCH data demodulation section 230 from the FFT section 106. The multiplying section 212 receives the sector specific code generated or stored in the sector specific code generating section 211 based on the control information from the MAC section (not shown).

Figure 20:
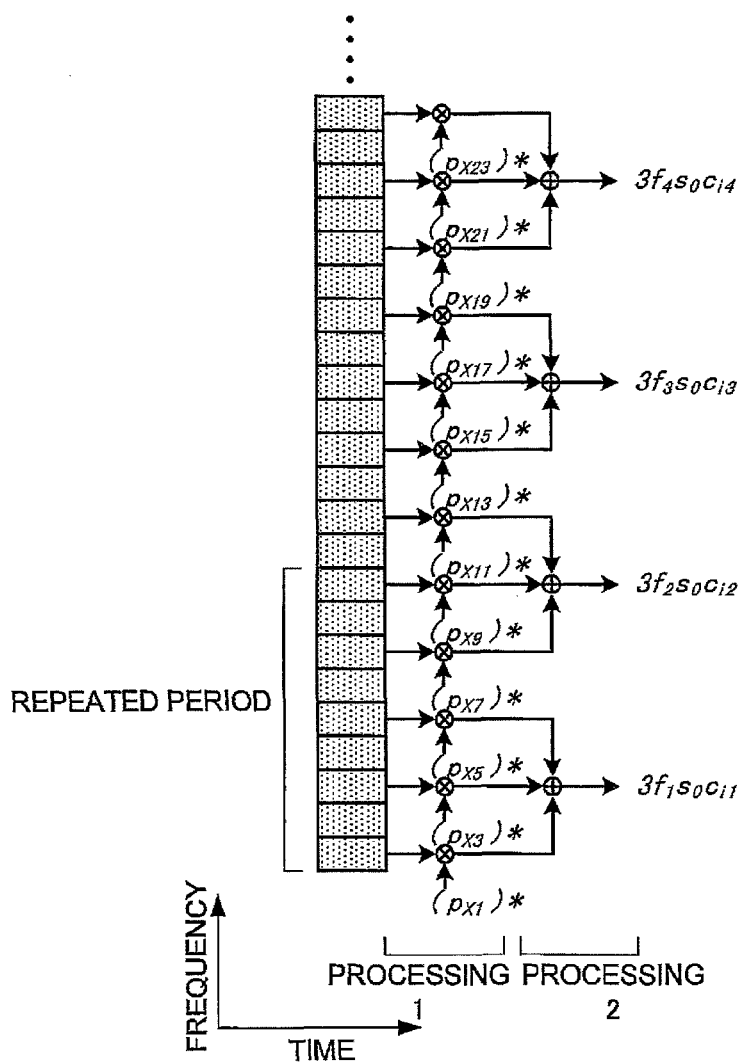
FIG. 20 is a diagram illustrating a specific content example of correlation calculation processing using the sector specific code.

Each multiplying section 212 calculates a complex conjugate of the sector specific code input from the sector specific code generating section 211, and multiplies each of the odd-numbered subcarriers (subcarrier indexes 1, 3, of the SCH signal input from the FFT section 106 by a code of the complex conjugate so as to correspond to a subcarrier multiplied by the sector specific code when the base station transmits. This processing is shown by processing 1 in FIG. 20. FIG. 20 is a diagram illustrating a specific content example of the correlation calculation processing using the sector specific code. The data multiplied by the complex conjugate is input to the despreading section 210 and subjected to despreading processing. The despreading processing is performed by adding data of three subcarriers multiplied by the complex conjugate among six subcarriers that are the repeated cycle of the sector specific code (see processing 2 in FIG. 20).

Further, the sector power determining section 220 receives the root mean square of data that is one-third of the data subjected to the despreading processing. The root-mean-square data from each sector is used as a criterion of reception power determination in the sector power determining section 220. In FIG. 20, px is the sector specific code as shown in FIG. 17B, and x represents an index of the sector. Further, f represents a propagation path, and is fixed in a band of five subcarriers that is a subcarrier interval for performing despreading.

The sector power determining section 220 receives the values from the despreading sections 210 corresponding to three sectors to compare with one another. Then, the section 220 determines a sector providing the highest reception power i.e. a sector providing the most excellent reception environment to connect. The determination is notified to the MAC section as a control signal.

Figure 21:
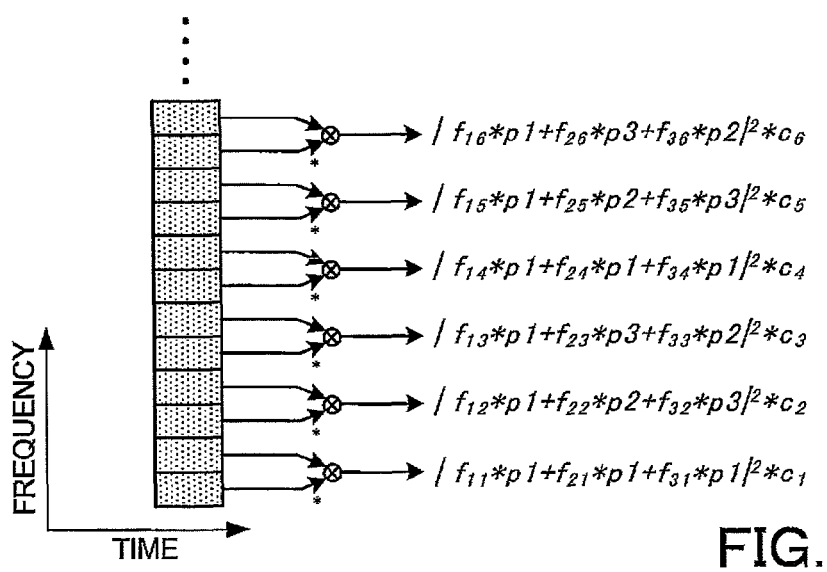
FIG. 21 is a diagram illustrating a demodulation method of the cell specific information in Embodiment 3.

Meanwhile, the SCH symbol data input to the SCH data demodulation section 230 from the FFT section 106 is demodulated by a demodulation method as shown in FIG. 21.

FIG. 21 is a diagram illustrating a demodulation method of the cell specific information in Embodiment 3. The SCH data demodulation section 230 multiplies a complex conjugate of data of an odd-numbered SCH subcarrier (subcarrier indexes 1, 3, 5 . . . ) of the SCH symbol from the low-frequency side by data of the even-numbered SCH subcarrier (subcarrier indexes 2, 4, 6 . . . ) on the high-frequency side.

As shown in FIG. 21, an ideal value of the multiplication result is formed of the propagation path f between each sector and the mobile station and the cell specific code c. c is a complex number with the amplitude of "1" and readily obtained by deriving the phase. Herein, x of fxy represents a sector ID, and y is assumed to be an index in the frequency domain in the propagation paths of two subcarriers to multiply by each other. Further, the propagation paths of two subcarriers to multiply are assumed to be the same.

In demodulating the cell specific information, the SCH data demodulation section generates replicas of candidates having the possibility of being used in the base station for notification of the cell specific information from code sequences of the cell specific information as described below, and it is possible to determine and acquire the cell specific information also by calculating cross-correlation with the result actually calculated by the method as described previously. Further, in Embodiment 3, since the same SCH symbol is transmitted in two consecutive symbols, by performing the above-mentioned demodulation successively in a two-symbol period, it is possible to perform demodulation with higher reliability.

The SCH data demodulated as described above is sent to the MAC section. The MAC section performs reception according to the information, and is capable of connecting to the base station. In Embodiment 3, the SCH is arranged in last two symbols of a frame period. By this means, when the SCH is arranged on the time axis with periodicity, while the same SCH symbol is transmitted in two consecutive symbols, since the information amount increases, the receiving side is capable of performing demodulation with higher reliability. Further, since it is possible to transmit the SCH using subcarriers of the entire frequency band, when different information is transmitted for each symbol, it is possible to increase the code length usable in transmission of the sector specific information (relative phase difference information), and to transmit a larger amount of cell specific information.

Embodiment 4

Embodiment 4 of the invention will be described below. This Embodiment descries an example of performing timing detection of the SCH in the first step in a cell search by a cross-correlation method using the time waveform of a replica of the sector specific code.

In Embodiments 2 and 3 shown above, in the first step of the 3-step cell search as described previously, symbol synchronization, frequency offset, and 1/N frame timing is detected using time correlation detection of the SCH. In this Embodiment, timing detection of the SCI in the first step in the 3-step cell search as described previously is performed by cross-correlation processing between a reception signal and a replica signal generated in a mobile station. To enable such detection, it is necessary to devise a data structure of the SCH.

The SCH position detection method in the first step shown in this Embodiment can be actualized by using the frame structure and arrangement of the SCH as shown in Embodiment 2 or 3 without modification. The second or third step can be implemented also as in the Embodiment shown above.

In addition, also in the case of adopting a data structure of the SCH as in this Embodiment, the respect that the SCH is periodically arranged in a frame period is the same as in the Embodiments shown above. Accordingly, it is also possible to execute SCH position detection (i.e. establishment of symbol synchronization by auto-correlation using the repeated waveform) using the auto-correlation method as in Embodiments 2 and 3. In addition, in detection of a SCH position using cross-correlation, a shaper correlation peak is obtained, and it is possible to detect the SCH position with higher accuracy.

The SCH timing detection method in the first step in this Embodiment is a detection method applying a detection method designated as the cross-correlation detection (or replica detection) method. As described above, as compared with the auto-correlation detection method using consecutive SCH waveforms as shown in Embodiments 2 and 3, it is possible to detect a detection peak sharply. In other words, as compared with Embodiments 2 and 3 shown above, this Embodiment is capable of using a different method in the first step of the 3-step cell search. Accordingly, it is possible to detect the SCH timing with higher accuracy.

In this Embodiment, as in Embodiment 2, an OFDM communication scheme is used as a downlink communication scheme. Further, structures of a communication frame and resource block are assumed to have the same formats as shown in FIGS. 22 and 28. First, with respect to a synchronization physical channel (SCH) that is a feature in this Embodiment, the specific structure will be described.

Figure 29:
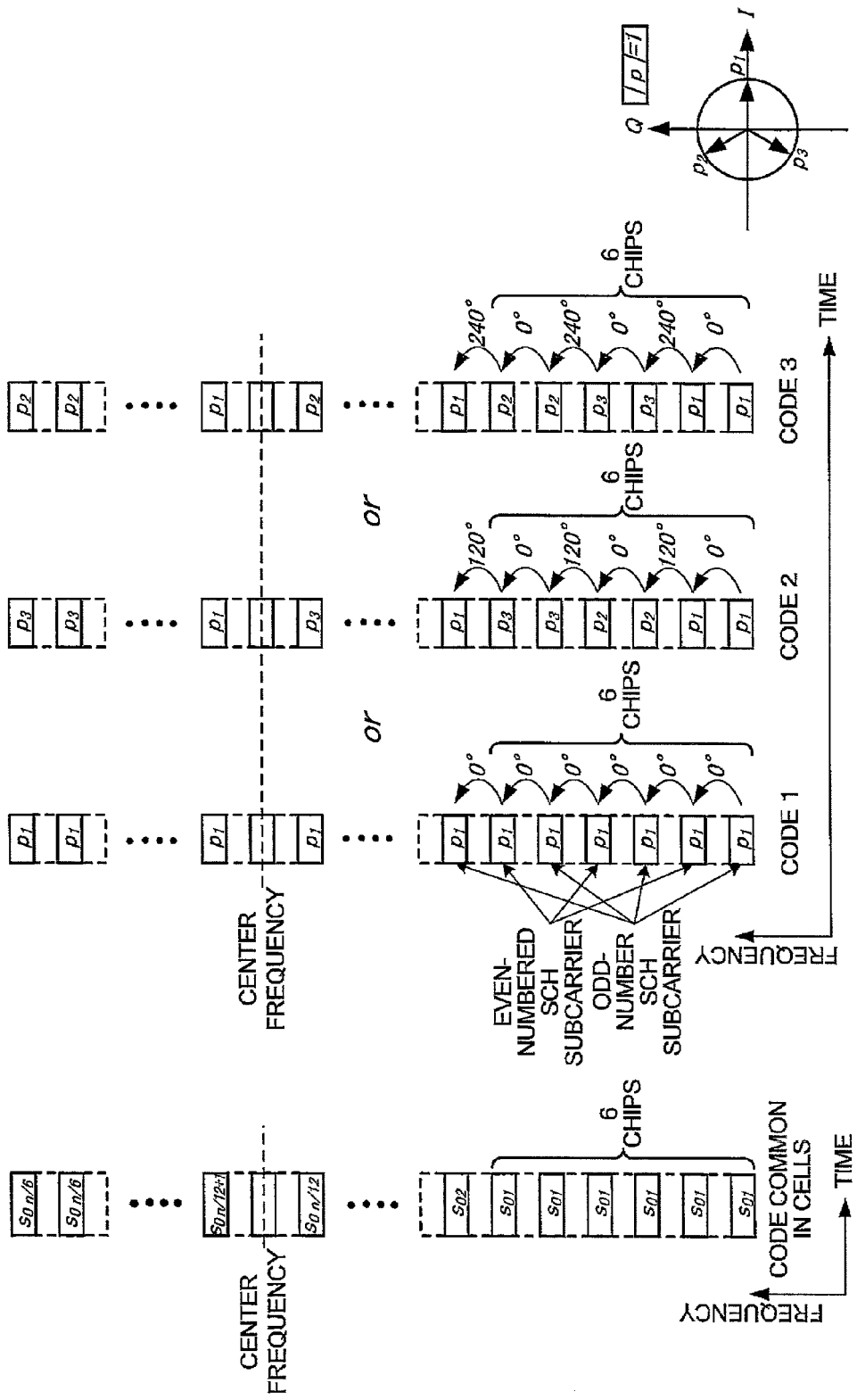
FIG. 29A is a diagram showing an assignment of a sector common code on the frequency axis.
FIG. 29B is a diagram showing structures of three sector specific codes.
FIG. 29C is a diagram showing the basic concept of generation of the sector specific code, and shows vectors on the complex phase plane.

As in Embodiment 2, FIGS. 29A to 29C are diagrams to explain a data structure of the SCH concurrently transmitted from three sectors in the same cell. FIG. 29A is a diagram showing an assignment of a sector common code on the frequency axis, FIG. 29B is a diagram showing structures of three sector specific codes, and FIG. 29C is a diagram showing the basic concept of generation of the sector specific code, and shows vectors on the complex phase plane. The basic structure is the same as in Embodiment 2, but part of structural code differs to enable the cross-correlation detection method to be applied to the first step of the 3-step cell search.

A signal as shown in FIG. 29A indicates a sector common code constituting the SCH. SCH subcarriers are assigned $S_{01}$ to $S_{0n/6}$ every six chips. $S_0$ is an arbitrary value expressed by $A*\exp(j\omega)$. Herein, A represents the amplitude (in addition, in the invention, the explanation is made with the amplitude A being "1"), j represents an imaginary unit, and $\omega$ represents a phase.

One of features of this Embodiment is that the sector common code is a common code in all the cells, as distinct from Embodiments 2 and 3. In other words, the sector common code is also the cell common code. Another feature is that among cell specific codes, a code element as a phase reference is also common in all the cells. By this means, it is possible to perform correlation detection using replicas of the sector specific codes.

In other words, the SCH is configured by multiplying three kinds of codes (sector common code, sector specific code and cell specific code). Herein, the sector common code is made common in cells, and among the cell specific codes, a code element as a phase reference is also made common in the cells. With respect to a subcarrier multiplied by the code element as a phase reference, multiplied codes are the (sector common code common in all the cells), (sector specific code) and (cell specific code common in all the cells), and substantially, the (codes common in all the cells) are multiplied by the (sector specific code). In other words, with respect to the subcarrier multiplied by the code element as a phase reference, three kinds of codes are multiplied, and among the codes, two codes are common in all the cells. Accordingly, a different code is only the sector specific code. This means enabling correlation detection using replicas of the sector specific codes.

Therefore, the receiver side prepares a time waveform of a replica code of the sector specific code corresponding to each sector, multiplies a reception signal prior to FFT by the time waveform of the replica signal to detect a correlation peak, and is thereby capable of detecting the SCH timing in the reception signal with high accuracy. Accordingly, it is made possible to perform subsequent sector identification and cell identification efficiently. In addition, even when such a specialized SCH structure is adopted, the SCH is periodically arranged in a frame period, which is not different, and it is also possible to perform position detection by the auto-correlation method (i.e. the method of detecting correlation between a signal delayed from a reception signal by a predetermined period and an original reception signal).

A specific example will be described below with reference to drawings. The sector specific code is described first. FIG. 29B shows an example of the sector specific codes (herein, the number of sectors is "3"). Herein, the same codes as shown in Embodiment 2 are used.

Figure 30:
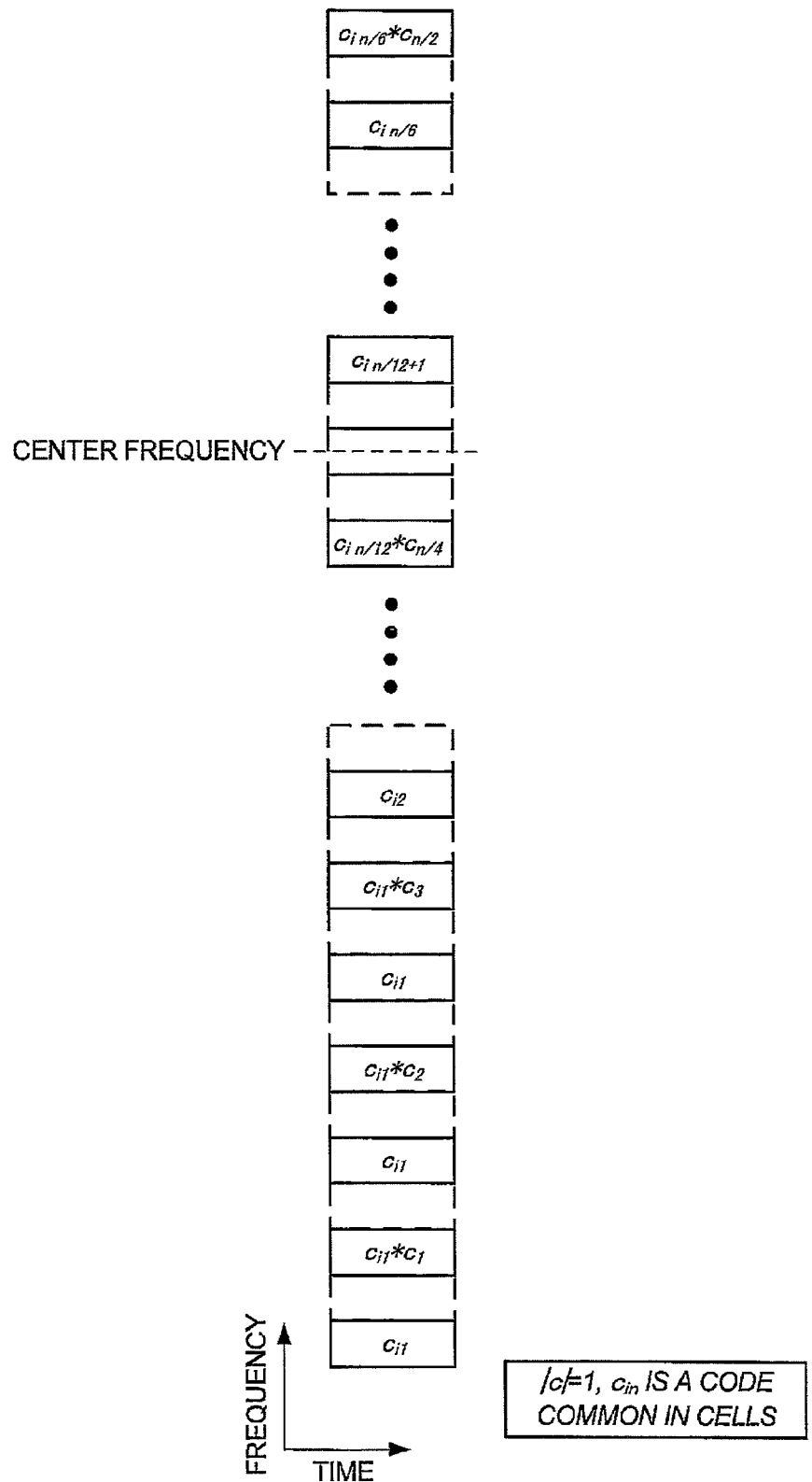
FIG. 30 is a diagram illustrating a structure on the frequency axis of a code sequence to transmit the cell specific information.

Described next is a code sequence to transmit the cell specific information. FIG. 30 is a diagram illustrating a structure on the frequency axis of a code sequence to transmit the cell specific information. In this Embodiment, the cell specific information is transmitted using the code sequence as shown in FIG. 30, and as distinct from Embodiments 2 and 3, the information is formed of a code sequence different between cells, and another code sequence common in cells. More specifically, $c_{ik}$ (k is a natural number from 1 to n/6, n is the number of SCH subcarriers) as shown in FIG. 30 is the "code common in cells" and $c_l$ (l is a natural number from 1 to n/2) is the "code specific to the cell".

The code sequence of FIG. 30 is configured sequentially using six chips as a group from the low-frequency side. In six chips, odd-numbered SCH subcarriers (subcarrier indexes 1, 5, 9) are assigned the "code common in cells". Even-numbered SCH subcarriers (subcarrier indexes 3, 7, 11) are assigned a code obtained by multiplying the code assigned to the odd-numbered subcarriers by the cell specific code (i.e. a code having phase difference information with respect to a phase reference code). The codes assigned to odd-numbered subcarriers are the same among six chips, but do not need to be the same as those used in other six chips.

Three kinds of code sequences as shown above are code sequences constituting the SCH, and the SCH is configured by multiplying these code sequences. Then, a transmitter of each sector transmits a multicarrier signal containing the SCH.

A transmission method of the SCH and a configuration of a transmitter in this Embodiment are the same as in Embodiment shown above, and descriptions thereof are omitted. The different respect is a code generated in the sector specific code generating section 63 in the SCH data processing section (see FIGS. 29 and 30).

A receiver configuration and a reception method in this Embodiment are basically the same as in the Embodiment shown above except the first step. The timing detecting section 103 (FIG. 13) in Embodiment 2 shown above delays a received signal by ½ effective symbol period to multiply by the signal, and detects a position of the SCH symbol. In this Embodiment, a SCH symbol is detected by calculating a cross-correlation value between a received signal and a replica signal of the SCH symbol generated or stored in a mobile station. Procedures of a cell search will be described below.

A mobile station receives a radio signal transmitted from the base station in the antenna section 100 as in Embodiment 2. The analog reception circuit section 101 converts the received radio signal from the radio frequency band to a baseband frequency band. The A/D (Analog/Digital) conversion section 102 converts the signal with the converted baseband frequency band from the analog signal into a digital signal. Next, the timing detecting section 103 performs the SCH detection processing to acquire symbol synchronization, based on reception data that is converted into digital data in the A/D conversion section 102.

Figure 31:
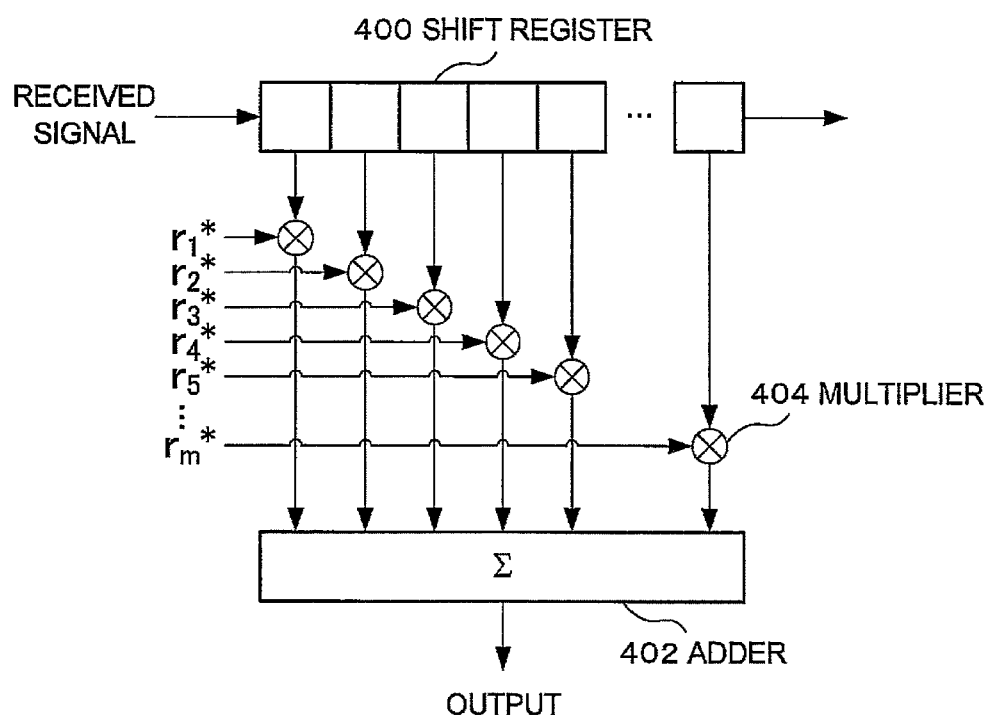
FIG. 31 is a block diagram illustrating a configuration of a receiver for detecting a time position of SCH by a replica signal to acquire time synchronization.

FIG. 31 is a block diagram illustrating a configuration (including a correlator) of a symbol synchronization circuit in this Embodiment. The symbol synchronization circuit in FIG. 31 has an m-stage shift register 400, adder 402, and multiplier 404. In the symbol synchronization circuit in FIG. 31, a reception signal is input to the m-stage shift register 400. A signal output from the shift register 400 is multiplied by a complex conjugate of a replica signal ($r_m$: m is a natural number) generated by the mobile station or beforehand stored in the mobile station.

The replica signal is derived from a value of multiplication by three codes constituting the SCH subcarrier as described previously, and data on the odd-numbered SCH subcarrier (index numbers 1, 5, 9 . . . ) is used. Since the reception signal is data in the time-axis direction, a signal in the time-axis direction is calculated as the replica signal from the data using the above-mentioned SCH subcarrier.

The data of the odd-numbered SCH subcarrier is used for generation of such a replica signal. As described above, the odd-numbered SCH subcarrier is multiplied by the sector common code $S_0$ (see FIG. 29A) common in all the cells and a code (code as a phase reference) indicating part of the cell specific information common in all the cells as shown in FIG. 30. In other words, in the odd-numbered SCH subcarriers, the sector specific code as shown in FIG. 29B is only different between cells. Accordingly, in this Embodiment, three replica signals are generated corresponding to the number of sector specific codes, a reception signal and cross-correlation values are monitored, and it is thereby possible to detect a SCH time position.

In addition, as in Embodiments 2 and 3, a plurality of peaks is detected by signals from a plurality of cells, and generally, the mobile station determines the timing with the highest peak of the correlation value to be timing of the SCH transmitted from the nearest cell, and starts the operation of connecting to the base station.

As described above, in the first step of the cell search in this Embodiment, symbol synchronization is achieved using cross-correlation values of a reception signal and replica signals. The second step and third step in the cell search method in this Embodiment are the same as in Embodiment 2 shown above, and descriptions thereof are omitted.

Embodiment 5

Embodiment 5 of the invention will be described below. Following items 1 to 5 are described in this Embodiment.

[1. Embodying of the First Step in a Cell Search]

Described herein is a specific variation of the technique for performing detection of SCH timing in the first step of a cell search by the cross-correlation method using time waveforms of replica signals of sector specific codes. This is a modification of Embodiment 4. In other words, in the Embodiment shown above, the total number of subcarriers (except the DC subcarrier) is based on multiples of "6", but this Embodiment specifically defines the number of subcarriers as "75" (except the DC subcarrier). With respect to a subcarrier multiplied by a code element as a phase reference, this Embodiment is the same as Embodiment 4 in the respects that the subcarrier is substantially multiplied by (the code common in all the cells) and (the sector specific code), and that the timing of the SCH is detected by the cross-correlation method using the subcarrier. However, this Embodiment includes subcarriers (subcarriers multiplied by a dummy code) that do not contribute to detection of the cell specific information. This Embodiment is the same as Embodiment 4 in the respect that as well as the method using cross-correlation, the auto-correlation method can be used.

[2. Formation of a Characteristic Time Waveform by Symmetric Arrangement of Subcarriers as a Phase Reference]

Subcarriers multiplied by code elements as a phase reference are arranged symmetrically on the low-frequency side and the high-frequency side with respect to the center frequency. The subcarriers multiplied by code elements as a phase reference are SCH subcarriers used in detection of SCH timing by the cross-correlation method, and may be referred to as "cross-correlation detection SCH subcarriers" in the following description. Embodiment 4 is an embodiment for performing an assignment with respect to the low-frequency side, and does not need to meet the conditions of this Embodiment providing a symmetric arrangement with respect to the center frequency.

The cross-correlation detection SCH subcarriers are symmetrically arranged with respect to the center frequency at predetermined intervals. As a time waveform of a signal on which the subcarriers are mixed, in a one-symbol period (in which the SCH is arranged), for example, by using the second, sixth, tenth, . . . subcarriers from the center, a waveform with the same amplitude and inverted polarity such as "B", "−B", "B", "−B", (B has the arbitrary signal amplitude: reference waveform) is repeated on a one-fourth (¼) symbol basis, and thus, the time waveform is formed with specific periodicity. Further, by using the fourth, eighth, twelfth, . . . subcarriers from the center, a time waveform such as "D", "D", "D", "D", (D has the arbitrary signal amplitude: reference waveform) is formed on a one-fourth symbol basis. Accordingly, the replica time waveform prepared on the receiver side for cross-correlation detection is also a time waveform varying as "B", "−B", "B", "−B", or "D", "D", "D", "D", on a one-fourth symbol basis. In other words, it is only essential enabling detection of a characteristic signal waveform on a one-fourth symbol basis. Accordingly, it is possible to simplify the configuration of a correlator.

[3. Sector Identification in the Second Step in the Cell Search]

Herein, despreading using the sector specific code is executed, and it is intended to enhance the flexibility of the operation for detecting a sector showing the maximum correlation value. Codes multiplied by a subcarrier (cross-correlation detection subcarrier) multiplied by the code element as a phase reference are the (sector common code common in all the cells), (sector specific code) and (cell specific code common in all the cells), and this respect is the same as in Embodiment 4. However, in this Embodiment, in all the subcarriers as a phase reference among all the subcarriers, both of the sector common code (reference code) common in all the cells and the cell specific code common in all the cells are made "1". In Embodiment 4, new codes are used every six subcarriers as the cell specific code ($C_{i1}$, $C_{i2}$ . . . $C_{in/6}$ in FIG. 30). In other words, first six subcarriers are of $C_{i1}$, and next six subcarriers are of $C_{i2}$. In this case, to perform despreading for sector identification, it is required to perform despreading every six subcarriers sequentially. In this respect, the flexibility of sector identification is limited. However, when $C_{i1}$, $C_{i2}$ . . . $C_{in/6}$ are made all "1" as described above, all of the cell specific codes multiplied by subcarriers as a phase reference among all the subcarriers are "1". Accordingly, the subcarrier is multiplied by "1 (sector common code common in all the cells)"×"1 (cell specific code common in all the cells)"×"sector specific code (P1, P2 or P3): see FIG. 29B). Eventually, the code multiplied by each subcarrier as a phase reference is the sector specific code (P1, P2 or P3). By this means, the need is eliminated for performing despreading of six subcarriers as a group, and it is only essential selecting anyone of subcarriers from among all the subcarriers to specify the sector specific code (P1, P2 or P3), and executing despreading using this code. Accordingly, for sector identification, such a limitation is eliminated that despreading is performed every six subcarriers. As a result, the flexibility of sector identification processing is enhanced.

[4. Consideration of Performing Sector Identification Using Cross-Correlation of Time Waveforms Prior to FFT Instead of Correlation Value Peak Determination by Despreading Subsequent to FFT Processing]

In adopting the code structure of above-mentioned (3), without performing despreading using orthogonal codes (P1, P2, P3) after FFT, it is possible to identify a nearest sector before the FFT processing using the cross-correlation method by replica time waveforms described in (1) as mentioned above. In other words, before the FFT processing, a cross-correlation peak is detected using replica time waveforms (time waveform formed by one of codes 1, 2 and 3 in FIG. 34) of the sector specific codes, the code (one of codes 1, 2 and 3 in FIG. 34) providing the maximum peak is specified, and it is thereby possible to identify the nearest sector. Particularly, in the case of acquiring timing synchronization of the SCH by the replica correlation method in the first step of a cell search, it is possible to perform sector identification by comparing the correlation values calculated in timing synchronization acquisition between different sector specific codes, and it is thereby not necessary to perform the operation of sector identification again after the acquisition. In addition, to apply the cross-correlation method using the replica time waveforms, it is a condition that mobile stations know various sector specific codes transmitted from the base station. As the sector identification method, it can be determined as appropriate using the technique for detecting correlation by despreading using orthogonal codes, or using the technique for detecting cross-correlation using replica time waveforms, in consideration of required detection accuracy, restrictions on circuitry, or the like.

[5. Clarification of that the Sector Specific Code Includes a Sector Group Specific Code as Well as a Code to Directly Identify the Sector]

When the number of sectors is exceedingly high, groups with the higher number of subcarriers are required to reserve orthogonal codes, and the case is assumed that the number of subcarriers lacks. In such a case, the concept of "sector group" is introduced by grouping a plurality of sectors to identify the sector group by the sector specific code. In other words, the "sector specific code" as described above does not need to be always a code for directly identifying the sector, and may be a code indicating a sector group with some sectors. This concept is common and applied to all the Embodiments shown above. Each of these respects will specifically be described.

In Embodiments 1 to 4 shown above, the explanations are made based on that the total number of subcarriers (including the center DC subcarrier) is 2n+1, but this Embodiment describes about the specific case that the total number of subcarriers as "76" (including the center DC subcarrier). In this Embodiment, since 75 subcarriers except the DC subcarrier are used, the number of subcarriers is different between the low-frequency side and high-frequency side in the band with respect to the DC subcarrier as a center. In addition, also in this Embodiment, since the cell specific information is notified using a phase difference of subcarriers constituting the SCH, the number of subcarriers essentially used is 2n+1 (n=37 in this Embodiment) including the DC subcarrier.

In this Embodiment, as in Embodiment 4, timing detection of the SCH in the first step of the 3-step cell search is performed by cross-correlation processing between a reception signal and replica signals generated in a mobile station. Further, by arranging subcarriers as targets to perform the cross-correlation processing using the replica signals in specific positions, the characteristic time waveform is made. To actualize the aforementioned respects, it is necessary to devise the data structure of the SCH and subcarrier arrangement.

The SCH position detection method of the first step shown in this Embodiment can be implemented using the frame structure and arrangement of the SCH shown in Embodiment 4 without modification. It is also possible to perform the second step or third step as in the Embodiment shown above.

According to the data structure of the SCH shown in this Embodiment, as in Embodiment 4, the SCH is actualized that indicates a periodical waveform (repeated waveform) in a symbol required for the auto-correlation detection method. At the same time, it is possible to achieve the SCH enabling application of the detection method using the cross-correlation detection method using replica signals. It is known that the auto-correlation detection method can be implemented generally by a circuit configuration simpler than that in the cross-correlation detection method, while a peak of the correlation value is detected more gently than in the cross-correlation detection method. It is known that the cross-correlation detection method enables more accurate time synchronization since a peak of the correlation value can be sharply detected, while the circuit configuration and processing is made complicated. Therefore, in part of wireless LAN communication schemes, in time synchronization, rough time synchronization is acquired by the auto-correlation detection method, and in a time interval limited to some extent, accurate time synchronization is acquired by the cross-correlation detection method. Also in this Embodiment, the similar technique can be used.

As the SCH timing detection method in the first step in this Embodiment, as described above, two detection methods can be applied. The auto-correlation detection method is the method of using a repeated waveform in the time domain of a SCH symbol determined by positions in the frequency domain of subcarriers used in the SCH, and therefore, does not have any differences from the method specifically shown in Embodiment 2 or 3. Accordingly, described below is the cross-correlation detection method using replica signals that is a feature of this Embodiment. The cross-correlation detection method uses a characteristic signal waveform formed by an arrangement of subcarriers.

This Embodiment uses an OFDM communication scheme in the downlink communication scheme as in Embodiment 2. Further, structures of a communication frame and resource block are assumed to have the same formats as shown in FIGS. 22 and 28. First, with respect to a synchronization physical channel (SCH) that is a feature of the invention, the specific structure will be described.

Figure 32:
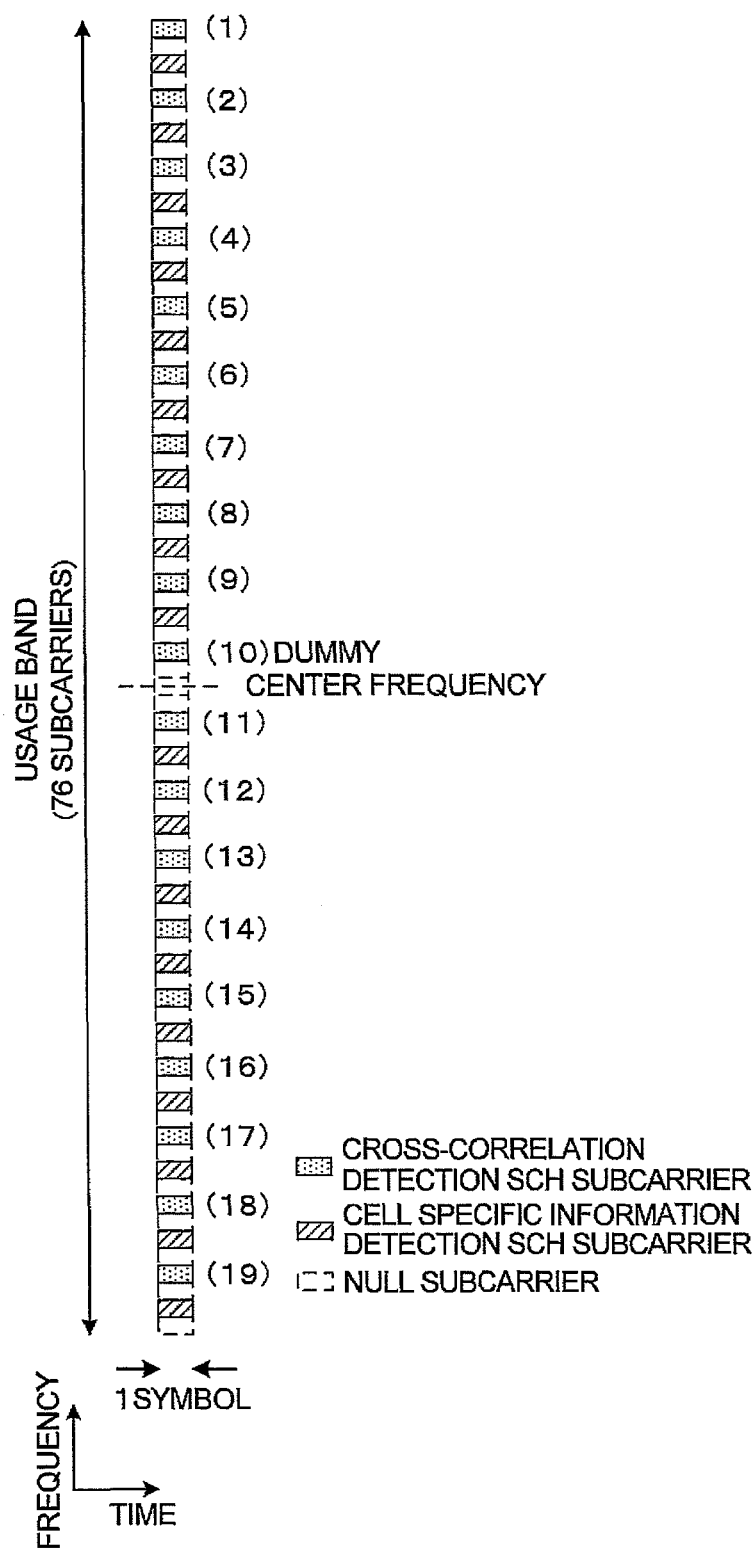
FIG. 32 is a diagram illustrating 76 subcarriers used in Embodiment 5 for each function.

FIG. 32 is a diagram illustrating 76 subcarriers used in this Embodiment for each function. As shown in the figure, the center DC subcarrier and odd-numbered subcarriers from the center are made null subcarriers, and the other subcarriers are used as SCH subcarriers. Among the SCH subcarriers, odd-numbered subcarriers from the center are used as subcarriers for use in cross-correlation detection i.e. subcarriers (cross-correlation detection SCH subcarriers) as a phase reference in detecting the cell specific information. Further, even-numbered SCH subcarriers from the center are used as subcarriers (referred to as cell specific information detection subcarriers as appropriate in the following description) multiplied by the cell specific information.

Herein, the odd-numbered SCH subcarriers from the center are second, sixth, tenth, fourteenth . . . subcarriers from the center as a whole. In addition, the center is assumed to be the zeroth. Further, the even-numbered SCH subcarriers from the center are fourth, eighth, twelfth . . . subcarriers from the center as a whole.

As described above, the cross-correlation detection SCH subcarriers are symmetrically arranged on the low-frequency side and the high-frequency side with respect to the center frequency. Further, the cross-correlation detection SCH subcarriers are arranged with three subcarriers between adjacent SCH subcarriers such as second, sixth, tenth . . . subcarriers when the center frequency is the zeroth. This Embodiment differs from Embodiment 4 in the respect that the center frequency is a reference. In FIG. 32, the number of arranged cross-correlation detection SCH subcarriers is different between the high-frequency side and low-frequency side with respect to the center frequency. In other words, ten subcarriers (1) to (10) are arranged on the high-frequency side, while nine subcarriers (11) to (19) are arranged on the low-frequency side. In addition, this Embodiment is the same as Embodiment 4 in the respect that the cross-correlation detection SCH subcarrier (subcarrier that is a phase reference) and the cell specific information detection SCH subcarrier are paired and used. Using a pair of subcarriers as a unit, in the case of FIG. 32, one cross-correlation detection SCH subcarrier (subcarrier that is a phase reference: subcarrier (10) in FIG. 32) is left on the high-frequency side, and this subcarrier (10) is assigned a dummy code (with "1" in this Embodiment).

Figure 33:
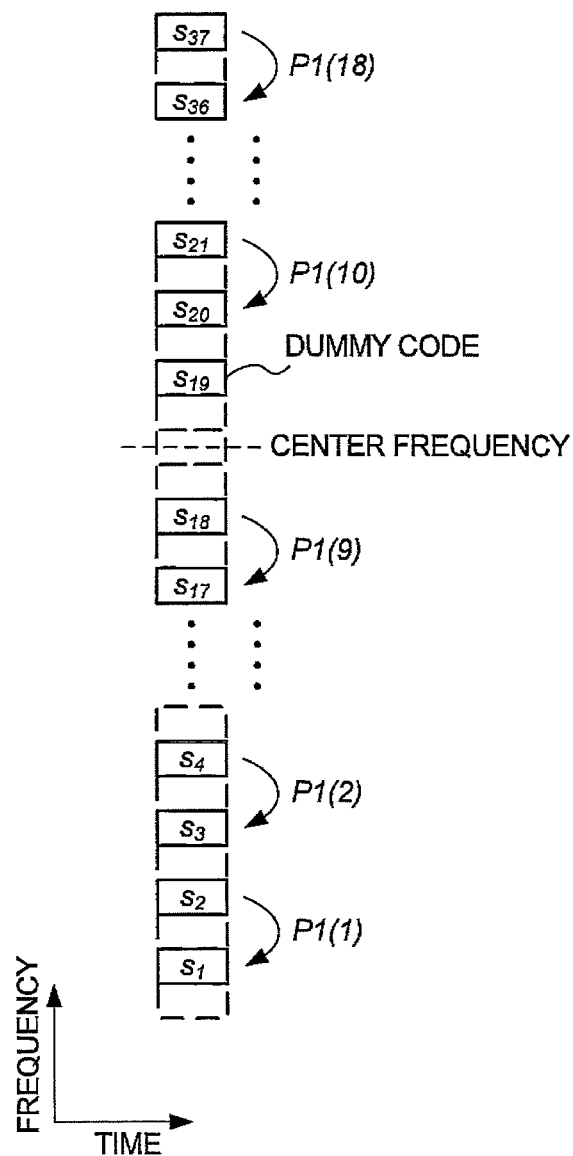
FIG. 33 is a diagram showing the relationship between a subcarrier (cell specific information detection SCH subcarrier) multiplied by the cell specific information and another subcarrier that is paired with the subcarrier and that is a subcarrier (cross-correlation detection SCH subcarrier) as a phase reference.

FIG. 33 is a diagram showing the relationship between a subcarrier (cell specific information detection SCH subcarrier) multiplied by the cell specific information and another subcarrier that is paired with the subcarrier and that is a subcarrier (cross-correlation detection SCH subcarrier) as a phase reference. In the case of 76 subcarriers in this Embodiment, 37 subcarriers can be used as SCH subcarriers. Accordingly, it is possible to set information P1($x$) (where $x=1$~18) with the code length of "18" as a relative value of the subcarrier (cross-correlation detection subcarrier) as a phase reference as described previously and the cell specific information detection subcarrier. In addition, in this Embodiment for assigning information as a pair, a single subcarrier is not used in code assignment. In other words, code C19 in FIG. 33 is a dummy code ("1" in this Embodiment).

Figure 34C:
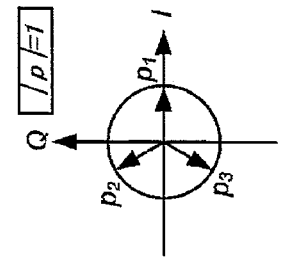
FIG. 34C is a diagram showing the basic concept of generation of the sector specific code, and shows vectors on the complex phase plane in Embodiment 5.
Figure 34B:
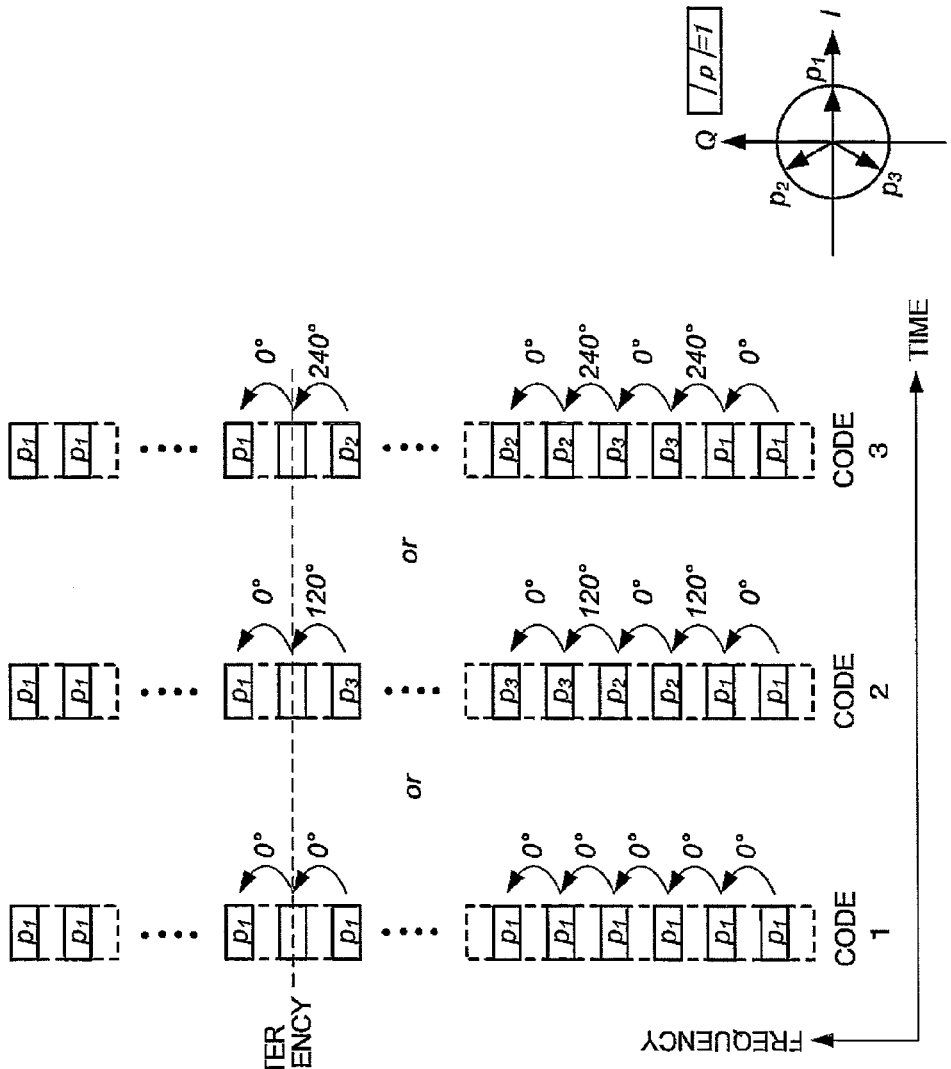
FIG. 34B is a diagram showing structures of three sector specific codes in Embodiment 5.
Figure 34A:
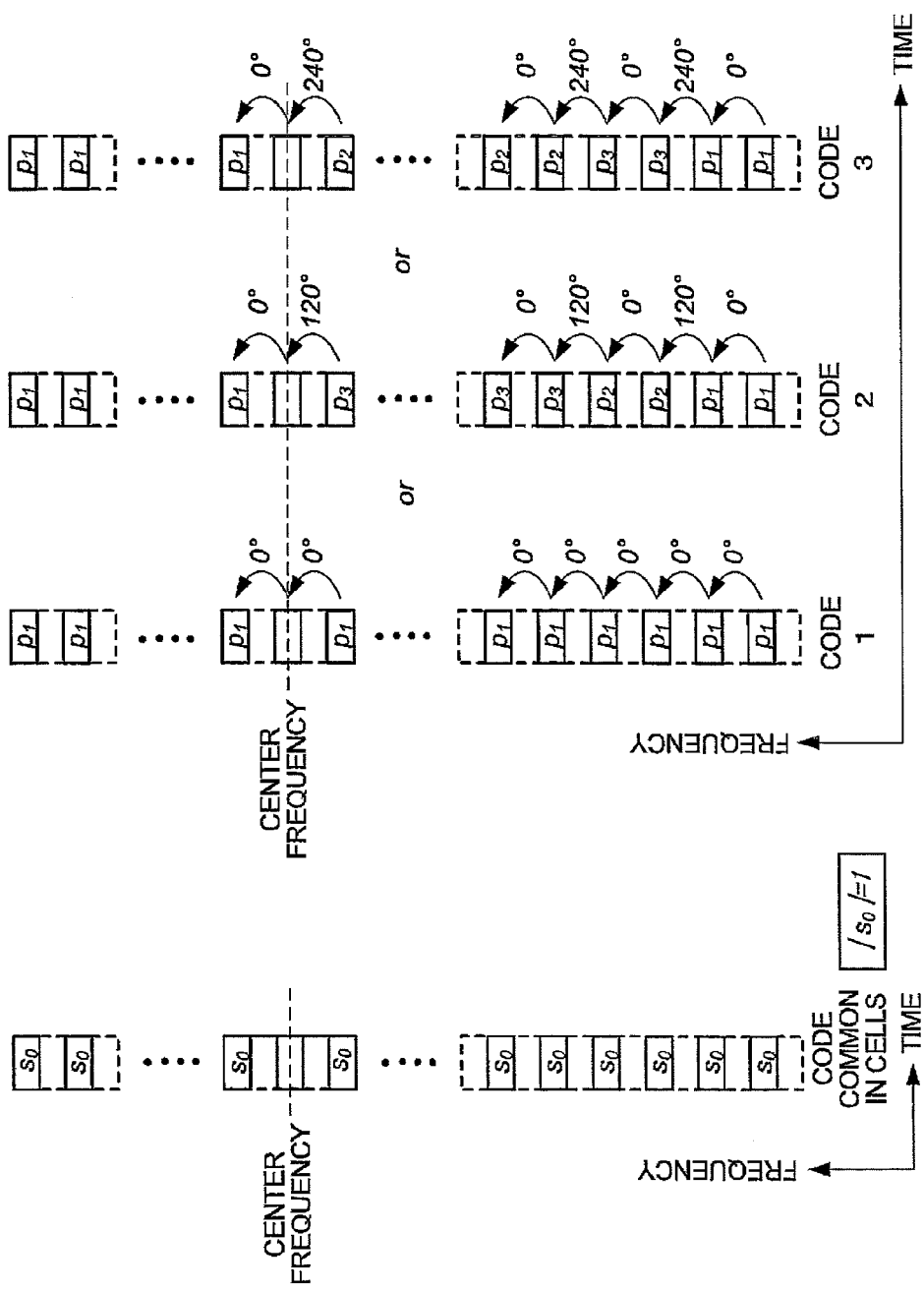
FIG. 34A is a diagram showing an assignment of a sector common code on the frequency axis in Embodiment 5.

As in Embodiment 4, FIGS. 34A to 34C are diagrams to explain a data structure of the SCH concurrently transmitted from three sectors in the same cell. FIG. 34A is a diagram showing an assignment of the sector common code on the frequency axis, and FIG. 34B is a diagram showing structures of three sector specific codes. Then, FIG. 34C is a diagram showing the basic concept of generation of the sector specific code, and shows vectors on the complex phase plane.

The basic structure is the same as in Embodiment 4, but as described previously, differs from Embodiment 4 in the positional relation between a subcarrier for use in cross-correlation detection and a subcarrier to multiply by the cell specific information as described previously. As shown in FIG. 32, as SCH subcarriers, even-numbered subcarriers on the higher and lower frequency sides than the center DC subcarrier are used.

FIGS. 35A to D are diagrams to explain that a waveform in the time domain formed by a plurality of combined SCH subcarriers in a SCH-symbol period is of repetition of a reference waveform (or, waveform of the inverted reference waveform) in a one-symbol period by devising the arrangement of cross-correlation detection SCH subcarriers on the frequency axis and the number of SCH symbols on the time axis.

Figure 35A:
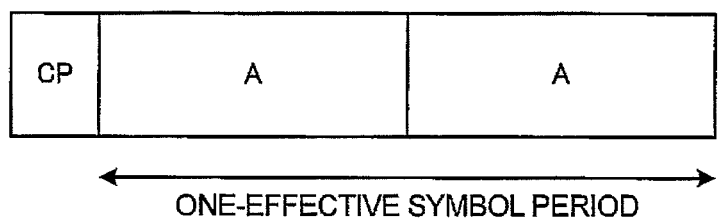
FIGS. 35A to 35D are diagrams to explain that a waveform in the time domain formed by a plurality of combined SCH subcarriers in a SCH-symbol period is of repetition of a reference waveform (or, waveform of the inverted reference waveform) in a one-symbol period in Embodiment 5.

In this Embodiment (including the Embodiment shown above), a SCH subcarrier is arranged periodically at frequency intervals of every two subcarriers on the frequency axis (for example, see FIG. 25). When thus periodically arranged SCH subcarriers in a one-symbol period are combined, as shown in FIG. 35A, a time waveform (waveform in the time domain prior to FFT) is obtained such that a reference waveform (assumed as A) is repeated on a half ($\frac{1}{2}$) symbol basis in a one-effective symbol period (period obtained by subtracting a period of inserted GI from a one-symbol period). Accordingly, as described in the Embodiment shown above, the time waveform is delayed by $\frac{1}{2}$ effective symbol to calculate correlation with an original time waveform, and the correlation peak is thereby obtained. Accordingly, it is possible to detect a SCH position (the processing of the first step in a cell search by the auto-correlation method).

Figure 35B:
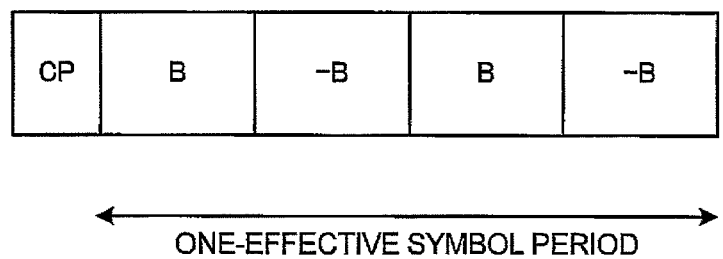
Figure 35C:
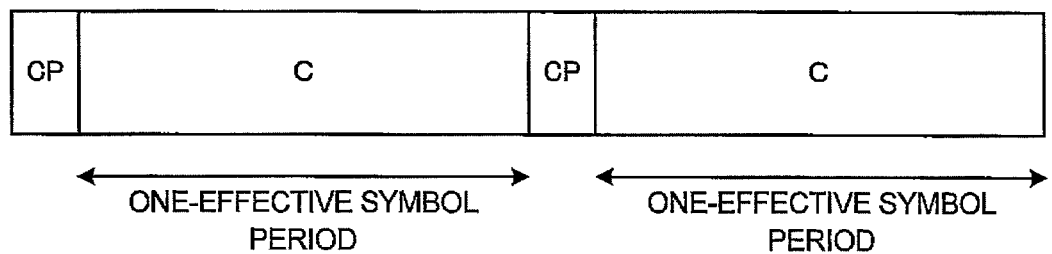

In addition, as shown in FIG. 19, in the case where the SCH is arranged in last two symbols in a one-frame period, as shown in FIG. 35C, the same time waveform (assumed as C) is repeated in a two-adjacent effective symbol period. Accordingly, the time waveform is delayed by one symbol to calculate correlation with an original time waveform, and the correlation peak is thereby obtained. Accordingly, it is possible to detect a SCH position (the processing of the first step in a cell search by the auto-correlation method).

Meanwhile, in Embodiment 5, further, the cross-correlation detection SCHs are arranged symmetrically on the low-frequency side and the high-frequency side with respect to the center frequency. In other words, second, sixth, tenth, fourteenth . . . subcarriers (every fourth subcarrier starting with the second subcarrier) from the DC subcarrier as the center are used as described previously. By this means, a characteristic time waveform is formed which has a configuration where a signal is repeated in a half ($\frac{1}{2}$) period of an effective symbol and further, in a half ($\frac{1}{2}$) of the period i.e. in a one-fourth ($\frac{1}{4}$) period of the whole as a unit, a time wave form with the polarity of the amplitude inverted is repeated. More specifically, as shown in FIG. 35B, the time waveform such that B, −B, B, −B is repeated is formed. This phenomenon is caused by symmetry in the time domain regarding the frequency relationship between mutually orthogonal subcarriers in the OFDM communication scheme. In this case, it is possible to specify a SCH position by detecting the characteristic periodicity on a one-fourth ($\frac{1}{4}$) effective symbol basis. By using this characteristic, it is possible to produce a correlator used in cross-correlation detection with a simpler configuration. In other words, by the correlator with a simple configuration, it is possible to detect the SCH timing with high accuracy.

Figure 35D:
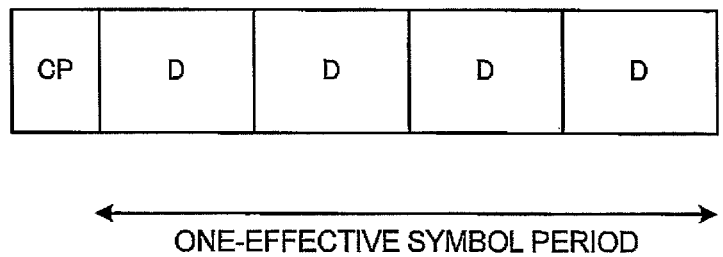

Further, by using fourth, eighth, twelfth, sixteenth . . . cross-correlation detection SCH subcarriers (every fourth subcarrier starting with the fourth subcarrier) from the DC subcarrier as the center, it is also possible to form a characteristic time waveform such that a signal is repeated in a one-fourth ($\frac{1}{4}$) period of an effective symbol. More specifically, as shown in FIG. 35D, the time waveform that D, D, D, D is repeated is formed.

The most simplified subcarrier structure with the cell specific code common in all cells made all "1" will specifically be described below. This subcarrier structure is advantageous in practical use.

A signal shown in FIG. 34A indicates the sector common code constituting the SCH. In Embodiment 4, as shown in FIG. 29A, SCH subcarriers are respectively assigned $S_{01}$ to $S_{0n/6}$ every six chips. In this Embodiment, all the SCH subcarriers are assigned $S_0$. Herein, $S_0$ is an arbitrary value expressed by $A*\exp(j\omega)$, where A represents the amplitude (in addition, in this Embodiment, the explanation is made with the amplitude being "1"), j represents an imaginary unit, and ω represents a phase. All the SCH subcarriers are multiplied by $S_0$, while codes of subcarriers as a phase reference are uniquely made "1" (described later). By this means, the need is eliminated for always performing power calculation for sector identification using a group of six subcarriers as a unit. In other words, using code 2 of FIG. 34B as an example, it is possible to select each of codes "P1", "P2" and "P3" from any one of SCH subcarriers on the frequency axis to perform the power calculation processing. In addition, since there is the condition that subcarriers used in the power calculation processing can be regarded as having the same propagation path, the accuracy decreases when selecting subcarriers apart from each other on the frequency axis, and it is desirable to use adjacent subcarriers.

In this Embodiment, as in Embodiment 4, the sector common code is a code common in all the cells. Further, among the cell specific codes, a code element as a phase reference is also common in all the cells.

The SCH is configured by multiplying three kinds of codes (sector common code, sector specific code and cell specific code). Herein, the sector common code is made common in cells, and among the cell specific codes, a code element as a phase reference is also made common in the cells. As a result, with respect to a subcarrier multiplied by the code element as a phase reference, multiplied codes are the (sector common code common in all the cells), (sector specific code) and (cell specific code common in all the cells), and substantially, the (codes common in all the cells) are multiplied by the (sector specific code). In other words, with respect to the subcarrier multiplied by the code element as a phase reference, three kinds of codes are multiplied, and among the codes, two codes are common in all the cells. Accordingly, a different code is only the sector specific code. This means that correlation detection using replicas of the sector specific codes can be performed with ease.

Therefore, the reception apparatus side prepares a time waveform of a replica code of the sector specific code corresponding to each sector, multiplies a reception signal (signal prior to FFT) by the time waveform of the replica signal to detect a correlation peak, and is thereby capable of detecting the SCH timing in the reception signal with high accuracy. Accordingly, it is made possible to perform subsequent sector identification and cell identification with higher efficiency.

Further, in this Embodiment, by arranging subcarrier positions for use in cross-correlation detection in particular positions, the same signal wave form is repeated at ½ effective symbol length intervals as shown in FIG. 35B. Furthermore, a signal waveform is formed such that the sign is inverted at ¼ effective symbol length intervals. By this means, it is possible to adopt a configuration of a simplified correlator using the characteristics.

However, even when such a specialized SCH structure is adopted, the repeated signal waveform is formed in a SCH-symbol interval, which is not different, and it is also possible to perform position detection by the auto-correlation method. The auto-correlation method is a method of detecting correlation between a signal delayed from a reception signal by a predetermined period and an original reception signal.

An example will specifically be described below with reference to drawings. The sector specific code is described first. FIG. 34B shows an example of the sector specific codes (herein, the number of sectors is "3"). Herein, the same codes as shown in Embodiment 4 are used.

Figure 36:
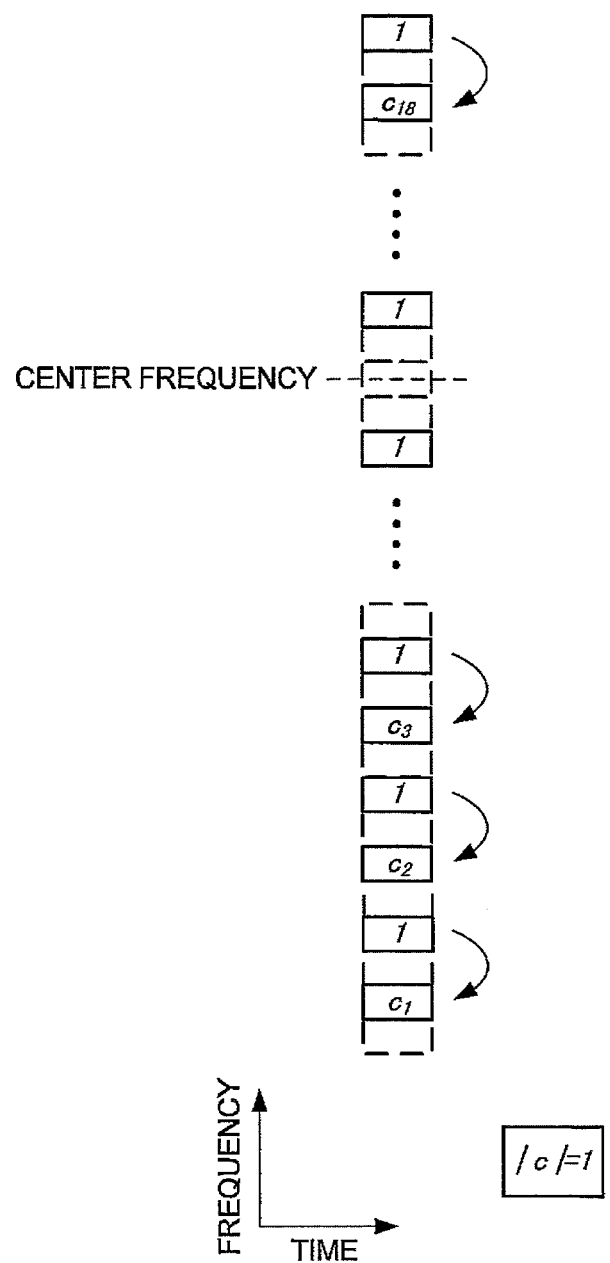
FIG. 36 is a diagram illustrating a structure on the frequency axis of a code sequence to transmit the cell specific information in Embodiment 5.

Described next is a code sequence to transmit the cell specific information. FIG. 36 is a diagram illustrating a structure on the frequency axis of a code sequence to transmit the cell specific information. In this Embodiment, the cell specific information is transmitted using the code sequence as shown in FIG. 36. cl as shown in FIG. 36 (l is a natural number from 1 to 18) is the "code specific to the cell", and notifies a mobile station of the cell specific information. cl is a code sequence with the amplitude of "1".

The code sequence of Embodiment 4 as shown in FIG. 30 is configured sequentially using six chips as a group from the low-frequency side. The code sequence of this Embodiment as shown in FIG. 36 is of a specialized form that code sequence cik of FIG. 30 is all "1". By this means, the limitation as described previously is eliminated that a group of adjacent six subcarriers on the frequency axis is necessarily selected in calculating the sector power, and the flexibility of the sector identification processing is enhanced.

Three kinds of code sequences as shown above are code sequences constituting the SCH, and the SCH is configured by multiplying these code sequences. Then, a transmitter of each sector transmits a multicarrier signal containing the SCH.

A transmission method of the SCH and a configuration of a transmitter in this Embodiment are the same as in Embodiment 2 shown above, and descriptions thereof are omitted. The different respect is a code (see FIGS. 35 and 36) generated in the sector specific code generating section 63 in the SCH data processing section 60.

A receiver configuration and a reception method in this Embodiment are basically the same as in Embodiment 4 shown above, and descriptions thereof are omitted. Further, in adopting the code structure as shown in FIG. 36, without performing despreading using orthogonal codes (P1, P2, P3) after FFT, it is possible to identify a nearest sector before the FFT processing using the cross-correlation method by replica time waveform described as in the processing of the first step in the cell search.

In other words, before the FFT processing, a cross-correlation peak is detected using replica time waveforms (time waveform formed by one of codes 1, 2 and 3 in FIG. 34) of the sector specific codes, the code (one of codes 1, 2 and 3 in FIG. 34) providing the maximum peak is specified, and it is thereby possible to identify the nearest sector.

Particularly, when SCH time synchronization is acquired by the cross-correlation method in the first step of the cell search, it is possible to identify a sector using the result without modification. In other words, SCH time synchronization is acquired by the position of correlation value in the time domain by cross-correlation detection, and the amplitude enables determination of a sector providing high reception power.

As the sector identification method, it can be determined as appropriate using the technique for detecting correlation by despreading using orthogonal codes, or using the technique for detecting cross-correlation using replica time waveforms, in consideration of required detection accuracy, restrictions on circuitry, or the like.

Further, when the number of sectors is exceedingly high, groups with the higher number of subcarriers are required to reserve orthogonal codes, and the case is assumed that the number of subcarriers lacks. In such a case, the concept of "sector group" is introduced by grouping a plurality of sectors to identify the sector group by the sector specific code. In other words, the "sector specific code" as described above does not need to be always a code for directly identifying the sector, and may be a code indicating a sector group with some sectors. This concept is common and applied to all the Embodiments shown above.

As described above, according to the invention, by a sector common code being multiplied by a sector specific code, it is possible to identify a sector only by despreading and correlation detection using the SCH without using a pilot channel. Accordingly, with respect to sector identification, the need is eliminated for despreading and correlation detection processing using a pilot channel, and it is possible to reduce the capacity of memory to be used in correlation calculation using the pilot channel.

Further, since the SCH is multiplied by the sector specific code, it is possible to eliminate interference between sectors even in a boundary of sectors. Furthermore, it is possible to obtain the effect of enhancing anti-fading characteristics by randomizing effect. It is easy to increase the number of sector specific codes (orthogonal codes) assigned for each sector corresponding to an increase in the number of sectors, and to respond to the sector configuration flexibly.

Moreover, when it is possible to reserve the adequate number of subcarriers in multiplying the SCH by the cell specific code, only the SCH enables a cell ID to be identified directly. In this case, the cell search processing including sector identification is completed by 2-step processing using only the SCH (2-step cell search), and the search process can be reduced as compared with the conventional 3-step cell search.

Further, by devising structures, contents and arrangement on the frequency axis of a cell specific code and sector specific code to multiply, it is possible to prevent the sector specific code and cell specific code from imposing an adverse effect on each other, and to suppress a decrease in information transmission accuracy. Furthermore, each of the information can be demodulated independently (i.e. in parallel processing), and it is thereby possible to reduce the processing time of cell search including sector search.

In other words, a 2m-chip code is generated by combining two orthogonal m-chip codes, them-chip code is used for sector identification, and the other m-chip code is used for identification of cell specific information. The cell specific information is transmitted as phase difference information between subcarriers (that are more preferably adjoined on the frequency axis) multiplied by a sector specific code element of the same value, and it is thereby possible to efficiently transmit the sector specific information and cell specific information with efficiency, while the receiving side can divide and extract both information with efficiency.

Further, in the cell search method of the invention, it is possible to complete the cell search by timing detection of the SCH (first step) on the time axis by an auto-correlation method using the periodicity of the SCH or cross-correlation method using time waveforms of replica codes of the sector specific codes, and identification of frame timing and identification of a sector ID and cell ID (second step) based on information on the frequency axis. Accordingly, it is possible to reduce the search process as compared with the conventional 3-step cell search.

Further, despreading and correlation detection using a pilot channel is required only in demodulating a data channel while being not required in a cell search, and it is thereby possible to achieve reductions (such as a reduction in memory capacity and the like) in loads of hardware used for correlation calculation of the pilot channel. Furthermore, since the sector specific code is multiplexed on the SCH with respect to sector identification, it is possible to obtain effects of having resistance to interference between sectors and fading. However, when the number of subcarriers is not adequate, the cell ID cannot be identified directly only by the SCH, and there may be a case that cell ID group information is only detected. In this case, the cell ID can be identified by implementing despreading and correlation detection using a pilot channel as processing of the third step.

Moreover, according to the multicarrier transmission/reception apparatus of the invention, fast transmission with large capacity is allowed on downlink.

Thus, according to the invention, it is possible to decrease the process required for cell search processing including sector identification, while reducing the capacity of memory for storing correlation detection results using a pilot channel. It is further possible to actualize a faster cell search including sector identification with high accuracy while improving resistance to interference or anti-fading characteristics of the cell search processing including sector identification without increasing loads on a transmission/reception apparatus.

Further, the invention includes various variations (specific examples, modifications and applications), and the variations contribute to practical application of communication schemes conforming to the E-UTRA (Evolved-UTRA). For example, in the processing (detection processing of SCH timing) of the first step in the cell search, as well as the auto-correlation method, it is possible to adopt a cross-correlation method with a particular time waveform noted. In this case, it is possible to obtain the effect of enabling the configuration of a correlator to be simplified. Further, by unifying all the codes of subcarriers as a phase reference on the frequency axis to, for example, "1", it is possible to eliminate limitations that six subcarriers should be a group in despreading using the sector specific code. Furthermore, when a mobile station knows each kind of sector specific code transmitted from the base station, nearest sector detection can be performed by detection using cross-correlation by time waveform prior to FFT without despreading. Moreover, when the number of sectors increases, it is possible to adopt a "sector group specific code" as the "sector specific code".

Furthermore, the invention is capable of being configured as a data structure of a synchronization channel (SCH). In other words, a data structure of the invention is a data structure of a synchronization channel (SCH) in a mobile communication system adopting a multicarrier communication scheme in which a cell is divided into a plurality of cells, a base station controlling over the cell transmits downlink signals to mobile stations in the cell by multicarrier communication, and the downlink signal includes a synchronization channel (SCH) capable of being used in a cell search including sector identification, where a sector common code common in a plurality of sectors in the same cell is multiplied by a sector specific code varying with each sector in the same cell, and it is thereby made possible to execute a cell search including sector identification using the synchronization channel (SCH).

A new structure including the sector specific code is adopted as a data structure of the synchronization channel (SCH: hereinafter, simply referred to as "SCH" as appropriate) included on downlink of the multicarrier mobile communication scheme. In other words, the sector common code is multiplied by the sector specific code, and it is intended to identify a sector only by despreading and correlation detection using the synchronization channel (SCH) without using a pilot channel. That is, the invention is to vary the SCH conventionally used to be common (i.e. non-orthogonal with respect to sectors) in sectors in a single cell to an orthogonal channel specific for each sector, and enables direct sector identification using the SCH. Accordingly, with respect to sector identification, the need is eliminated for despreading and correlation detection processing using a pilot channel, and it is possible to reduce the capacity of memory to be used in correlation calculation using the pilot channel. Further, since the SCH is multiplied by the sector specific code, it is possible to eliminate interference between sectors even in a boundary of sectors. Furthermore, it is possible to obtain the effect of enhancing anti-fading characteristics by randomizing effect. Moreover, when the information to multiplex on the SCH can be increased, it is brought into view to directly identify a cell ID only by the SCH, and in this case, it is possible to achieve the cell search processing including sector identification by 2-step processing (2-step cell search) using only the SCH.

Further, in a data structure of the synchronization channel (SCH) of the invention, the sector specific code is configured by making m (m is a natural number of "2" or more) code elements a group, and assigning a group of code elements repeatedly to subcarriers on the frequency axis, while sector specific codes corresponding to the sectors are orthogonal to one another.

The respect is clarified that the sector specific code is repeatedly assigned to subcarriers on the frequency axis on a unit of a group of m code elements, and that the m code elements are orthogonal for each sector. In addition, the term of "code element" is used for the sake of convenience to distinguish between "code as a higher concept" meaning a "code sequence" and each code (code as a lower concept") that is a structural element of the code sequence, and for example, corresponds to a "chip" that is a unit of despreading. Further, by assigning code elements to subcarriers on the frequency axis, for example, the phase of the subcarrier varies, and it is thereby possible to transmit the sector specific information. Herein, as an example, assuming that m=3, code M1 corresponding to sector 1 is repeatedly assigned from the low-frequency side to the high-frequency side in a three-code element period such as M1=(m1, m2, m3, m1, m2, m3, . . . ) on the frequency axis on a unit of code elements (m1, m2, m3). Code M2 of sector 2 is also repeatedly assigned from the low-frequency side to the high-frequency side in a three-code element period such as M2=(m4, m5, m6, m4, m5, m6, . . . ). Then, (m1, m2, m3) and (m4, m5, m6) that are respectively structural units of code M1 and M2 are mutually orthogonal.

For example, when a complex conjugate of each of m1, m2 and m3 is multiplied (despread) by codes M1 and M2, a high correlation value is shown on code M1, while a correlation value of code M2 is "0", and it is possible to distinguish between both codes to extract. Described below is an example of the fundamental philosophy to generate orthogonal codes. On the complex phase plane (that is the IQ plane where the I axis corresponds to the real axis, and the Q axis corresponds to the imaginary axis), for example, three vectors (P1, P2, P3) with the amplitude of "1" arranged to form an angle of 120° with respect to one another are set. The three vectors have the relationship that vector addition thereof results in "0", and using the vectors, it is possible to generate orthogonal codes (in the case of m=3) with ease. For example, code M1=(P1, P1, P1), code M2=(P1, P2, P3), and code 3=(P1, P3, P2) are mutually orthogonal. For example, when each complex conjugate of code elements (P1, P2, P3) of code M2 is multiplied by each of codes M1, M2 and M3 each) and the code elements are added, the correlation value of code M2 is "3", while in the case of M1 and M3, the relationship of vectors P1, P2 and P3 is eventually kept without change as a relative relationship between code elements. Accordingly, the addition results in "0". In the aforementioned example, three vectors having the orthogonal relationship are used, and by increasing the number of vectors (for example, using four vectors forming an angle of 90 degrees), it is possible to further increase the number of code elements. By this means, it is possible to increase the number of codes (the above-mentioned example allows generation of three codes, M1, M2 and M3, and the number of code is "3") having the orthogonal relationship. Accordingly, when the number of sectors contained in a single cell increases, by using the above-mentioned philosophy, it is possible to generate orthogonal codes corresponding to the number of sectors with ease.

Further, the data structure of the synchronization channel (SCH) of the invention is formed by multiplying the sector common code, the sector specific code, and further, a cell specific code ("code indicating the cell specific information" or there is the case of being referred to as a "a code including a cell specific cell ID (or information indicating a cell ID group common in some cells").

By multiplying the SCH also by the cell specific code, when predetermined conditions are met, it is possible to directly identify a cell ID only by the SCH, as well as sector identification by the SCH. In this case, the cell search processing including sector identification is completed by 2-step processing using only the SCH (2-step cell search), and it is possible to reduce the search process as compared with the conventional 3-step cell search.

Further, in the data structure of the synchronization channel (SCH) of the invention, the cell specific code is a code indicating the cell specific information for a mobile station to acquire in a cell search. It is clarified that the cell specific code indicates the cell specific information (cell ID or the like).

Furthermore, in the data structure of the synchronization channel (SCH) of the invention, the sector common code is assigned to subcarriers on the frequency axis, the sector specific code is assigned to the subcarriers assigned the sector common code, and each of code elements constituting the cell specific code indicates information of a relative phase difference between a pair of subcarriers among the subcarriers assigned the sector common code. Accordingly, in the subcarriers assigned the sector common code on the frequency axis, one of a paired subcarrier is multiplied by the code element that is a phase reference, and the other subcarrier is multiplied by the code element indicating the relative phase difference.

It is clarified that the cell specific information (cell ID, antenna arrangement, BCH (Broadcast Channel) bandwidth, GI (Guard Interval, also referred to as CP: Cyclic Prefix) length and the like) is transmitted by information of a relative phase difference between two subcarriers arranged on the frequency axis. In other words, such a scheme is adopted that the cell specific code indicates a relative phase of a paired subcarrier without indicating an absolute phase of each subcarrier, it is thereby made ease generating the cell specific code, and for example, by using GCL codes, Walsh-Hadamard codes and like to correspond to the cell specific information, it is possible to notify a mobile station of the information. When the number of subcarriers is enough, all the information required for cell identification can be transmitted by the SCH.

Further, in the data structure of the synchronization channel (SCH) of the invention, the sector common code and each of code elements that are the phase references constituting the cell specific code are common codes in all the cells.

Thus, the data structure of the SCH is devised to enable the signal processing (signal processing to detect a position of the SCH in a reception signal) in the first step of a cell search to be implemented by a cross-correlation method using replicas of sector specific codes. Since the SCH is arranged periodically in a one-frame period, the position can be detected by the "auto-correlation method" using the periodicity, and using the "cross-correlation method" using replica codes actualizes a shaper correlation peak, and enables the SCH position to be detected with higher accuracy. The SCH is configured by multiplying three kinds of codes (sector common code, sector specific code and cell specific code). Herein, the sector common code is made common in all the cells, and among cell specific codes, a code element as a phase reference is also made common in all the cells. Codes multiplied by a subcarrier multiplied by the code element as a phase reference are the (sector common code common in all the cells), (sector specific code) and (cell specific code common in all the cells), and substantially, the (codes common in all the cells) are multiplied by the (sector specific code). In other words, with respect to the subcarrier multiplied by the code element as a phase reference, three kinds of codes are multiplied, and among the codes, two codes are common in all the cells. Accordingly, a different code is only the sector specific code. This means enabling correlation detection using replicas of the sector specific codes. Therefore, the reception apparatus side prepares a time waveform of a replica code of the sector specific code corresponding to each sector, multiplies a reception signal (signal prior to FFT) by the time waveform of the replica signal to detect a correlation peak, and is thereby capable of detecting the position of the SCH in the reception signal with high accuracy. Accordingly, it is made possible to perform subsequent sector identification and cell identification with more efficiency. In addition, even when the SCH structure as described above is adopted, the SCH is periodically arranged in a one-frame period, which is not different, and it is also possible to perform position detection by the auto-correlation method (i.e. the method of detecting correlation between a signal delayed from a reception signal by a predetermined period and an original reception signal).

Further, in the data structure of the synchronization channel (SCH) of the invention, the sector specific code is configured by making 2m (m is a natural number of "2" or more) code elements a group, and assigning a group of code elements repeatedly to subcarriers on the frequency axis, while 2m code elements are configured by preparing two groups of m code elements orthogonal for each sector as described in claim 2 or 3, and assigning each group to subcarriers to be adjacent on the frequency axis, and among the 2m code elements that is a structure unit of the sector specific code, each of half m code elements is multiplied by a code element constituting the cell specific code, having the same value as that of the code element, indicating a relative phase difference from respective one of the other half m code elements.

When the SCH is used only for sector identification, as described above, it is enough arranging an orthogonal code having m code elements as a structure unit repeatedly on the frequency axis, but to further transmit the cell specific information, the conditions become severer. In other words, in order to multiplex both of the sector specific information and cell specific information on the SCH to transmit, it is the condition that the sector specific information and cell specific information do not have an adverse effect on each other, and it is important to enable each information to be restored independently (i.e. by parallel processing) to reduce the processing time. To meet these conditions, herein, two groups are prepared where the group has m code elements that is a structure unit of an orthogonal code for sector identification, and combined in a two-stage manner on the frequency axis, and 2m code elements are made a new unit structure and arranged repeatedly on the frequency axis. M code elements are used to identify the sector. Remaining m code elements are used to multiply the cell specific code. Since the cell specific code indicates a relative phase difference between a pair of subcarriers as described previously, each of the remaining m code elements is multiplied by a code indicating a phase difference from respective one (i.e. respective code element of the sector specific code) of the other m code elements with the same value. For example, such a case is considered that an orthogonal code for sector identification comprised of code elements (m1, m2, m3) is combined in a two-stage manner on the frequency axis, and arranged as a unit repeatedly from the low-frequency side to the high-frequency side to form a code. For example, code M1 is assumed that M1=(m1, m2, m3, "m1", "m2", "m3" . . . ). " " is added to distinguish between code elements with the same value. Then, "m1" is multiplied by a code "c1" indicating a phase difference from m1 having the same value on the lower frequency side, and "m2" and "m3" are also multiplied by code "c2" and "c3" each indicating a phase difference from m2 or m3 on the lower frequency side, respectively.

By this means, sector and cell identification code M1 is M1=(m1, m2, m3, m1·c1, m2·c2, m3·c3 . . . ). As described above, since (m1, m2, m3) is orthogonal among sectors, it is possible to distinguish the sector specific code to extract by multiplication of the complex conjugate and correlation detection. Further, for example, for "m1·c1", by multiplying the complex conjugate of m1 (code multiplied by a subcarrier as a phase reference), m1 is cancelled, and it is possible extract "c1" having the cell specific information. c2 and c3 can be extracted in the same way. Thus, basically, by detecting a phase difference of another subcarrier from a subcarrier as a phase reference, it is possible to demodulate the cell specific code (Cn) (in addition, to enhance demodulation accuracy, it is desirable to calculate cross-correlation with cell specific code Cn as a candidate.) It is possible to execute sector identification by despreading and correlation detection using the sector specific code (m1, m2, m3) and demodulation processing of the cell specific information Cn (c1, c2, c3) by multiplying the complex conjugate independently of (in parallel with) each other. Further, with respect to transmission of the cell specific information, for example, two subcarriers multiplied by the same value "m1" are paired, one is a phase reference subcarrier, the other subcarrier is assigned the cell specific code Cn, and it is possible to provide a relative phase difference from the phase reference subcarrier. Therefore, without receiving interference by the sector specific code, it is possible to transmit only the cell specific information as the relative phase difference information between subcarriers. Accordingly, the cell specific information can be transmitted efficiently.

Further, in the data structure of the synchronization channel (SCH) of the invention, the sector specific code is configured by making 2m (m is a natural number of "2" or more) code elements a group, and assigning a group of code elements repeatedly to subcarriers on the frequency axis, while 2m code elements are configured by preparing two groups of m code elements orthogonal for each sector of the invention, and assigning code elements of each group to subcarriers alternately so that code elements with the same value in each code are arranged to be adjacent on the frequency axis, and among the 2m code elements that is a structure unit of the sector specific code, one of the code elements with the same value assigned to the adjacent subcarriers on the frequency axis is multiplied by a code element constituting the cell specific code indicating a relative phase difference from the other code element as a phase reference.

In the aforementioned example, two groups of m code elements (orthogonal code for sector identification: for example (m1, m2, m3)) are prepared, and simply stacked and arranged on the frequency axis. In the invention, an arrangement is made in a mixed form so that the same code elements of each group are adjacent to each other on the frequency axis. For example, code M1 is assumed that code M1=(m1, m1, m2, m2, m3, m3). Then, one of code elements with the same value is multiplied by the cell specific code indicating a relative phase difference. Accordingly, sector and cell identification code M1 is M1=(m1, m1·c1, m2, m2·c2, m3, m3·c3 . . . ). Then, sector identification is performed using odd-numbered code elements (m1, m2, m3), each of even-numbered code elements (m1·c1, m2·c2, m3·c3) is multiplied by a complex conjugate of m1, m2 or m3 multiplied by the adjacent subcarrier as a phase reference, and it is possible to demodulate the cell specific code (c1, c2, c3 . . . ). It is an excellent respect of the invention that code elements with the same value are arranged to be adjacent to each other (i.e. arranged as a pair on the frequency axis such as "m1, m1", "m2, m2", "m3, m3") in a sector specific code element sequence prior to be ing multiplied by the cell specific code Cn. Since codes with the same value are arranged on the proximal frequency axis, it is possible to regard transfer functions of propagation paths of subcarriers assigned the codes as being equivalent (in other words, when the transfer function of the propagation path of each subcarrier differs by positions of subcarriers being apart from each other on the frequency axis, the phase rotates by this effect, the rotation results in an error in transmitting the cell specific information using a relative phase difference between two subcarriers, and there is a case that demodulation accuracy of the cell specific information degrades.) In the invention, since two subcarriers are adjacent and arranged on the frequency axis, the probability is high that propagation conditions of the subcarriers are estimated at the same, and it is thus possible to transmit the cell specific information (i.e. phase difference between two subcarriers) with high accuracy.

Further, in the data structure of the synchronization channel (SCH) of the invention, Sf (Sf is a natural number) sub-frames are arranged over a one-frame period in the time-axis direction, while a plurality of sub-channels is arranged over the entire band in the frequency-axis direction, a frame in multicarrier communication is thereby configured, the synchronization channel (SCH) is arranged in each last one symbol in a time period obtained by dividing the one-frame period into Ss (Ss is a submultiple of Sf) portions, and the synchronization channel (SCH) is periodically arranged at intervals of the predetermined number of subcarriers on the frequency axis. Accordingly, the time waveform formed by subcarriers for use in sector identification being combined is a time waveform having the periodicity that a predetermined waveform is repeated in a one-symbol period, and by using the periodicity of the time waveform, it is possible to detect the SCH position by the auto-correlation method.

The SCH is assigned to the last (one) symbol in a time period obtained by dividing a one-frame period into the predetermined number of portions, and among subcarriers assigned the SCH, subcarriers for use in sector identification are arranged at predetermined intervals with periodicity on the frequency axis. According to this arrangement, due to the frequency relationship between orthogonal subcarriers in the OFDM communication scheme i.e. the symmetry in the time domain, as the time waveform formed by the subcarriers being combined, such a waveform is obtained that has the periodicity such that a predetermined waveform is repeated in a one-symbol period (for example, such a waveform that assuming a predetermined waveform as A, A is repeated on a half (½) symbol basis). Using the periodicity of the time waveform, it is possible to detect the SCH position by the auto-correlation method or cross-correlation method.

Further, in the data structure of the synchronization channel (SCH) of the invention, a plurality of sub-frames are arranged over a one-frame period in the time-axis direction, while a plurality of sub-channels is arranged over the entire band in the frequency-axis direction, a frame in multicarrier communication is thereby configured, and the synchronization channel (SCH) is arranged in predetermined two symbols in the one-frame period. Accordingly, the time waveform formed by subcarriers for use in sector identification being combined is a time waveform having the periodicity that the same waveform is repeated in a one-symbol period, and by using the periodicity of the time waveform, it is possible to detect the SCH position by the auto-correlation method.

The SCH is assigned to two symbols, and among subcarriers assigned the SCH, subcarriers for use in sector identification are arranged at predetermined intervals with periodicity on the frequency axis. In the case of the invention, since the SCH is assigned over two symbols, as a result, the same time waveform appears for each symbol (for example, such a waveform that assuming a waveform in a one-symbol period as C, C is repeated on a one-symbol period basis in a two-symbol period.) Using thus periodicity of the time waveform on a one-symbol period basis, it is possible to detect the SCH position by the auto-correlation method. Further, since the SCH can be transmitted using subcarriers over the entire frequency band, when different information is transmitted for each symbol, it is possible to increase a code length usable in transmitting the cell specific information (relative phase difference information), and to transmit a larger amount of cell specific information.

Further, a cell search method of the invention is a cell search method for receiving a multicarrier signal from a multicarrier transmission apparatus, and using a synchronization channel (SCH) of the invention including the cell and sector identification information to identify a sector and a cell, and is performed by the first step of detecting a synchronization channel (SCH) position in a reception signal by an auto-correlation method or cross-correlation method, and the second step of detecting a sector specific code providing the maximum reception power to identify a sector by despreading processing with a sector specific code of the synchronization channel (SCH) arranged on the frequency axis, concurrently detecting a phase difference between a subcarrier as a phase reference and another subcarrier, associated with the subcarrier, multiplied by a code element of a cell specific code among subcarriers assigned the synchronization channel (SCH), thereby demodulating the cell specific code, further performing correlation detection processing with a cell specific code desired to detect when necessary, and thereby detecting the cell specific code.

As described above, by multiplexing the information to identify a sector and a cell on the downlink SCH in multicarrier communication, when predetermined conditions are met (in other words, when the sufficient number of subcarriers is used, and all the required cell specific information can be transmitted by a relative phase difference between a pair of subcarriers), it is possible to complete a cell search including sector identification only using the SCH. In other words, it is possible to complete the cell search by detection of SCH timing (first step) on the time axis by an auto-correlation method using the periodicity of the SCH or cross-correlation method using replica codes of the sector specific codes, and identification of frame timing and identification of a sector ID and cell ID (second step) based on the information on the frequency axis. Accordingly, it is possible to reduce the search process as compared with the conventional 3-step cell search. Further, in this case, despreading and correlation detection using a pilot channel is required only in demodulating a data channel while being not required in a cell search, and it is thereby possible to achieve reductions (such as a reduction in memory capacity and the like) in loads of hardware used for correlation calculation of the pilot channel. Furthermore, since the sector specific code is multiplexed on the SCH, with respect to sector identification, it is possible to obtain effects of having resistance to interference between sectors and fading. However, when the number of subcarriers is not adequate, the cell ID cannot be identified directly only by the SCH, and there may be a case that cell ID group information is only detected. In this case, the cell ID is identified by implementing despreading and correlation detection using a pilot channel as processing of the third step.

Further, a multicarrier transmission apparatus of the invention has assigning means for assigning a synchronization channel (SCH) having the structure of the invention onto the frequency axis in a frame period, and transmitting means having directional antennas provided for each of a plurality of sectors for transmitting a multicarrier signal with the synchronization channel (SCH) assigned onto the frequency axis.

According to this configuration, it is possible to transmit a multicarrier signal with the sector specific information and cell specific information assigned on the frequency axis from the antennas for each sector.

Further, a multicarrier reception apparatus of the invention is a multicarrier reception apparatus for receiving a multicarrier signal transmitted from the multicarrier transmission apparatus of the invention, and using a synchronization channel (SCH) multiplied by a sector specific code included in the reception signal to identify a sector and a cell, and has timing detecting means for detecting a synchronization channel (SCH) position in a reception signal using the fact that the synchronization channel (SCH) is arranged periodically on the time axis, and sector identifying means for detecting a sector specific code providing the maximum reception power by despreading processing with the sector specific code multiplied by the synchronization channel (SCH) arranged on the frequency axis.

It is thereby possible to receive a multicarrier signal and implement the sector identification processing (sector search) by the SCH.

Further, a multicarrier reception apparatus of the invention is a multicarrier reception apparatus for receiving a multicarrier signal transmitted from the multicarrier transmission apparatus, and using a synchronization channel (SCH) adopting a code common in cells included in the reception signal to identify a sector, and has timing detecting means for detecting a synchronization channel (SCH) position in a reception signal by a cross-correction method using a time waveform of a replica signal of the sector specific code multiplied by a subcarrier assigned a code element that is a phase reference among code elements constituting the cell specific code, and sector identifying means for detecting a sector specific code providing the maximum reception power by despreading processing with the sector specific code of the synchronization channel (SCH) arranged on the frequency axis.

In the multicarrier reception apparatus of the invention, in the first step of detecting a position of the SCH included in a reception signal, applied is the method (cross-correlation method) for multiplying the reception signal by a time waveform of a replica signal of the sector specific code to obtain correlation. It is thereby possible toe detect the SCH timing with high accuracy.

Furthermore, the multicarrier reception apparatus of the invention further has cell identifying means for detecting, concurrently with the detection processing of the sector specific code in the sector identifying means, a phase difference between a subcarrier as a phase reference and another subcarrier, associated with the subcarrier, multiplied by a code element of a cell specific code among subcarriers assigned the synchronization channel (SCH), thereby demodulating the cell specific code, further performing correlation detection processing with a cell specific code desired to detect when necessary, thereby detecting the cell specific code, and detecting a cell ID or cell ID group information.

It is thereby possible to receive a multicarrier signal and implement a cell search including sector identification by the SCH. When the number of subcarriers is adequate, it is possible to identify a sector ID and cell ID only by the SCH.

Moreover, the multicarrier reception apparatus of the invention further has means for implementing despreading and correlation detection processing using a pilot channel, and detecting a cell ID to complete the cell identification processing when the information specified by the cell identifying means is cell ID group information.

By this means, when the number of subcarriers is not sufficient, and only the cell ID group is identified by the SCH, a cell ID is subsequently identified by despreading and correlation detection of the pilot channel, and the cell search can be completed.

Further, in the data structure of the synchronization channel (SCH) of the invention, subcarriers (i.e. subcarriers for use in sector identification) multiplied by code elements as a phase reference constituting the cell specific code are arranged symmetrically on the low-frequency side and high-frequency side with respect to the center frequency at intervals of the predetermined number of subcarriers, the time waveform formed by the subcarriers for use in sector identification being combined is thereby a time wave form having the periodicity that a reference waveform, or an inverted waveform of the reference waveform is repeated on a 1/M (M is a natural number of "2" or more) symbol basis in a one-symbol period, and by using the periodicity of the time waveform, it is possible to detect the synchronization channel (SCH) position by the auto-correlation method.

Furthermore, by devising the arrangement on the frequency axis of subcarriers for use in sector identification, it is possible to obtain a characteristic time waveform on a 1/N (N is a natural number of "4" or more) symbol basis, and by using the characteristic periodicity of the time waveform, it is possible to perform correlation determination with high accuracy more efficiently. Since simplified correlation detection can be performed with the periodicity on a 1/N basis noted, it is possible to simplify the configuration of a correlator (also referred to as a matched filter).

Moreover, in the data structure of the synchronization channel (SCH) of the invention, subcarriers for use in sector identification are arranged symmetrically on the low-frequency side and high-frequency side with respect to the center frequency at positions apart from one another by three subcarriers i.e. at the second, sixth, tenth, fourteenth and similarly subsequent positions with the center frequency assumed to be the zeroth, and the time waveform formed by the subcarriers for use in sector identification being combined is thereby a time waveform having the periodicity that a reference waveform, and an inverted waveform of the reference waveform are alternately repeated on a ¼ symbol basis in a one-symbol period.

Assuming the reference waveform as B, the time waveform is obtained, such as B, −B, B, −B, having the periodicity that the reference waveform and the inverted waveform of the reference waveform are alternately repeated on a ¼ symbol basis in a one-symbol period. In this case, it is only required to detect the specific periodicity of the time wave form repeated on a ¼ symbol basis, and the configuration of a correlator can be simplified.

Further, in the data structure of the synchronization channel (SCH) of the invention, subcarriers for use in sector identification are arranged symmetrically on the low-frequency side and high-frequency side with respect to the center frequency at positions apart from one another by three subcarriers i.e. at the fourth, eighth, twelfth, sixteenth and similarly subsequent positions with the center frequency assumed to be the zeroth, and the time waveform formed by the subcarriers for use in sector identification being combined is thereby a time waveform having the periodicity that the same reference waveform is repeated on a ¼ symbol basis in a one-symbol period.

Assuming the reference waveform as D, the time waveform is obtained, such as D, D, D, D, having the periodicity that the same reference waveform is repeated on a ¼ symbol basis in a one-symbol period. Also in this case, it is possible to simplify the configuration of a correlator.

Furthermore, in the data structure of the synchronization channel (SCH) of the invention, the sector common code and each of code elements that are the phase references constituting the cell specific code are common codes in all the cells, code elements of the sector common code are common in subcarriers on the frequency axis to be assigned the synchronization channel (SCH), the code elements that are the phase references constituting the cell specific code are also common in the subcarriers as a phase reference, and such a condition is thereby eliminated that subcarriers to obtain a code element targeted for despreading are limited to a group of adjacent subcarriers in detecting a sector specific code providing the maximum reception power by the despreading processing with the sector specific code to identify a sector.

In the case of performing the processing (SCH position detection processing) in the first step in a cell search by cross-correlation detection, it is intended to adopt the most simplified code structure by providing subcarriers on the frequency axis with commonality of (i.e. all the same) a sector common code common in all the cells and code elements to be multiplied by subcarriers as a phase reference among the sector specific codes common in all the cells. It is thereby possible to select some subcarriers from among all the subcarriers to specify the sector specific code. Accordingly, such a condition is eliminated that subcarriers to obtain a code element targeted for despreading are limited to a pair of adjacent subcarriers.

Further, a cell search method of the invention includes the first step of detecting a synchronization channel (SCH) position in a reception signal by an auto-correlation method or cross-correlation method, and the second step of using that a time waveform formed by a combination of subcarriers as a phase reference assigned code elements of the sector specific code has a characteristic waveform corresponding to the assigned code elements, thereby detecting a correlation value by the cross-correlation method, identifying a sector providing the highest correlation value as the nearest sector, concurrently detecting a phase difference between a subcarrier as the phase reference and another, subcarrier, associated with the subcarrier, multiplied by a code element of the cell specific code in subcarriers assigned the synchronization channel (SCH), thereby demodulating the cell specific code, further performing correlation detection processing with a cell specific code desired to detect when necessary, and thereby detecting the cell specific code.

It is clarified in the cell search method that sector identification can be performed by not only correlation value peak determination by despreading subsequent to FFT processing, but also cross-correlation in time waveform prior to FFT. In other words, before the FFT processing, a cross-correlation peak is detected using replica time waveforms of the sector specific codes, the code providing the maximum peak is specified, and it is thereby possible to identify the nearest sector. To apply the cross-correlation method using the replica time waveforms, it is a condition that mobile stations know various sector specific codes transmitted from the base station. In addition, as the sector identification method, it can be determined as appropriate using the technique for detecting correlation by despreading using orthogonal codes, or using the technique for detecting cross-correlation using replica time waveforms, in consideration of required detection accuracy, restrictions on circuitry, or the like.

The invention claimed is:

1. A mobile station that communicates with a base station controlling over a cell containing a plurality of sectors, the mobile station comprising:
  a circuit configured to and/or programmed to receive, from the base station, data of synchronization channels which includes sector specific codes respectively corresponding to sector identification numbers for identifying the sectors, and
  a circuit configured to and/or programmed to perform synchronization detection with reference to the data of synchronization channels, wherein
  the data of the synchronization channels mapped to a plurality of predetermined symbols at intervals of a half period of a frame and a plurality of predetermined subcarriers are specific to respective sectors in the same cell and common among adjacent cells, wherein
    the plurality of predetermined subcarriers are common among sectors in the same cell,
    the plurality of predetermined subcarriers are common among adjacent cells, and
    the plurality of predetermined symbols are common among sectors in the same cell.

2. A method used in a mobile station that communicates with a base station controlling over a cell containing a plurality of sectors, the method comprising:
  receiving, from the base station, data of synchronization channels which includes sector specific codes respectively corresponding to sector identification numbers for identifying the sectors, and
  performing synchronization detection by using data of synchronization channels, wherein
  the data of the synchronization channels mapped to a plurality of predetermined symbols at intervals of a half period of a frame and a plurality of predetermined subcarriers are specific to respective sectors in the same cell and common among adjacent cells, wherein
    the plurality of predetermined subcarriers are common among sectors in the same cell,
    the plurality of predetermined subcarriers are common among adjacent cells, and
    the plurality of predetermined symbols are common among sectors in the same cell.

3. A base station controlling over a cell containing a plurality of sectors, the base station comprising:
  a circuit configured to and/or programmed to generate data of synchronization channels which includes sector specific codes respectively corresponding to sector identification numbers for identifying the sectors, and
  a circuit configured to and/or programmed to transmit, to a mobile station, the data of synchronization channels, wherein
  the data of synchronization channels mapped to a plurality of predetermined symbols at intervals of a half period of a frame and a plurality of predetermined subcarriers are specific to respective sectors in the same cell and common among adjacent cells, wherein
    the plurality of predetermined subcarriers are common among sectors in the same cell,
    the plurality of predetermined subcarriers are common among adjacent cells, and
    the plurality of predetermined symbols are common among sectors in the same cell.

4. A method used in a base station controlling over a cell containing a plurality of sectors, the method comprising:
generating data of synchronization channels which includes sector specific codes respectively corresponding to sector identification numbers for identifying the sectors, and
transmitting, to a mobile station, the data of synchronization channels, wherein
the data of synchronization channels mapped to a plurality of predetermined symbols at intervals of a half period of a frame and a plurality of predetermined subcarriers are specific to respective sectors in the same cell and common among adjacent cells, wherein
the plurality of predetermined subcarriers are common among sectors in the same cell,
the plurality of predetermined subcarriers are common among adjacent cells, and
the plurality of predetermined symbols are common among sectors in the same cell.

* * * * *